(12) United States Patent
Hutchison

(10) Patent No.: US 7,395,909 B2
(45) Date of Patent: Jul. 8, 2008

(54) DUAL FUNCTION HANDLEBAR MOUNTED ACTUATOR

(75) Inventor: Owen Keith Hutchison, Smiths Gully (AU)

(73) Assignee: Innovative Motorcycle Technology Pty Ltd, Smiths Gulley, Victoria (AU)

( * ) Notice: Subject to any disclaimer, the term of this patent is extended or adjusted under 35 U.S.C. 154(b) by 308 days.

(21) Appl. No.: 10/522,977

(22) PCT Filed: Aug. 1, 2003

(86) PCT No.: PCT/AU03/00970

§ 371 (c)(1),
(2), (4) Date: Jul. 5, 2005

(87) PCT Pub. No.: WO2004/012956

PCT Pub. Date: Feb. 12, 2004

(65) Prior Publication Data

US 2005/0258011 A1    Nov. 24, 2005

(30) Foreign Application Priority Data

| Aug. 2, 2002 | (AU) | 2002950568 |
| Aug. 30, 2002 | (AU) | 2002951139 |
| Sep. 4, 2002 | (AU) | 2002951187 |
| Sep. 23, 2002 | (AU) | 2002951582 |
| Sep. 26, 2002 | (AU) | 2002951674 |
| Oct. 4, 2002 | (AU) | 2002951835 |
| Oct. 16, 2002 | (AU) | 2002952076 |
| Nov. 28, 2002 | (AU) | 2002952986 |
| Dec. 31, 2002 | (AU) | 2002953591 |
| Jan. 11, 2003 | (AU) | 2003900098 |
| Feb. 18, 2003 | (AU) | 2003900708 |
| Jun. 4, 2003 | (AU) | 2003902763 |

(51) Int. Cl.
*B60W 10/02* (2006.01)
*B60W 10/18* (2006.01)

(52) U.S. Cl. .............. 192/13 R; 74/471 R; 192/103 F; 303/137

(58) Field of Classification Search .......... 188/344; 303/9.64, 137
See application file for complete search history.

(56) References Cited

U.S. PATENT DOCUMENTS 1,885,442 A * 11/1932 Holland .................. 192/13 R (Continued)

FOREIGN PATENT DOCUMENTS

AU    39665/89    8/1992

(Continued)

OTHER PUBLICATIONS

Supplementary Partial European Search Report dated May 12, 2006 based on EP 03 73 9878.

*Primary Examiner*—Rodney H Bonck
(74) *Attorney, Agent, or Firm*—Ohlandt, Greeley, Ruggiero & Perle L.L.P.

(57) ABSTRACT

A dual function handlebar mounted actuator has first and second function operating devices arranged for activation by movement of a hand operated lever arrangement. The first and second functions operating devices are linked so that a combined first and second function can be activated and the first and second functions are a clutch and a brake function. The actuator has a lever movable between a first and a second position, and a master cylinder having a piston with the lever moving towards the second position to drive a piston from its initial position thereby increasing pressure in the master cylinder. By releasing the lever the pressure within the master cylinder is arranged to return the piston towards its initial position and the piston being returned fully to the initial position upon movement of the lever to the first position.

4 Claims, 38 Drawing Sheets

U.S. PATENT DOCUMENTS

| | | | | |
|---|---|---|---|---|
| 1,973,826 A | * | 9/1934 | Schweering | 192/13 R |
| 1,996,282 A | * | 4/1935 | Drabin et al. | 192/13 R |
| 2,203,777 A | | 6/1940 | Detmers | 192/3 |
| 3,131,573 A | * | 5/1964 | Bent | 74/471 R |
| 3,258,298 A | | 6/1966 | Holland | |
| 3,845,847 A | | 11/1974 | Camp | 192/3 |
| 3,935,816 A | | 2/1976 | Boquette, Jr. | 102/41 |
| 4,014,419 A | | 3/1977 | McKnight | 192/13 |
| 4,015,619 A | | 4/1977 | Shore et al. | 137/102 |
| 4,086,824 A | | 5/1978 | Johnson | 74/481 |
| 4,223,533 A | * | 9/1980 | Valentin | 60/547.1 |
| 4,274,518 A | * | 6/1981 | Berisch | 188/344 |
| 4,598,954 A | * | 7/1986 | Hayashi | 303/9.61 |
| 4,671,140 A | | 6/1987 | Koshio | 74/868 |
| 4,940,290 A | | 7/1990 | Nishii et al. | 303/6.01 |
| 5,299,652 A | | 4/1994 | Bevins | 180/219 |
| 5,596,906 A | | 1/1997 | Lin | 74/478 |
| 5,599,255 A | | 2/1997 | Ki-Dong et al. | 477/211 |
| 5,957,811 A | | 9/1999 | Gustafsson | 477/214 |
| 6,227,342 B1 | | 5/2001 | Armbruster et al. | 192/85 |
| 6,263,754 B1 | | 7/2001 | Wesling et al. | 74/489 |
| 6,698,567 B2 | * | 3/2004 | Dal Pra' | 192/217 |
| 6,733,089 B1 | * | 5/2004 | Wakabayashi et al. | 303/9.64 |
| 6,786,312 B1 | * | 9/2004 | Osborne | 192/13 R |
| 2001/0022114 A1 | | 9/2001 | Brainard et al. | 74/525 |
| 2002/0185349 A1 | * | 12/2002 | Jakovljevic | 188/344 |

FOREIGN PATENT DOCUMENTS

| | | |
|---|---|---|
| DE | 74 27 792 U | 4/1975 |
| EP | 0764574 A1 | 3/1997 |
| FR | 2770821 | 5/1999 |
| GB | 1 591 012 A | 6/1981 |
| WO | WO 00/50295 | 8/2000 |

* cited by examiner

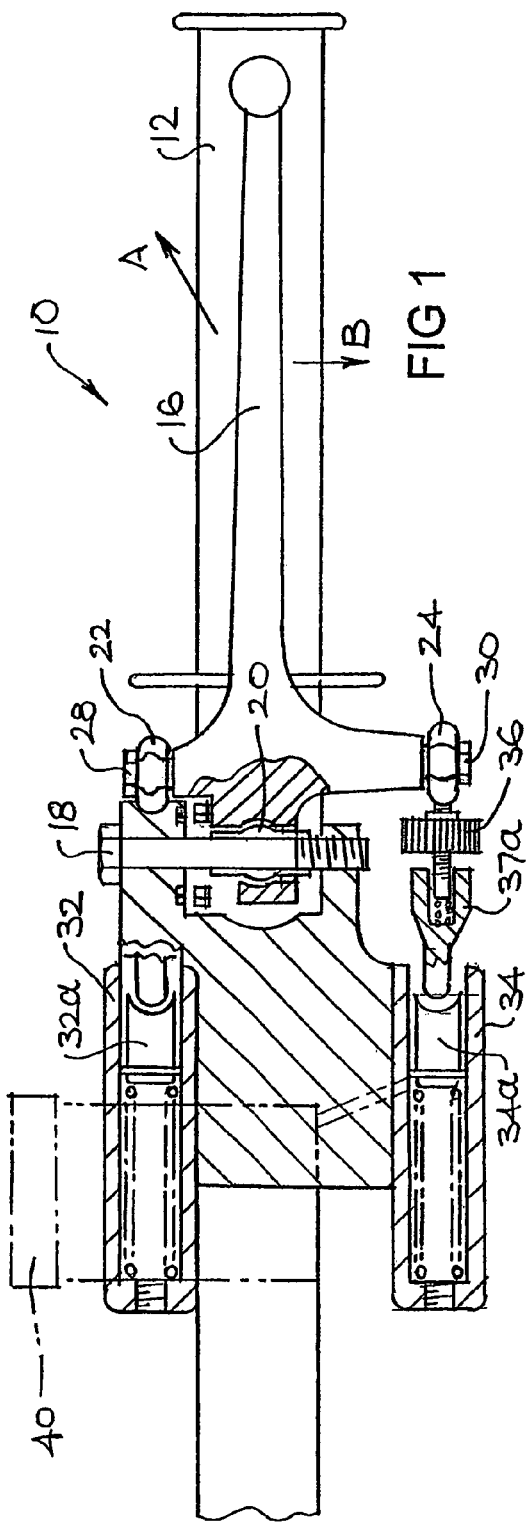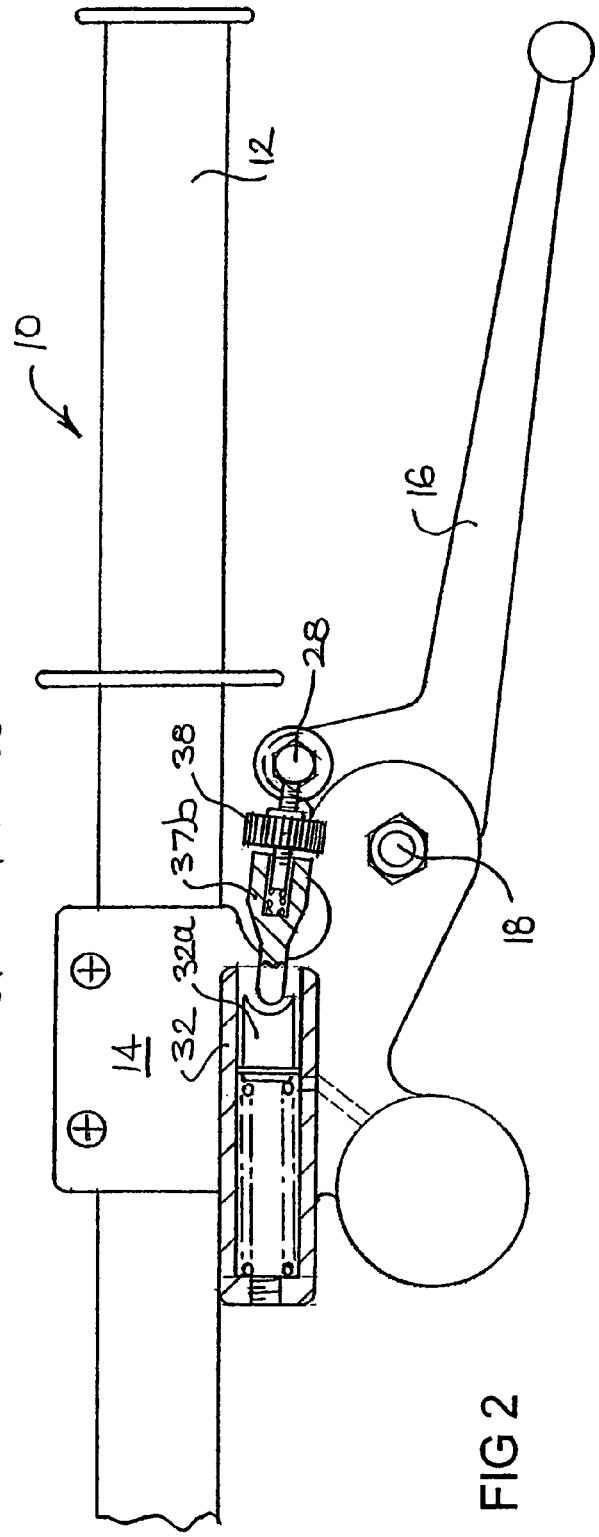

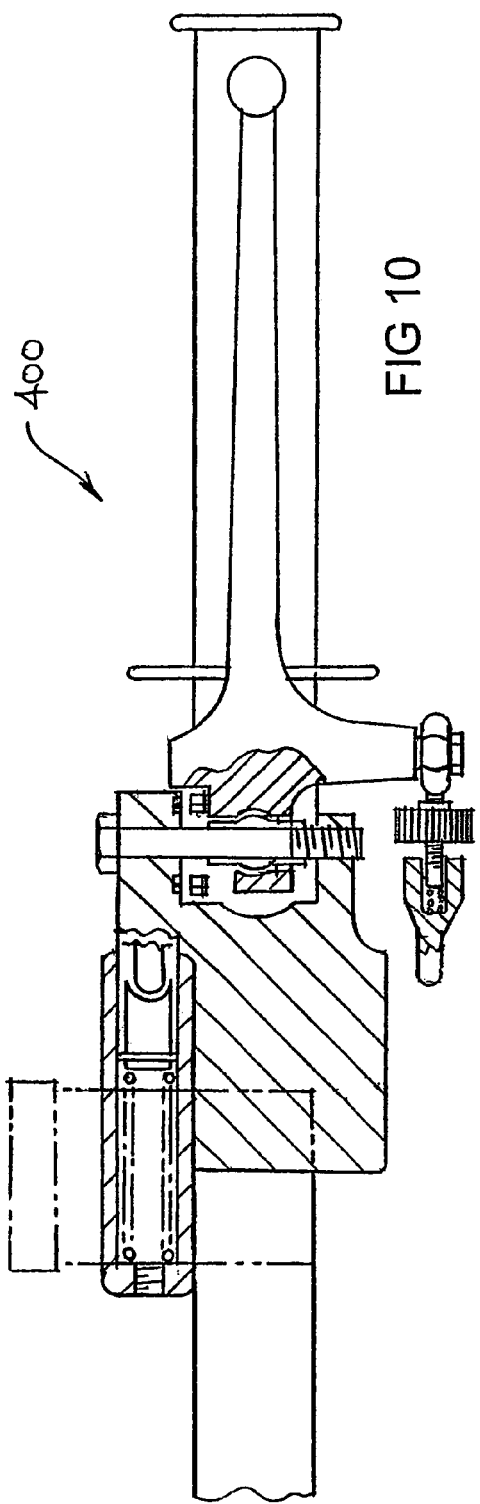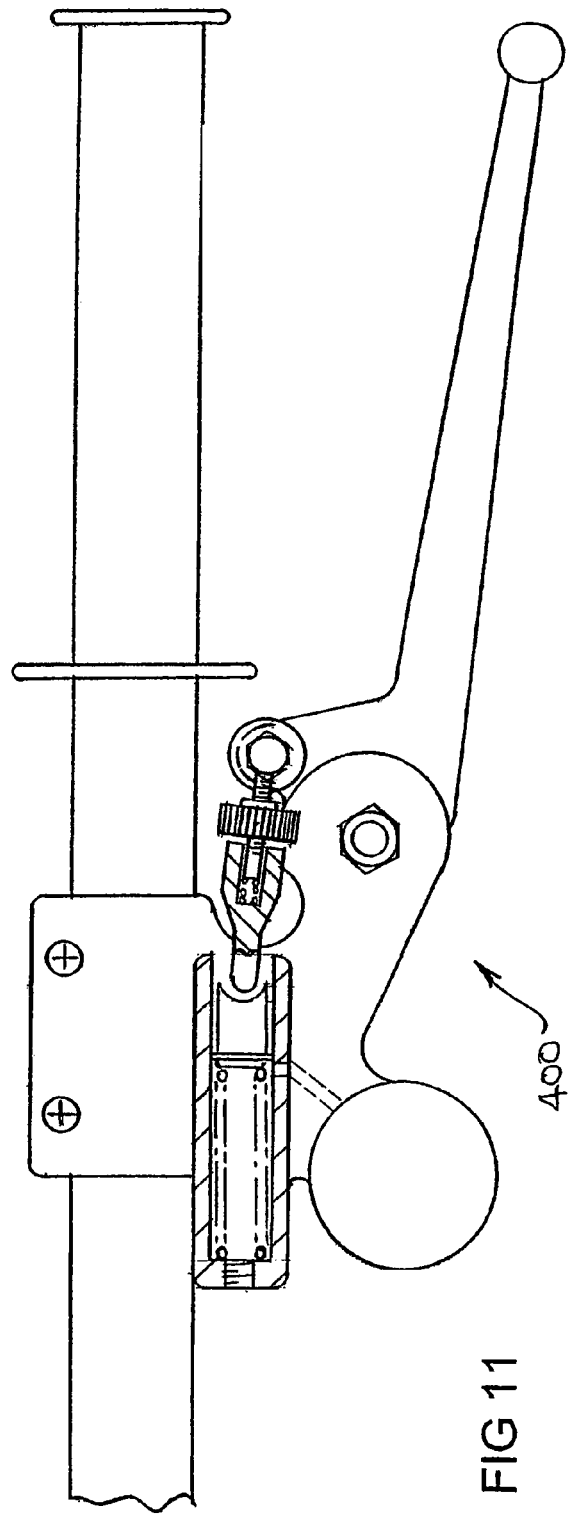
FIG 10
FIG 11

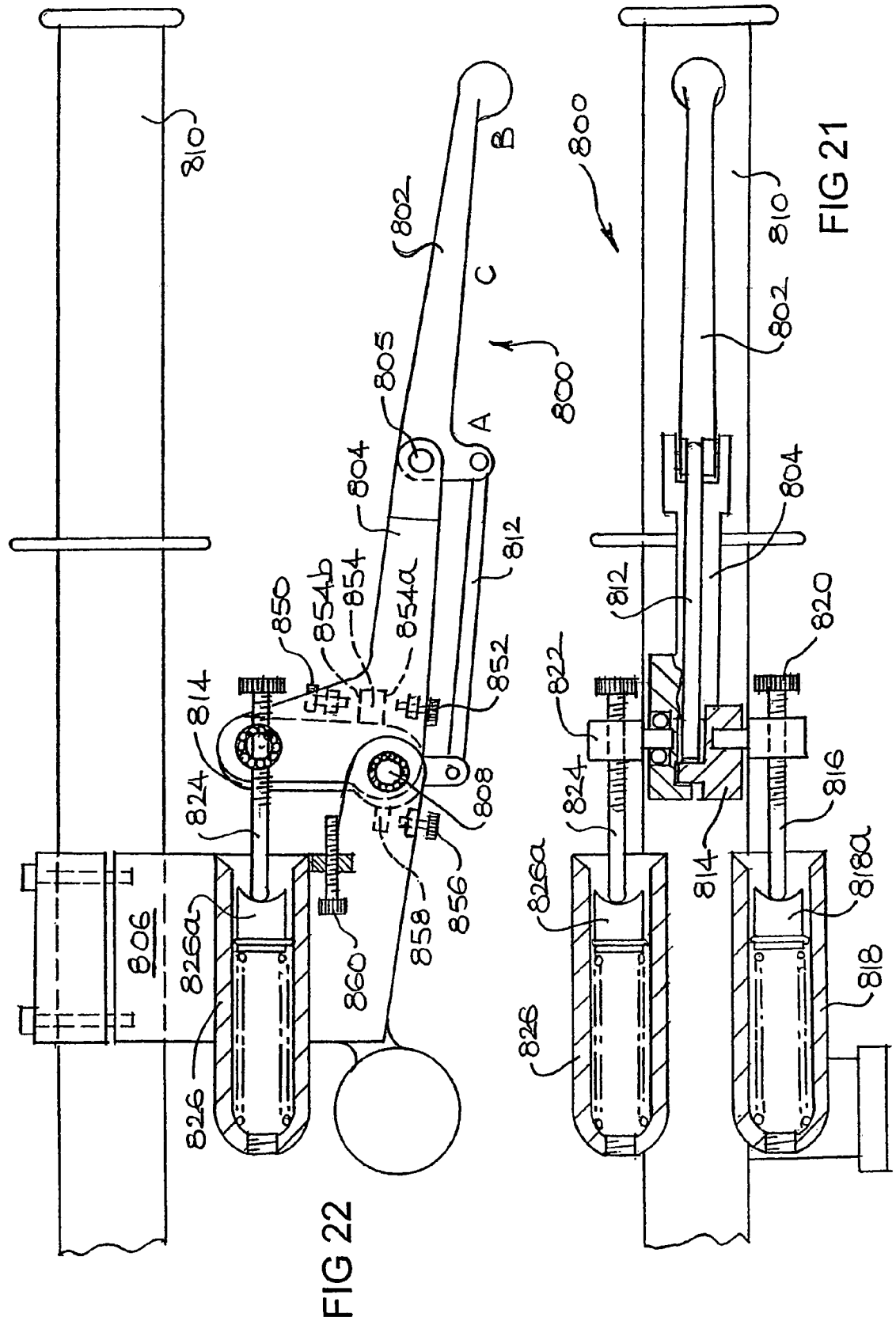

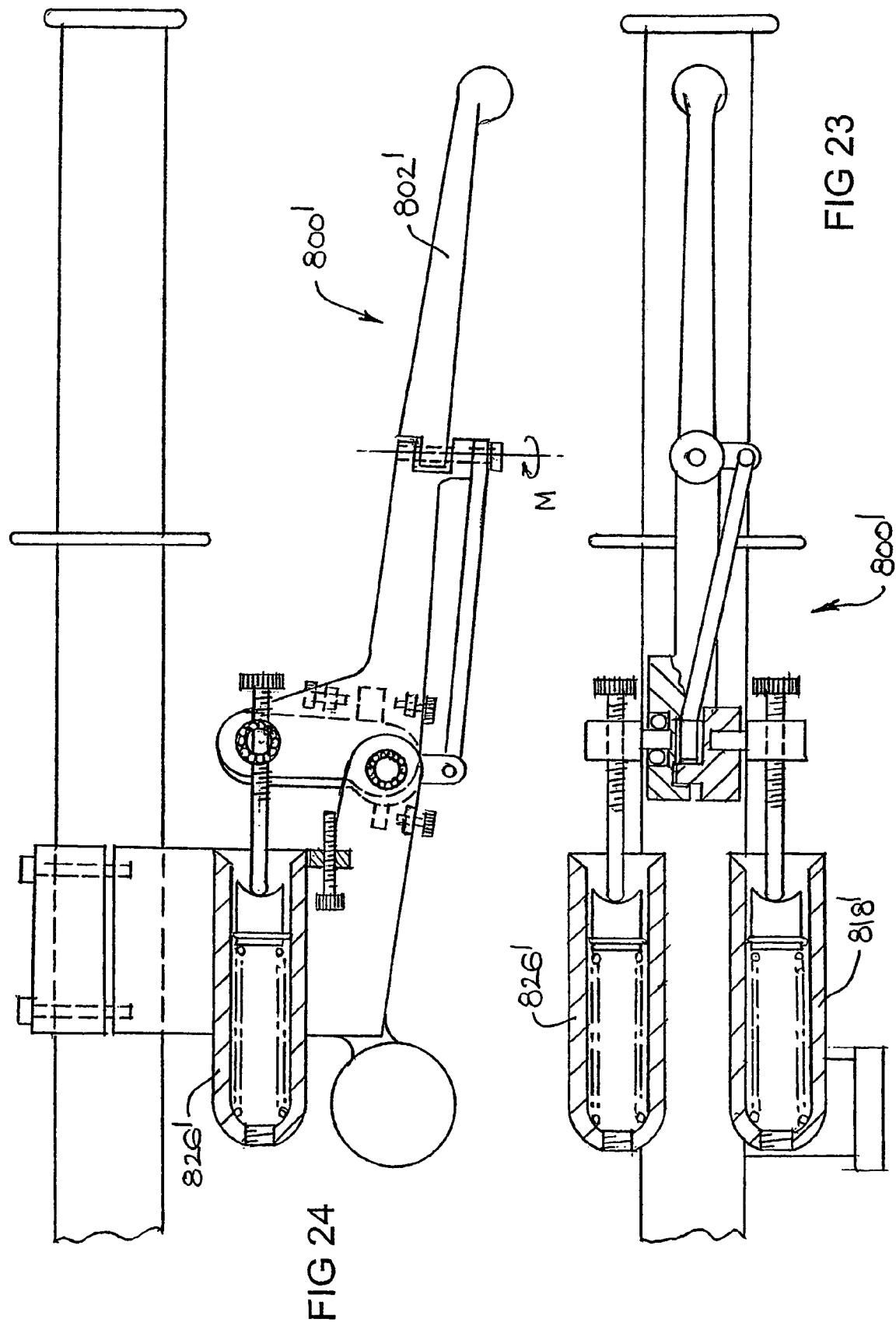

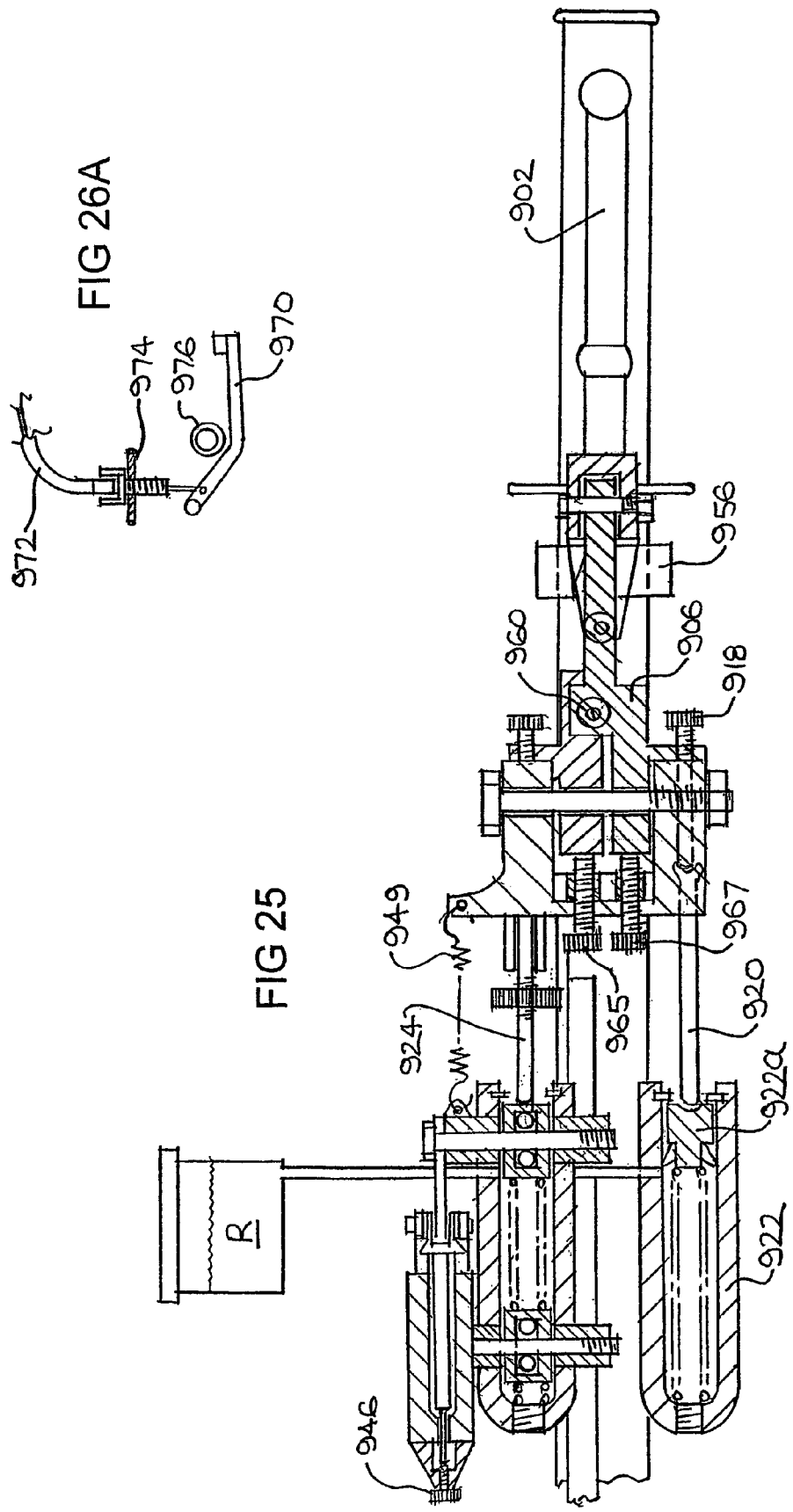

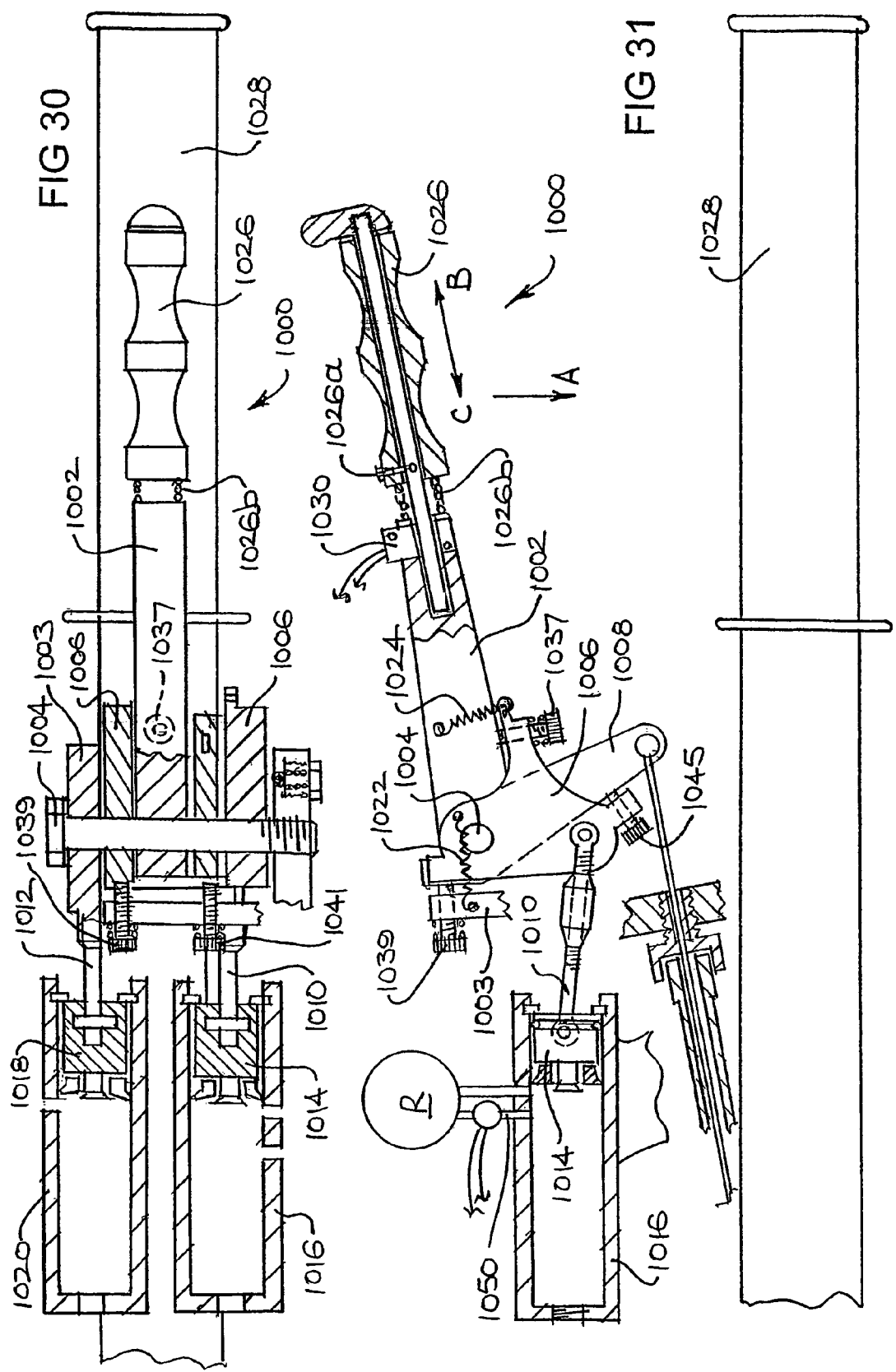

TABLE ONE

| Function | Open | Closed |
|---|---|---|
| BRAKE | 2 | 1, 3 |
| CLUTCH | 1 | 2, 3 |
| ANTISTALL | 3 | 1, 2 |

FIG 35

TABLE TWO

| Function | Open | Closed |
|---|---|---|
| BRAKE |  | 1 |
| CLUTCH | 1 |  |
| ANTISTALL | 1 |  |

FIG 36

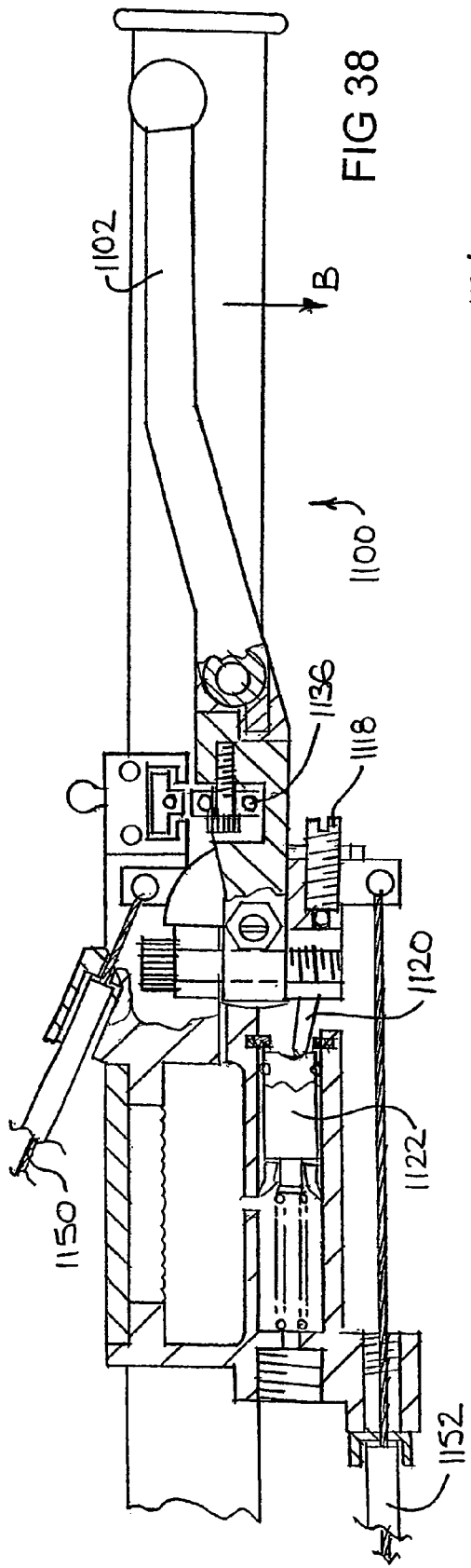
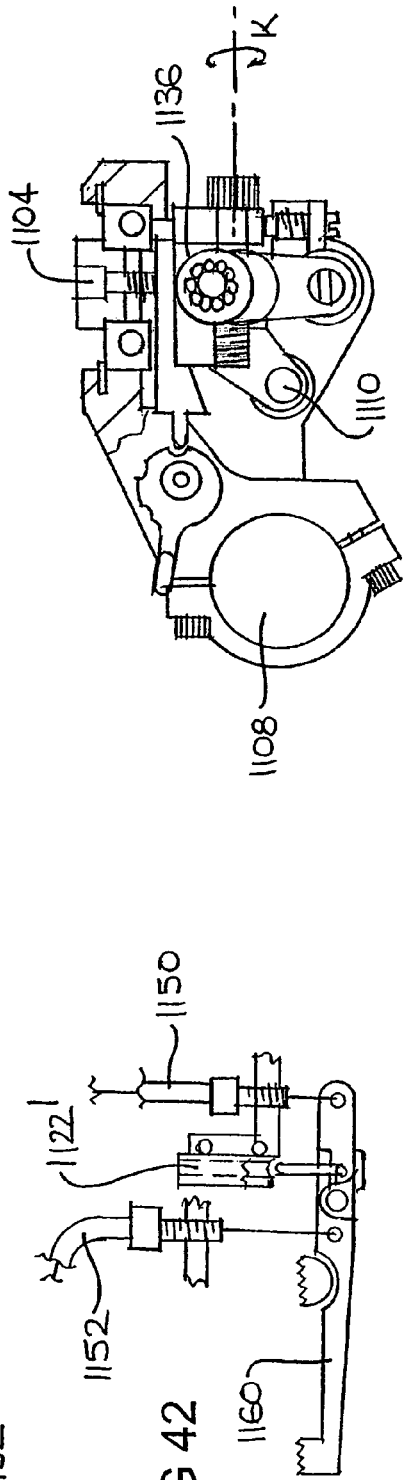
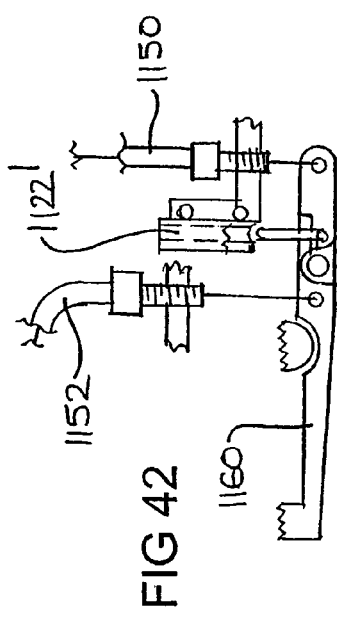
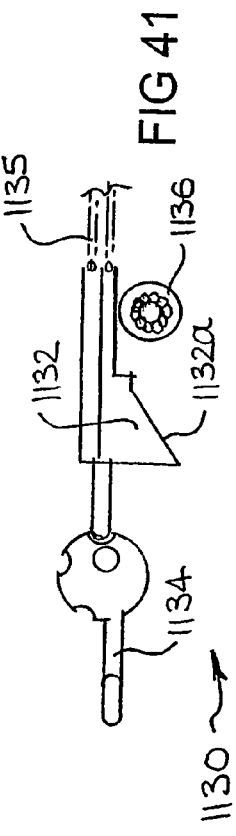

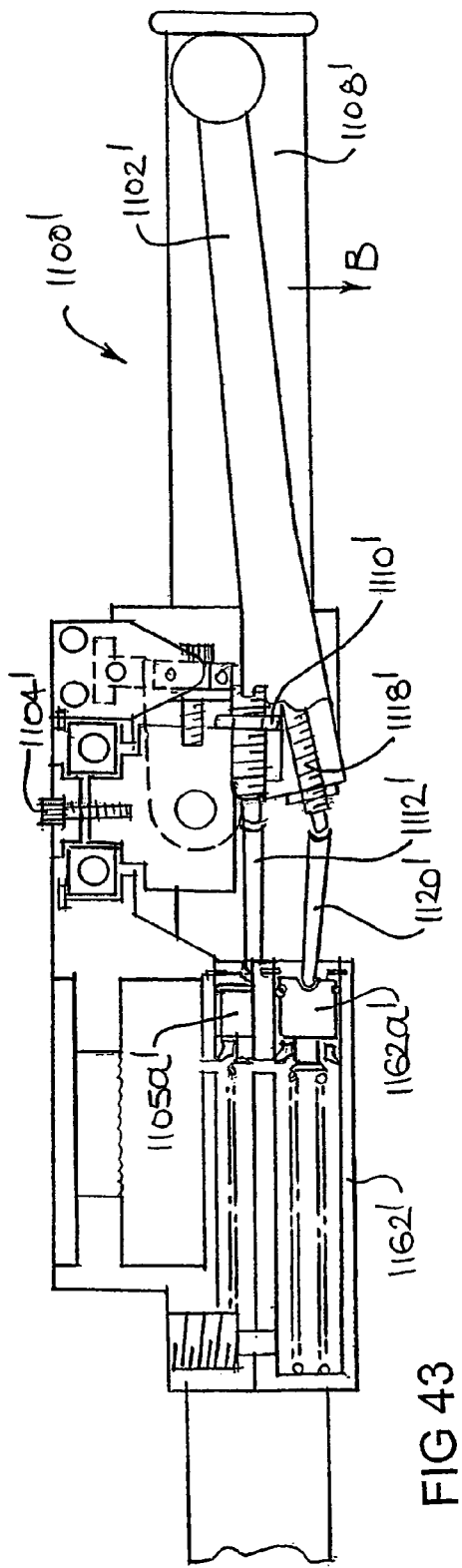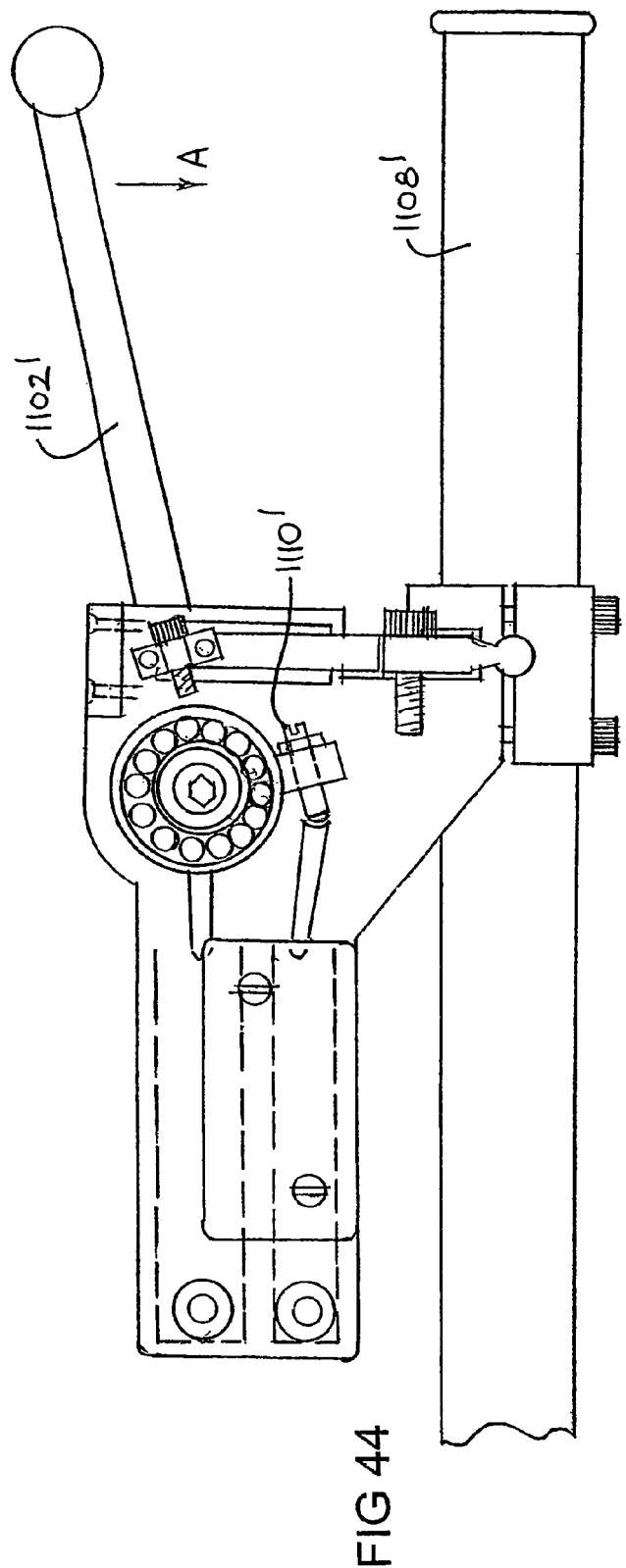
FIG 43
FIG 44

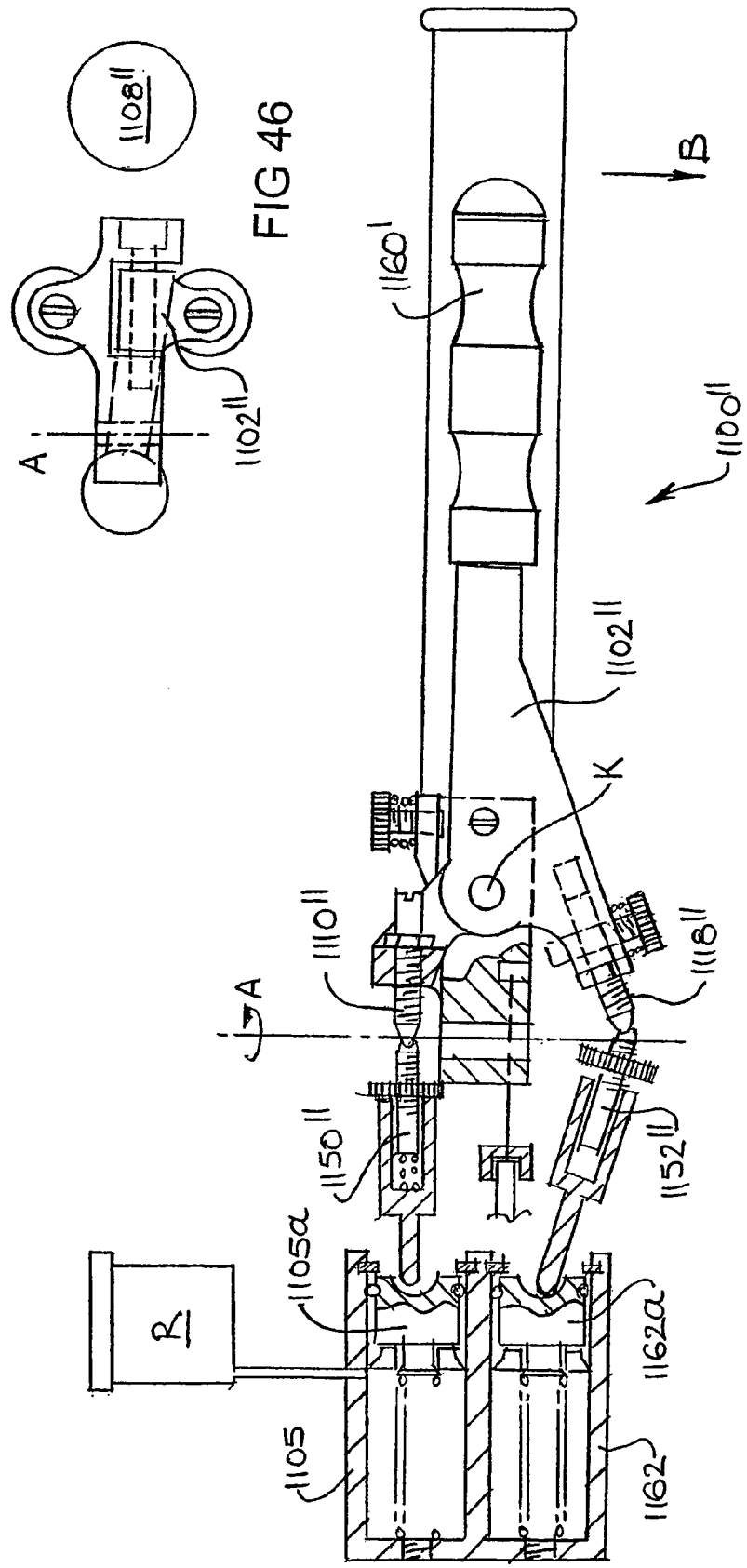

DUAL FUNCTION HANDLEBAR MOUNTED ACTUATOR

CROSS REFERENCE TO RELATED PATENT APPLICATIONS

The instant application claims priority to International Patent Application No.: PCT/AU2003/000970 with an International Filing Date of Aug. 1, 2003, and Australian Patent Application No.: 2002950568 filed on Aug. 2, 2002, Australian Patent Application No.: 2002951139 filed on Aug. 30, 2002, Australian Patent Application No.: 2002951187 filed on Sep. 4, 2002, Australian Patent Application No.: 2002951582 filed on Sep. 23, 2002, Australian Patent Application No.: 2002951674 filed on Sep. 26, 2002, Australian Patent Application No.: 2002951835 filed on Oct. 4, 2002, Australian Patent Application No.: 2002952076 filed on Oct. 16, 2002, Australian Patent Application No.: 2002952986 filed on Nov. 28, 2002, Australian Patent Application No.: 2002953591 filed on Dec. 31, 2002, Australian Patent Application No.: 2003900098 filed on Jan. 11, 2003, Australian Patent Application No.: 2003900708 filed on Feb. 18, 2003, and Australian Patent Application No.: 2003902763 filed on Jun. 4, 2003.

FIELD OF THE INVENTION

The invention relates to a dual function handlebar mounted actuator. The actuator has particular, but not exclusive, application in the motorcycle and all terrain vehicle industries.

BACKGROUND OF THE INVENTION

Motorised vehicles such a motor cycles are typically fitted with a hand operated clutch actuator and a foot operated rear brake actuator. Although such an arrangement is generally satisfactory for standard use, there are certain instances where it is disadvantageous and may even be viewed as being dangerous.

When negotiating difficult terrain on a motorcycle the rider is often required to adjust his body weight on the motorcycle or temporarily remove his feet from the rear brake foot pedal, in order to maintain balance of the motorcycle. When the rider's body weight is moved away from a standard seated position, for example when the rider is standing up and leaning forward, it can be difficult to operate a foot brake pedal effectively. If the rider has his foot off the brake pedal in order to better balance the motorcycle, the rear brake pedal cannot be actuated instantaneously by the rider. The delay in returning the foot onto the brake pedal before activating the brake may prove disastrous in some circumstances.

Furthermore, when a foot operated rear brake pedal is operated there is inevitably some body weight transfer to the brake pedal side which may upset the balance of the rider on difficult terrain or when traction is limited.

Injured or disabled riders may find it difficult or even impossible to ride a motorised vehicle with a foot operated rear brake and a hand operated clutch.

The present invention recognises that it would be desirable to provide a dual function handlebar mounted actuator. More particularly, it would be desirable to provide an arrangement that would combine the operation of the clutch function and the brake function of a motorised vehicle into a dual function handlebar mounted actuator.

The present invention also recognises that it may be advantageous to be able to simultaneously operate both the brake function and the clutch function. Most desirably, simultaneous operation of both the brake function and the clutch function would be achieved by operation of a single lever or actuator on the handle bar of the vehicle with the option of a conjunctive foot control.

WO 00/50295 describes an actuator for a motor-driven vehicle such as a motor cycle. The actuator includes a hand brake lever and a clutch lever mounted on a handle of the motor cycle. The hand brake lever and clutch lever are integrally mounted on the handle and are arranged so that the brake and clutch levers can be separately actuated for braking or disengaging of the clutch. Furthermore, the clutch and brake levers can be moved together, at the same time, by the rider's fingers for simultaneous braking and disengaging of the clutch.

The actuator of WO 00/50295 is disadvantageous because two fingers are required to operate it. Furthermore, it does not include an anti-stall capability because the brake lever has no mechanical connection to the clutch lever.

SUMMARY OF THE INVENTION

Generally, the present invention provides a dual function actuator arranged to be mounted on the handlebar of a vehicle, said actuator including means for operating a first function and means for operating a second function, said operating means being arranged so that said first and said second functions can be operated separately, and further arranged so that said first and second functions can be operated together so that operation of a combined function is achieved.

In one application of the invention, the first function is a clutch function and the second function is a brake function. The combined function is thus a combined clutch and brake function.

Throughout the following description and in the claims reference is made to a "clutch function" and to a "brake function". The term "clutch function" refers to the disengagement of a clutch device to disconnect the engine from its associated drive train. The term "brake function" refers to the engagement or initiation of a brake system to decrease vehicle speed.

The dual function actuator is arranged to be operated by a user's hand. However, it is envisaged that for safety reasons the actuator may be modified for conjunctive foot operation.

In one embodiment of the invention, said clutch function operating means is operated by a first action of the user and said brake function operating means is operated by a second action of the user, said first and second actions being arranged to overlap so as to achieve said combined clutch and brake function operation.

Typically, said first and second actions of the user are respective first and second movements of the user's hand or fingers on or against a lever. This movement may, for example, include movement of the lever or other actuator (e.g. pushing or pulling), or alternatively, the application of a pressure on a lever or other actuator.

Preferably, adjustment means are provided to enable variation of the point at which overlap of said combined clutch and brake function operation is achieved.

Indication means may be provided to indicate to the user when the brake function is initiated. This indication means may be in the form of a tactile indication to the user.

According to a first aspect of the present invention there is provided a dual function handlebar mounted actuator including means for operating a first function and means for operating a second function, said first and second function operating means being arranged for activation by movement of a hand operated lever arrangement and wherein said first and second function operating means are linked so that a combined first and second function can be activated.

Preferably, said first and second functions can be operated separately as well as together so that operation of a combined function is achieved.

Preferably, the first function is a clutch function and the second function is a brake function.

Adjustment means may be provided to adjust an activation point at which the respective clutch and brake functions are activated when said lever is moved in said first direction. Thus it will be appreciated that movement of the lever means in the first direction may initially only operate the brake function and that continued movement of the lever means in the first direction will then activate operation of the clutch function so that the combined clutch and brake function is operated.

In one embodiment of the invention, the lever arrangement includes a lever means incorporating a slide member arranged to enable the user's fingers to shift more readily from a first portion to a second portion of the lever means.

Preferably, said dual function actuator further includes a brake function linkage and a clutch function linkage which are interconnected by said lever means.

A friction adjustor may also be provided to enable the degree of friction between a portion of the actuator, such as a mount, and the brake linkage to be adjusted so that the brake linkage can be locked in position when a predetermined loading, typically in a downward direction, is applied to the slide member. This enables the braking function to be locked at a set force whilst the clutch function is varied.

According to a second aspect of the present invention there is provided a dual function handlebar mounted actuator including a master cylinder actuator and a bias valve, said master cylinder actuator being arranged so that actuation thereof results in a force application to the bias valve which is arranged to operate a first function, a second function or both the first and the second functions Preferably, the first function is a clutch function and the second function is a brake function.

Preferably, the dual function actuator also includes a bias valve actuator. The bias valve actuator being arranged to control a bias valve so as to bias the valve to operate the clutch function, the brake function or the combined clutch and brake function.

The bias valve preferably includes a piston which during use of the bias valve operates the clutch function and the brake function. To this end, the bias valve is connected to a clutch arrangement which includes a clutch port and a clutch return port and a brake arrangement which includes a brake port and a brake return port.

As the piston of the bias valve is actuated, the clutch function is operated, the brake return port is shut, the brake function is operated, the clutch port is shut and then, if desired, further travel of the piston will open the clutch port.

Adjustment means may be provided to the bias valve to provide a pre-set bias to the bias valve. The adjustment means may, for example, be adjusted to control the activation point of the combined clutch and brake function.

In one preferred form, the bias valve actuator may be used to override the operation of the adjustment means.

In one form of the invention, the master cylinder actuator and bias valve actuator are formed as separate lever means which are pivotally connected together. With such an arrangement, one lever means generates the force required to operate the clutch function and the brake function and the other lever means distributes the force to operate the desired clutch function or brake function.

In another arrangement of the invention, the master cylinder actuator and bias valve actuator are formed as a combined lever means, said lever means having a first portion, a second portion and a middle portion, said lever means being arranged so that movement of the first portion operates said master cylinder actuator, movement of the second portion operates said bias valve actuator and movement of the middle portion enables selective operation of either the master cylinder actuator or the bias valve actuator.

In another arrangement of the invention, the master cylinder actuator and bias valve actuator are formed as a single lever means, said lever means being arranged to move in a first direction to operate the master cylinder actuator and in a second direction to operate the bias valve actuator. For example, the lever means may be pulled towards the handlebar to operate the master cylinder actuator and pressed downwardly to operate the bias valve actuator.

According to a third aspect of the present invention there is provided a dual function handlebar mounted actuator including means for operating a first function and means for operating a second function, said first and second operating means being linked so that activation of the lever means in a first direction activates said first function operating means and further activation of said lever means in said first direction to an activation point activates said second function operating means.

Preferably, said first function is a clutch function and the second function is a brake function.

Preferably, said dual function actuator includes adjustment means for adjusting a brake function activation point. In one preferred form, the adjustment means includes an adjustable activating rod connected to the lever means and an adjustor cam. The adjustment means is arranged so that the activating rod can be adjusted, for example by increasing or decreasing its length, so that the positioning of the adjustor cam is varied, thereby adjusting the activation point of the brake function.

The lever means is preferably arranged to be activated by pulling the lever means towards the handlebar. For safety reasons, the dual function actuator may be activated conjunctively by a foot pedal.

In another arrangement of the invention, the lever means is arranged to be activated by a downward motion of the lever.

Preferably, actuation of the lever means in a first direction (A) operates the clutch function and continued operation of the lever means in the first direction operates the brake function.

Preferably, actuation of the lever means in a second direction (B) increases the leverage to the clutch function and/or increases free play in the clutch arrangement so as to delay operation of the clutch function. Preferably, continued operation of the lever means in the second direction operates the brake function.

Adjustment means are preferably provided in the clutch and the brake arrangements to enable adjustment of the free play in the respective arrangements. By adjusting the respective adjustment means it is possible upon actuation of the lever means in either the first direction (A) or the second direction (B) to operate both the clutch function and the brake function so as to achieve a combined brake and clutch function. The point of initiation of the combined brake and clutch function can be varied by the respective adjustment means.

In one embodiment of the third aspect of the invention, actuation of the lever means in the first direction (A) requires the user to move the lever means in an inwards direction. Actuation of the lever means in the second direction (B) requires the user to move the lever means in a sideways direction either right or left.

In an alternative embodiment of the third aspect of the invention, actuation of the lever means in the first direction (A) requires the user to move the lever means in an inward direction towards a handlebar or the like on which the actuator is mounted. Actuation of the lever means in the second direction (B) requires the user to move the lever means in a downward direction.

According to a fourth aspect of the present invention there is provided a dual function handlebar mounted actuator for use with a vehicle having an engine, said actuator including a hand operated lever means for operating a brake function and a clutch function, means for sensing the R.P.M of the engine and wherein said lever means is arranged so that when the sensed R.P.M is above a first predetermined value movement of a first portion of the lever means will result in operation of the brake function and wherein when the sensed R.P.M. is below the first predetermined value movement of the first portion of the lever means will result in operation of the brake function and the clutch function so as to prevent stalling of the engine.

Preferably, the actuator is arranged so that initial movement of a second portion (A) of the lever means results in operation of the clutch function independently of the brake function, and that further movement of the second portion (A) of the lever means results in operation of both the clutch function and the brake function.

Preferably, indication means is provided to signal to the user that the brake function has been initiated when the second portion of the lever means is moved. The indication means may include a tactile indication such as achieved by a part of the lever means striking a stop.

Means is preferably provided to reduce the travel of the second portion of the lever means to fully actuate the brake function once brake function is initiated.

Adjustment means may be provided to adjust the point at which the clutch function is disengaged when the first portion (B) of the lever means is moved. Adjustment means may also be provided to adjust the point at which the brake function is initiated when the second portion (A) of the lever means is moved.

The actuator preferably further includes a brake function control unit arranged to lock on the brake function when the engine R.P.M. is above the first predetermined value.

Preferably, the actuator may be arranged, for safety reasons, so that brake function can be activated by a foot operation pedal.

According to an fifth aspect of the present invention there is provided a dual function handlebar mounted actuator for a vehicle having an engine including a hand operated lever means and a selector means, said lever means arranged so that when the selector means is in a first position (C) movement of the lever means in a first direction (A) operates a clutch function and continued movement of the lever means in the first direction operates a brake function, said lever means further arranged so that movement of the lever means in a first direction when the selector means is in a second position operates the brake function and will also operate the clutch function when the R.P.M. of the vehicle's engine falls below a predetermined value.

Preferably, adjustment means may be provided so that when the selector means is in the second position (B) and the lever means is moved in the first direction the point of activation of the brake function and the clutch function can be adjusted. In this manner the brake and clutch functions can be arranged to occur simultaneously.

Preferably, the actuator also includes a control unit. The control unit includes a brake solenoid, means for sensing the R.P.M of an engine and a R.P.M switch. When the R.P.M of the engine falls below a predetermined value the R.P.M switch is activated. This opens the brake solenoid which allows the lever means to move further inwardly towards the handlebar. Due to the mechanical connection between the clutch and brake master cylinders, the clutch will be disengaged (i.e. the clutch function will be activated) so as to prevent stalling of the engine.

In one form of the fifth aspect of the invention, the force required for operation of the clutch function and the brake function can be partially or fully provided by operation of a foot pedal.

According to a sixth aspect of the present invention there is provided a dual function handlebar mounted actuator including hand operated lever means arranged for movement in a first direction (A), said movement serving to operate a first function, said lever means being further arranged for movement in a second direction (B), said movement serving to operate a second function, and wherein the actuator further includes a combined function means arranged so that when said lever means is moved in said first direction to an initiation point said combined function means causes said lever means to also move in said second direction so that both the brake function and the clutch function are operated.

Preferably, adjustment means is provided to adjust the initiation point at which the lever means is caused by said combined function means to move in the second direction.

Preferably, said combined function means includes an overlap adjustor arrangement. The overlap adjustor arrangement preferably includes a cam plate, an overlap adjustor and a cam follower bearing arranged such that as the cam follower bearing moves along a cam surface on the cam plate, the lever means is moved in a downward direction so as to operate a brake function whilst the clutch function is being operated.

In one form of the sixth aspect of the invention, the actuator may be moved in the second direction via a hand movement of the user or by operation of a foot pedal, or a combination of both actions.

According to a seventh aspect of the present invention there is provided a dual function handlebar mounted actuator, said actuator including lever means arranged for movement in a first direction, said movement in said first direction operating a first function, and wherein when said lever means is moved in said first direction so as to reach a second function initiation point operation of a second function is initiated, said actuator further including means for operating said second function independently of the first function.

Preferably, the first function is a clutch function and the second function is a brake function.

Preferably, the actuator is arranged so that when said brake function is operated by said operating means so as to reach a clutch initiation point, operation of the clutch function is initiated.

Preferably, adjustment means is provided to adjust the brake initiation point and/or the clutch initiation point.

According to an eight aspect of the present invention there is provided an actuator arrangement including a lever movable between a first and a second position and a master cylinder having a piston, said lever being arranged so that when it is moved towards said second position said piston is driven from an initial position to thereby increase pressure within the master cylinder and wherein when said lever is released the pressure within the master cylinder is arranged to return the piston towards the initial position, said piston being returned fully to the initial position upon movement of the lever to the first position.

Preferably, an adjustor member is connected between the lever and the master cylinder. The adjustor member is arranged to enable some free play between the movement of the lever and movement of the piston of the master cylinder.

According to a ninth aspect of the invention there is provided a dual function handle mounted actuator including a lever means pivotally connected to a mount, said lever means arranged for connection to a first function operating means, actuation means pivotally connected to said mount and arranged for connection to a second function operating means, said lever means and said actuation means being arranged so that when said lever means is pivoted to a first point a first function is operated and when said lever means is pivoted to a second point the first function and a second function are operated.

According to tenth aspect of the present invention there is provided a dual function handlebar mounted actuator including a primary lever, a secondary lever, a pull member, an arm member, first function operating means and second function operating means, said primary and secondary levers being pivotally connected together at a first pivot point and said secondary member and said arm member both being arranged for pivotal movement about a second pivot point, and wherein said pull member is connected between said primary lever and said arm member so that when said primary lever is pivoted about said first pivot point the arm member is caused to pivot about said second pivot point and said first function operating means is caused to operate said first function and when said primary lever is moved in a first direction from a point adjacent the first pivot point the secondary lever is caused to pivot about said second pivot point and said second function operating means is caused to operate said second function.

According to an eleventh aspect of the present invention there is provided a dual function handlebar mounted actuator including a main lever, a first function operating arm and a second function operating arm, said main lever being pivotally connected to said first function operating arm and wherein movement of said first function operating arm in a first direction results in operation of a first function, movement of said main lever in a second direction results in operation of a second function and continued movement of said first function operating arm in said first direction results in operation of both the first and second functions.

DESCRIPTION OF THE DRAWINGS

Embodiments of the invention will now be described, by way of example only, with reference to the accompanying drawings in which:

FIG. 1 is a part cross sectional front view of a dual function actuator in accordance with an embodiment of the invention;

FIG. 2 is a top view of the dual function actuator shown in FIG. 1;

FIG. 10 is a part cross sectional view of another form of dual function actuator which incorporates the hydraulic system shown in FIG. 7;

FIG. 11 is a top view of the dual function actuator shown in FIG. 10;

FIG. 21 is a part cross sectional front view of a dual function actuator in accordance with another embodiment of the invention;

FIG. 22 is a top view of the actuator shown in FIG. 21;

FIG. 23 is a part cross sectional front view of a modified form of the dual function actuator shown in FIGS. 21 and 22;

FIG. 24 is a top view of the actuator shown in FIG. 23;

FIG. 25 is a part cross sectional view of a dual function actuator in accordance with an embodiment of the invention;

FIG. 26A illustrates a foot operated pedal which may be used with the actuator shown in FIGS. 25 and 26;

FIG. 30 is a part cross sectional front view of an actuator in accordance with another embodiment of the invention;

FIG. 31 is a top view of the actuator shown in FIG. 30;

FIG. 35 is a Table showing the valve conditions for the complex control system shown in FIG. 34;

FIG. 36 is a Table showing the valve condition for a simple control system based on the control system shown in FIG. 34;

FIG. 38 is a part cross sectional front view of an actuator in accordance with another embodiment of the invention;

FIG. 40 is an end view of the actuator shown in FIGS. 38 and 39;

FIG. 41 is a side view of an overlap adjustor for use with the actuator shown in FIGS. 38 and 39;

FIG. 42 is a side view of an optional foot operated pedal for operation of the actuator shown in FIGS. 38 and 39;

FIG. 43 is a part cross sectional front view of an actuator similar to that shown in FIGS. 38 and 39;

FIG. 44 is a top view of the actuator shown in FIG. 43;

FIG. 45 is a part cross sectional front view of another form of dual function handlebar mounted actuator;

FIG. 46 is an end view of the actuator shown in FIG. 45 without the mount;

DETAILED DESCRIPTION OF THE PREFERRED EMBODIMENTS

Figure 3:
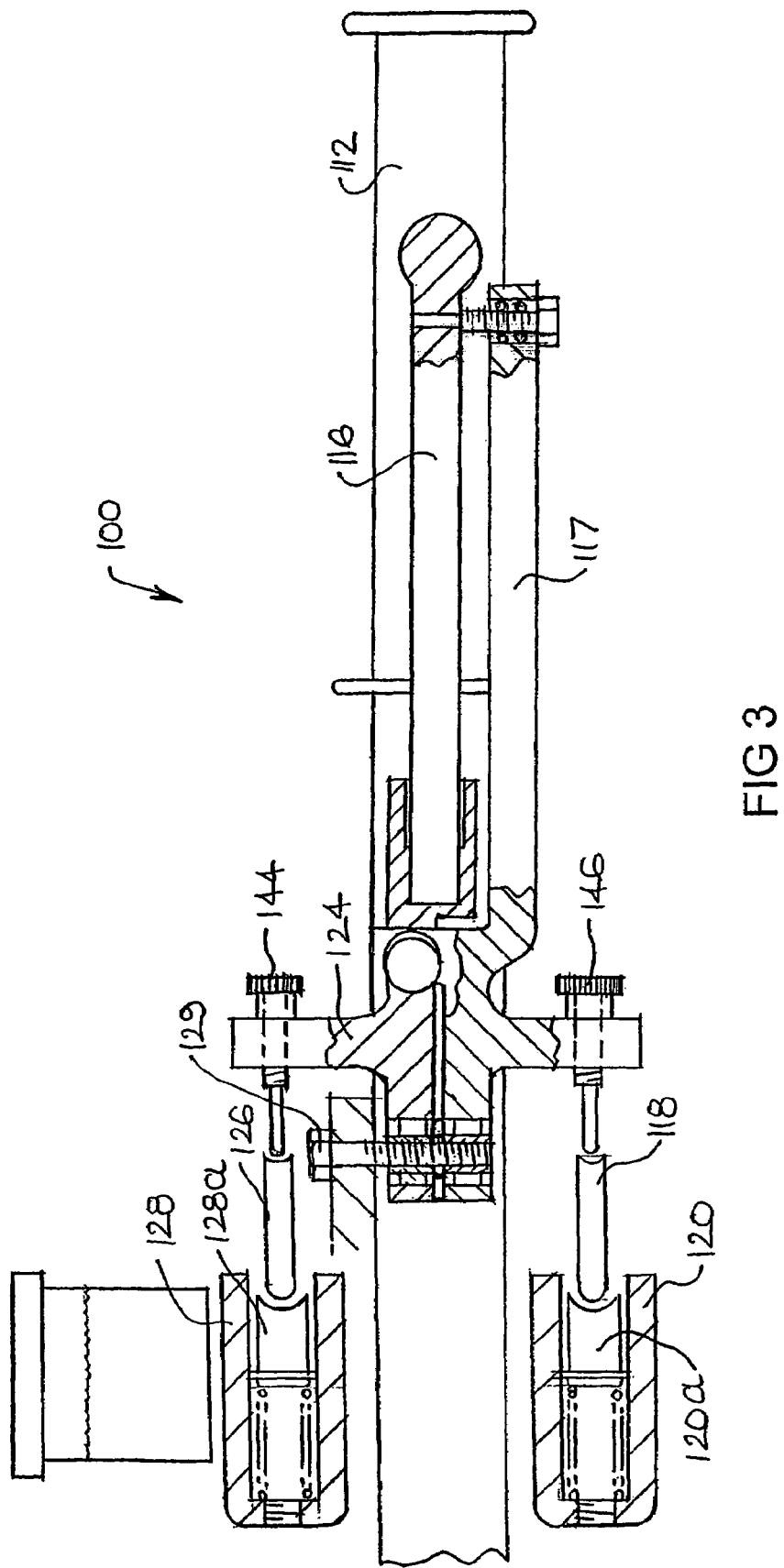
FIG. 3 is a part cross sectional front view of a dual function actuator in accordance with an embodiment of the invention.

The embodiments of the invention described hereafter relate to dual function handlebar mounted actuators, wherein the dual function typically includes a brake function and a clutch function. Notwithstanding this, it is to be understood that dual function handlebar mounted actuators which actuate other functions of a vehicle are within the scope of this invention.

As mentioned above, the following description makes reference to a number of different dual function handlebar mounted actuators. To aid the description of these different actuators and to facilitate review and understanding of this description, the various actuators have been described under different sub-headings referred to as "1$^{st}$ Forms", "2$^{nd}$ Forms", "3$^{rd}$ Forms" and "4$^{th}$ Forms". The inclusion of any embodiment under any one of these "Forms" in no way limits that embodiment in any manner.

1$^{st}$ Forms

FIGS. 1 and 2 illustrate a dual function actuator 10 in accordance with a first embodiment of the invention. The actuator 10 is mounted on the handlebar 12 of a motorcycle (not shown) by means of a mount 14. The actuator 10 has a single lever 16 which is able to operate both a brake function and a clutch function of the motorcycle.

As illustrated by the arrows marked A and B as shown in FIG. 1, the lever 16 is arranged for movement in two directions. Movement in the direction A is achieved by pulling the lever 16 towards the handlebar 12. Movement in the direction B is achieved by pushing the lever 16 downwardly towards the ground.

When the lever 16 is moved in the direction A, a combined brake and clutch function is operated. This means that both a brake function of the motorcycle and a clutch function are operated. It will be appreciated that the term "clutch function" as used throughout the description of the preferred embodiments refers to the disengagement of a clutch device to disconnect the engine of the motorcycle (or other vehicle) from its associated drive train. Thus, when the clutch function is operated, it is possible to change the gear of the engine of the motorcycle (or other vehicle) and to also prevent stalling of the vehicle's engine.

As shown in FIGS. 1 and 2, the lever 16 is pivotally mounted to the mount 14 by means of a pivot pin 18. This pivotal connection enables the lever 16 to be moved in the direction A. Spherical bearings 20, 22 and 24 enable the lever 16 to be moved in the direction B.

The lever 16 is connected at connection points 28, 30 to adjustors 36, 38. The adjustors 36, 38 operate actuators 37a, 37b connected to the pistons 32a, 34a of the respective hydraulic master cylinders 32, 34. Thus, it will be appreciated that the lever 16 provides a mechanical link between the adjustors 36, 38 that activate the brake and clutch functions. This mechanical link between the clutch and brake functions is of importance because it allows a consistent overlap or separation between the clutch and the brake functions.

In this embodiment, master cylinder 34 operates a brake function, that is, a braking system of the motorcycle. Master cylinder 32 operates a clutch function of the motorcycle, that is, it is arranged to enable disengagement of the clutch from the drive train of the motorcycle's engine.

The adjustors 36, 38 are arranged to enable the activation points of both the clutch function and the brake function to be altered so as to allow an overlap of the respective clutch and brake function to achieve a combined brake and clutch function. It will thus be appreciated that by adjusting adjustors 36, 38 it is possible to adjust the point at which either the clutch function or the brake function is activated.

It is recognised that when moving the lever 16 in direction A (i.e. to achieve a combined brake and clutch function) it is desirable to indicate to the user when the brake function is actually initiated. To this end, a tactile indication of the activation of the brake function can be provided by using a spring loaded ball and detent.

Although not in illustrated in FIGS. 1 and 2, hydraulic connections are provided to the braking system (not shown) from the master cylinder 34 and to the clutch (not shown) from the clutch master cylinder 32. A fluid reservoir 40 provides fluid to the hydraulic master cylinders 32, 34.

Figure 4:
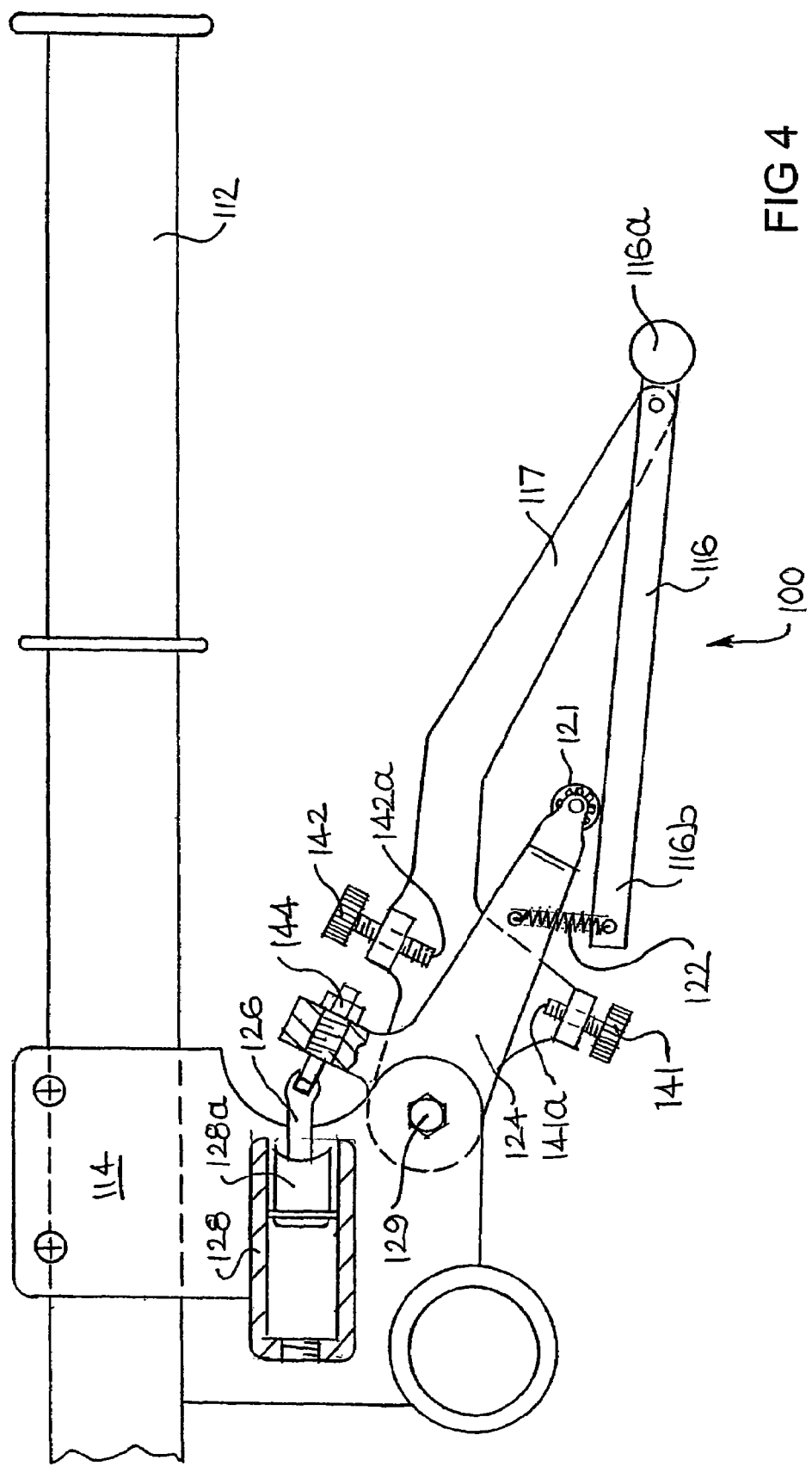
FIG. 4 is a top view of the dual function actuator shown in FIG. 3.

FIGS. 3 and 4 illustrate a combined brake and clutch actuator 100 in accordance with an embodiment of the invention. The actuator 100 is mounted on a handlebar 112 of a motorcycle by a mount 114. The actuator 100 has a lever 116 which is operated by a user in order to operate a brake function, a clutch function or a combined brake and clutch function. The lever 116 includes a first portion 116a and a second portion 116b. The first portion 116a of the lever 116 is pivotally connected to a brake linkage 117 which, as best shown in FIG. 3, is connected to a brake actuator 118 and a brake master cylinder 120.

The second portion 116b of the lever 116 is held against a roller 121 via a spring 122. The roller 121 is mounted on the end of a clutch linkage 124. The clutch linkage 124 is connected to an actuator 126 which is in turn connected to a piston 128a of a clutch master cylinder 128.

The brake linkage 117 and clutch linkage 124 are each pivotally connected to the mount 114 at pivot point 129. Accordingly, when the first portion 116a of the lever 116 is pulled towards the handlebar 112, the brake linkage 117 is caused to pivot about pivot point 129, which causes the brake actuator 118 to drive the piston 120a of the brake master cylinder 120. This results in the brake function of the motorcycle being operated.

Mounted on the brake linkage 117 is a clutch activation member 141. The clutch activation member 141 is shown in FIG. 4 as a screw threaded member having a lower end 141a which is arranged to contact the clutch linkage 124. As the brake linkage 117 pivots about the pivot point 129, the lower end 141a of the clutch activation member 141 will push downwardly on the clutch linkage 124 causing it to also pivot about pivot point 129. In this manner the clutch function of the vehicle is operated. Accordingly, stalling of the vehicle's engine is prevented when the brake function is applied because the clutch function will automatically be activated. Thus, this combined brake and clutch actuator 100 includes an "anti stall" feature.

It will be appreciated that by adjusting the positioning of the clutch activation member 141 it is possible to adjust the point at which activation of the clutch function commences.

When the lever 116 is pulled towards the handlebar 112 from the second portion 116b, the clutch linkage 124 is caused to pivot about pivot point 129, which causes the clutch actuator 126 to drive the clutch piston 128a of the clutch master cylinder 128. This results in activation of the clutch function of the motorcycle.

When the clutch linkage 124 rotates about pivot point 129, the roller 121 mounted at the top end of the clutch linkage 124 rolls along the underside of the lever 116 to control the movement of the clutch linkage 124.

As lever 116 is pressed downwardly at the second portion 116b, the clutch linkage 124 will continue to pivot about pivot point 129 until its strikes a brake activation member 142. When the clutch linkage 124 strikes the brake activation member 142, the brake linkage 117 is also caused to pivot about the pivot point 129. This results in operation of the brake function. Thus, it will be appreciated, that pulling the second portion 116b of the lever 116 towards the handlebar 112 will initially operate the clutch function and will then, when the clutch linkage 124 strikes the brake activation member 142, cause the brake function to be operated.

The brake activation member 142 is shown in FIG. 3 as a screw threaded member having an upper end 142a which is arranged to contact the clutch linkage 124. It will be appreciated that by adjusting the positioning of the brake activation member 142 it is possible to adjust the point at which activation of the brake function commences.

It will also be appreciated that if the lever 116 is pulled towards the handlebar 112 from a position between the first and second portion 116a, 116b, it will be possible to bias between both the brake function and the clutch function.

Tactile indication of the initiation of the brake function can be provided by using a spring loaded ball and detent or any other suitable mechanism.

It will be appreciated that it is also possible to adjust the activation point of both the brake function and the clutch function by virtue of the adjustors 144 and 146. These adjustors 144, 146 are respectively connected to the clutch actuator 126 and the brake actuator 118. It will also be appreciated that the clutch activation member 141 and the brake activation member 142 provide a link between the means for operating the brake and clutch functions.

Figure 5:
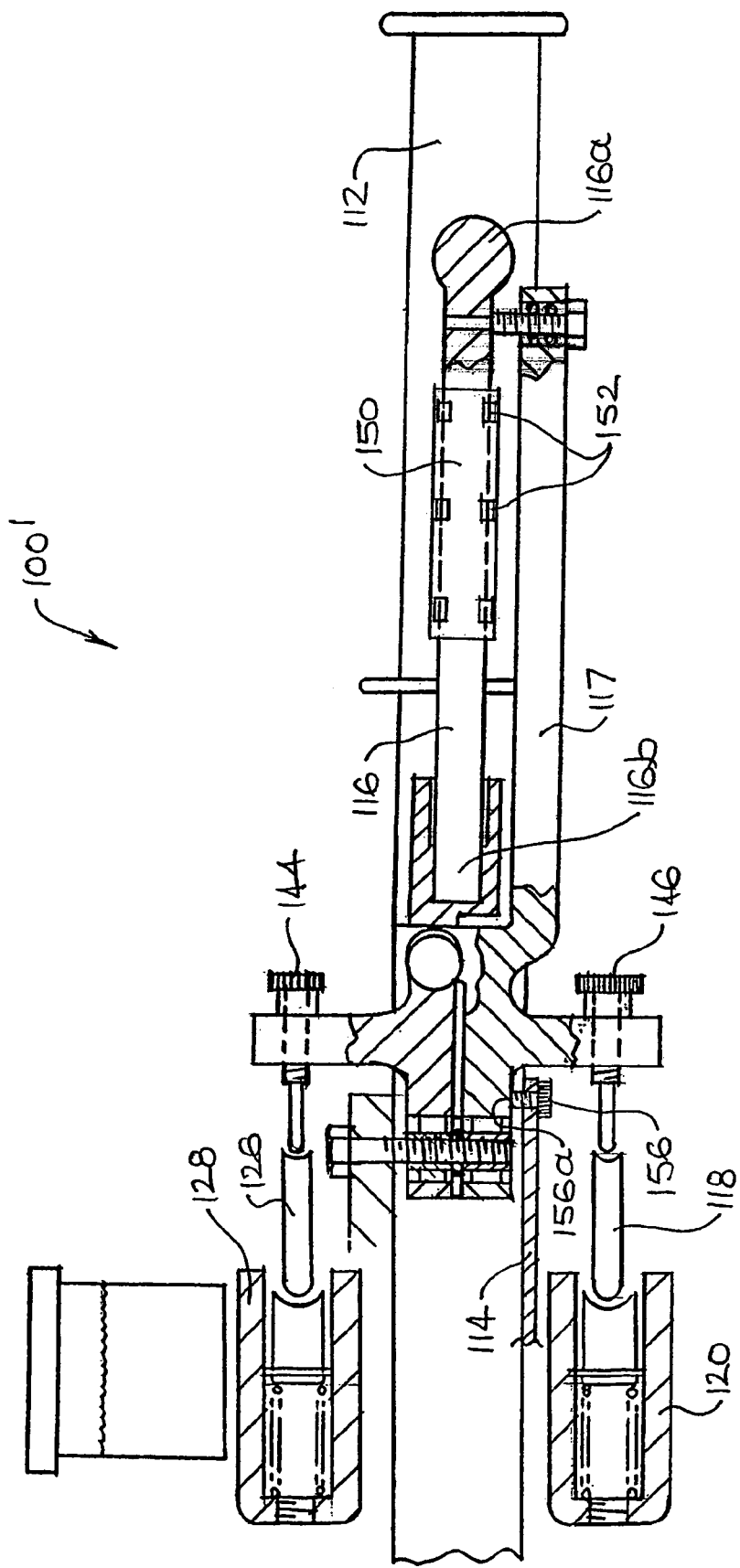
FIG. 5 is a part cross sectional view of another form of dual function actuator.
Figure 6:
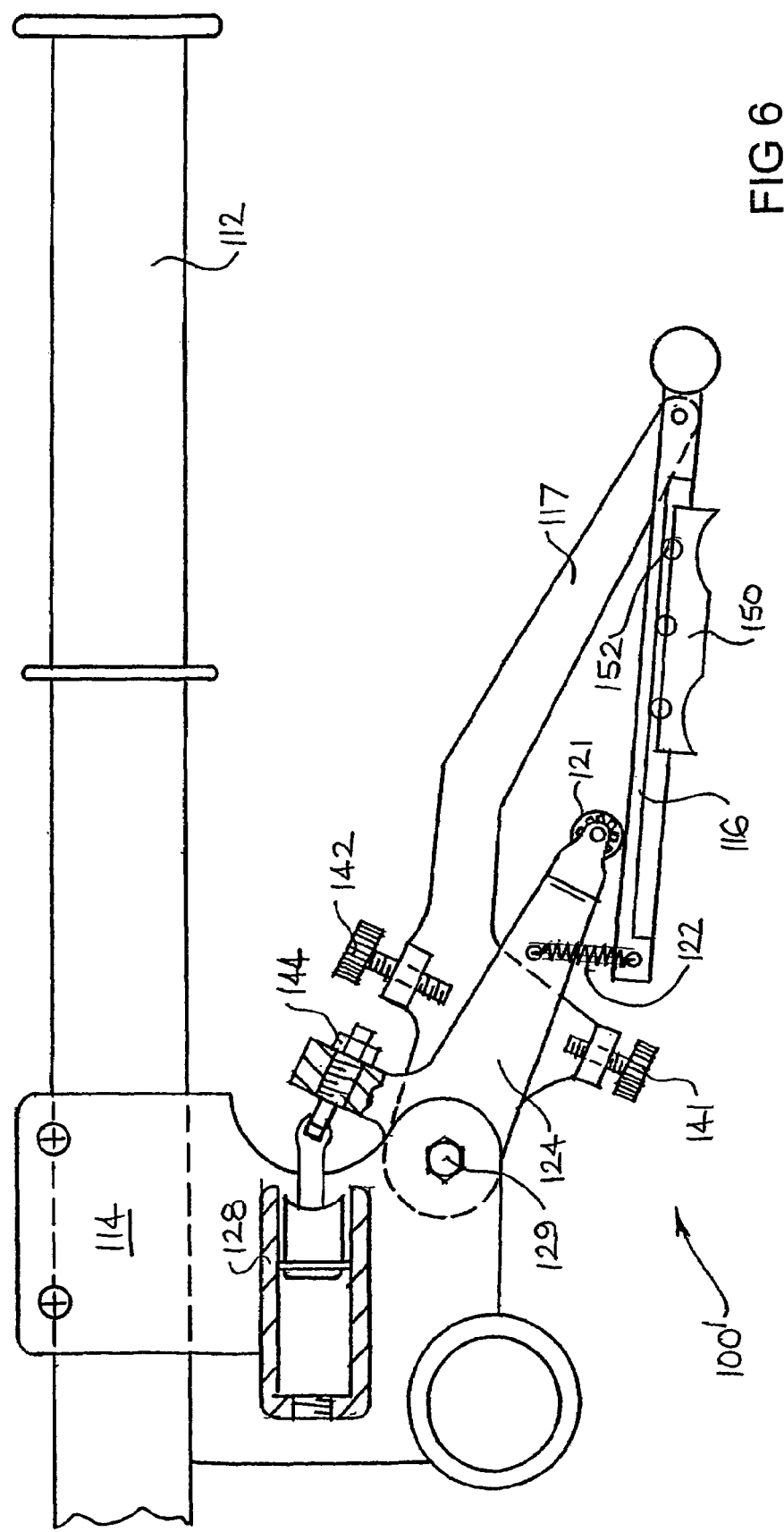
FIG. 6 is a top view of the dual function actuator shown in FIG. 5.

FIGS. 5 and 6 illustrate a modified form of the actuator 100 shown in FIGS. 3 and 4. The actuator 100' shown in FIGS. 5 and 6 has the same basic form as the actuator 100 but includes a slide 150 arranged for sliding movement along the lever 116. To this end, a series of bearings 152 are provided on the underside of the slide 150. The slide 150 facilitates a user's shift between operating the lever 116 at the first portion 116a and operating the lever 116 at the second portion 116b.

The actuator 100' also includes a friction adjustor 156 arranged to adjust the friction between the brake linkage 117 and the mount 114. The friction adjustor 156 is a threaded member having an inner end 156a arranged to contact a portion of the brake linkage 117. By adjusting the friction adjustor 156 it is possible to impart sufficient friction to lock the brake linkage 117 in a position relative to the handlebar 112 when downward pressure is exerted on the slide 150. This enables a user to lock the brake function at a set force and then alter the clutch function, by moving the lever 116 towards or away from the handlebar 112. The brake linkage 117 may be locked in such a position that only clutch function is operated upon movement of the lever 116.

$2^{nd}$ Forms

Figure 7:
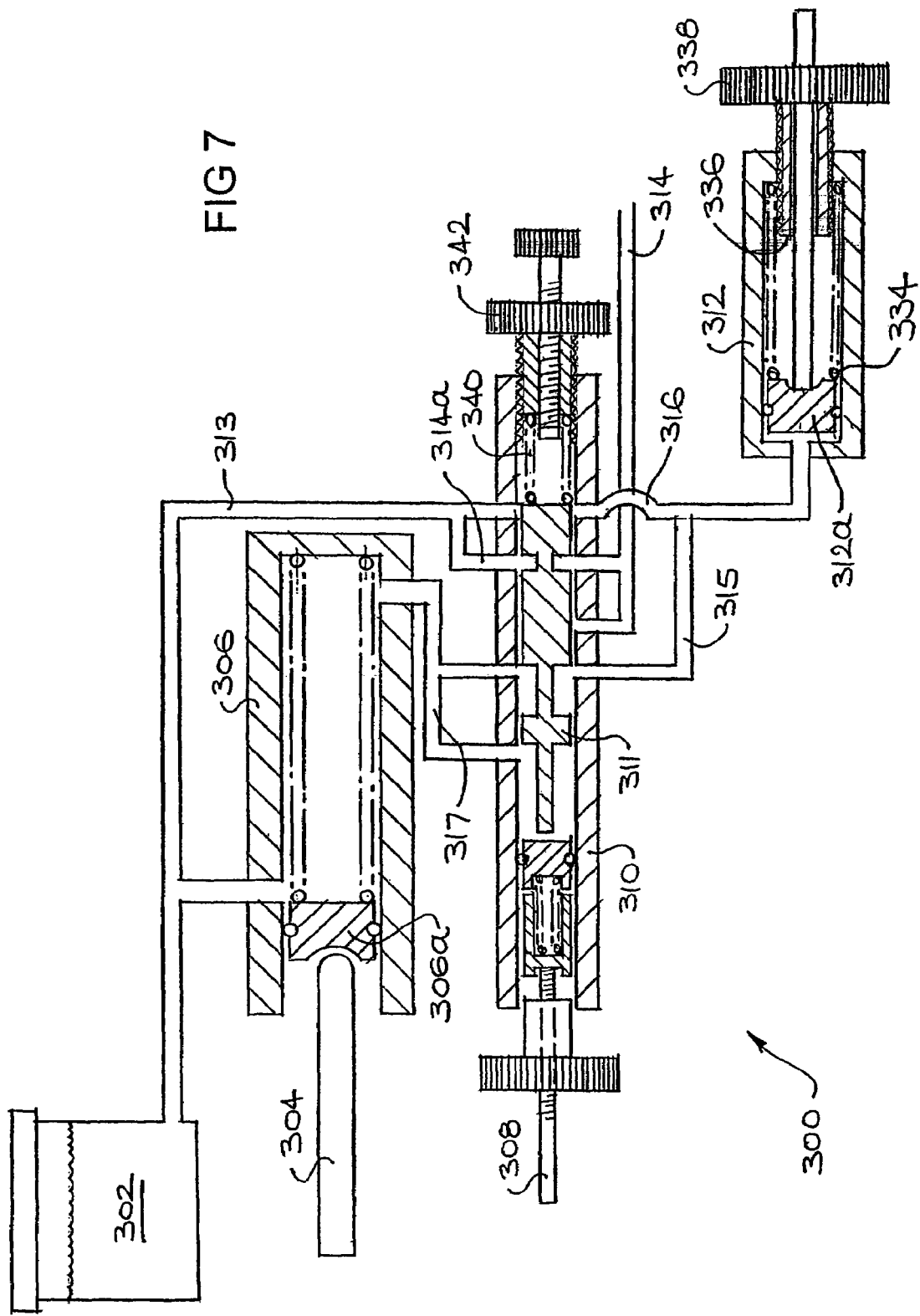
FIG. 7 is a schematic illustration of a hydraulic system for combining the clutch and brake functions of a vehicle.

FIG. 7 illustrates a hydraulic system 300 which facilitates combining the clutch and brake functions of a vehicle. The hydraulic system 300 includes a fluid reservoir 302, a master cylinder actuator 304, a master cylinder 306, a bias valve actuator 308, a bias valve 310, a bias valve piston 311 and a clutch slave cylinder 312. The hydraulic system 300 further includes a return fluid line 313, a brake fluid line 314 to a braking system (not shown), a clutch fluid line 315, a clutch return line 316, and a bias valve line 317.

Figure 8:
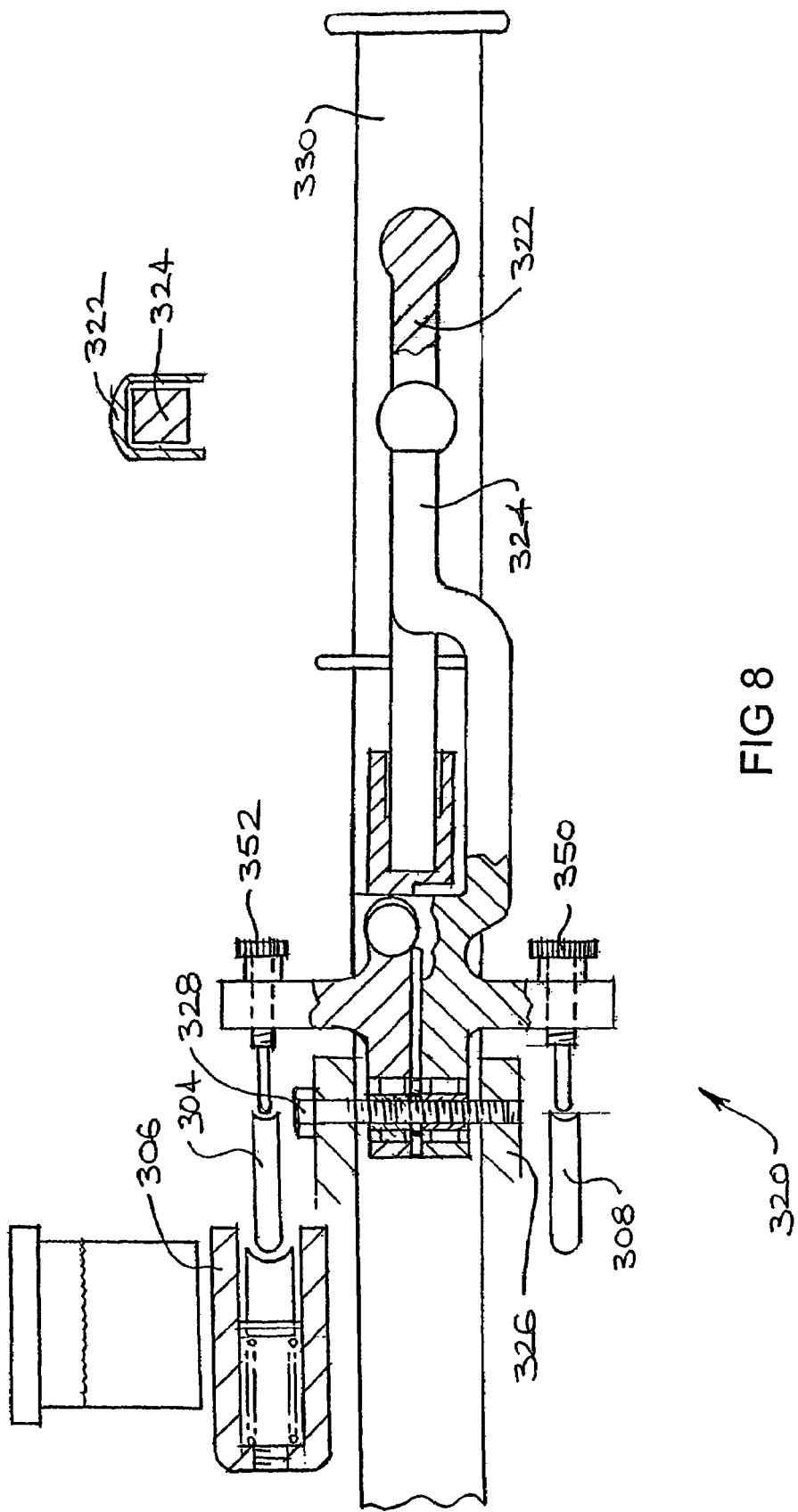
FIG. 8 is a part cross sectional view of a dual function actuator which incorporates the hydraulic system shown in FIG. 7.
Figure 9:
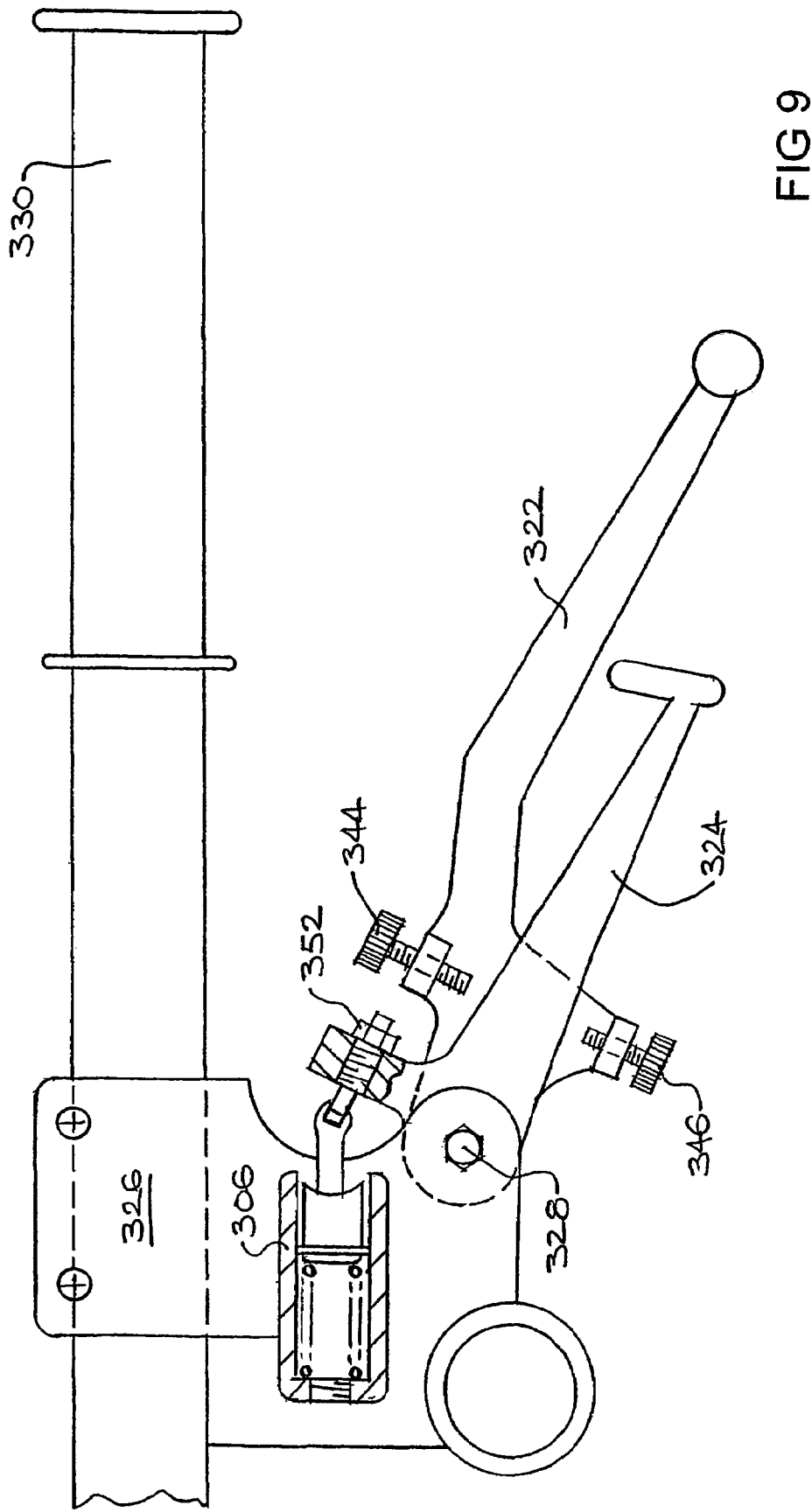
FIG. 9 is a top view of the dual function actuator shown in FIG. 8.

FIGS. 8 and 9 illustrate a combined brake and clutch actuator which incorporates the hydraulic system 300 shown in FIG. 7. The actuator 320 shown in FIGS. 8 and 9 includes a master cylinder lever 322 and a bias valve lever 324. Both the master cylinder lever 322 and bias valve lever 324 are pivotally connected to a mount 326 at pivot point 328. The mount 326 is connected to a handlebar 330 of a vehicle (not shown).

When the master cylinder lever 322 is pulled towards the handlebar 330, the master cylinder actuator 304 drives the piston 306a thereby increasing hydraulic pressure within the master cylinder 306. This increase in hydraulic pressure pressurises the fluid in the bias valve line 317, which in turn increases the pressure within the clutch fluid line 315. This increased pressure drives the clutch cylinder piston 312a to the right against the bias of the spring 334 of the clutch slave cylinder 312 thereby activating the clutch function of the vehicle. The clutch cylinder piston 312a will continue to move in this direction until it contacts the piston stop 336. The positioning of the piston stop 336 within the clutch slave cylinder 312 is controlled by the piston stop adjuster 338.

When the clutch cylinder piston 312a is in contact with the piston stop 336, continued operation of the master cylinder lever 322 will further increase the pressure within the master cylinder 306. This further increase in fluid pressure will cause the bias valve piston 311 of the bias valve 310 to move towards the right against the bias of the spring 340. As the bias valve piston 311 moves to the right it closes the brake return line 314a and the resulting increased pressure in the brake line 314 operates the brake function of the vehicle. The bias valve piston 311 then closes the clutch line 315 and then opens the clutch return line 316. This releases the pressure holding the clutch piston 312a against the piston stop 336 and thereby the clutch function is discontinued, whilst brake function is maintained.

When the bias valve lever 324 is pulled towards the handlebar 330, the bias valve piston 311 is pushed to the right against the bias of the spring 340. In this position, the bias valve piston 311 closes the brake return line 314a and the resulting increased pressure in the brake line 314 operates the brake function of the vehicle. If the bias valve lever 324 is pulled further towards the handlebar 330 so that the bias valve lever 324 strikes an activation member 344, continued movement of the bias valve lever 324 will also result in movement of the master cylinder lever 322 towards the handlebar 330.

The lever 322 generates the force to operate the brake and clutch functions whilst the bias valve 310 distributes the force to the desired brake or clutch function. Pulling the lever 322 towards the handlebar 330 will initially operate the clutch function. Further travel of the lever 322 towards the handlebar 330 will then operate the brake function. If the bias valve 310 is operated and the lever 322 is pulled towards the handlebar 300, the brake function will be operated. Further travel of the lever 322 towards the handlebar 330 will then cause the clutch function to be operated.

The spring 340 in the bias valve 310 is adjusted by a spring tension adjuster 342. By adjusting the tension of the spring 340 it is possible to adjust the amount of force required to move the bias valve piston 311 to the right so as to initiate a brake function. This means that it is possible to adjust the tension in the spring 340 so that brake function can be initiated before the clutch piston 312a actually contacts the piston stop 336 and discontinues the clutch function. Thus initiation of the brake function whilst the clutch function is still in operation (i.e. a combined brake and clutch function) can be achieved.

Similarly, by adjusting the tension in the spring 340, it is possible to "bias" the bias valve 310 to towards the brake function. This means that less movement of the bias valve lever 324 or the master cylinder lever 322 is required to achieve operation of the brake function.

It will also be appreciated that when the master cylinder lever 322 is pulled towards the handlebar 330, an activation member 346 mounted on the lever 322 will come into contact with the bias valve lever 324 causing it to also pivot about pivot point 328.

Adjustors 350, 352 are provided to enable the adjustment of the activation points of the bias valve 310 and the master cylinder 306.

FIGS. 10 and 11 illustrate an actuator 400 similar to the actuator 100 previously described and shown in FIGS. 1 and 2. However, the actuator 400 has been modified to incorporate the hydraulic system 300 shown in FIG. 7.

Figure 12:
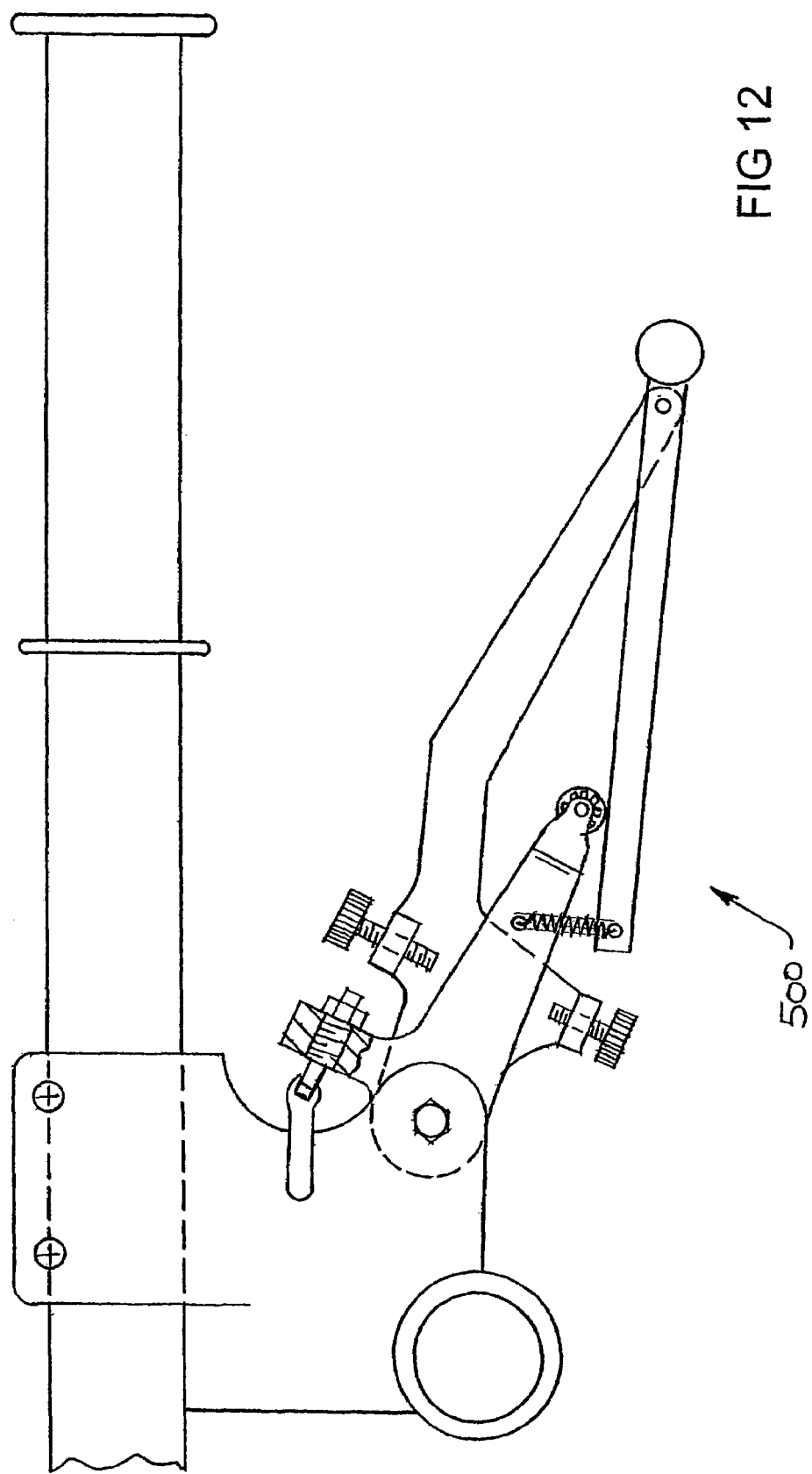
FIG. 12 is a top view of another form of dual function actuator incorporating the hydraulic system shown in FIG. 7.

FIG. 12 illustrates another form of actuator 500. The actuator 500 is similar to the actuator 100 (see FIGS. 3 and 4) described previously. However, the actuator 500 has been modified to incorporate the hydraulic system 300 shown in FIG. 7.

3$^{rd}$ Forms

Figure 13:
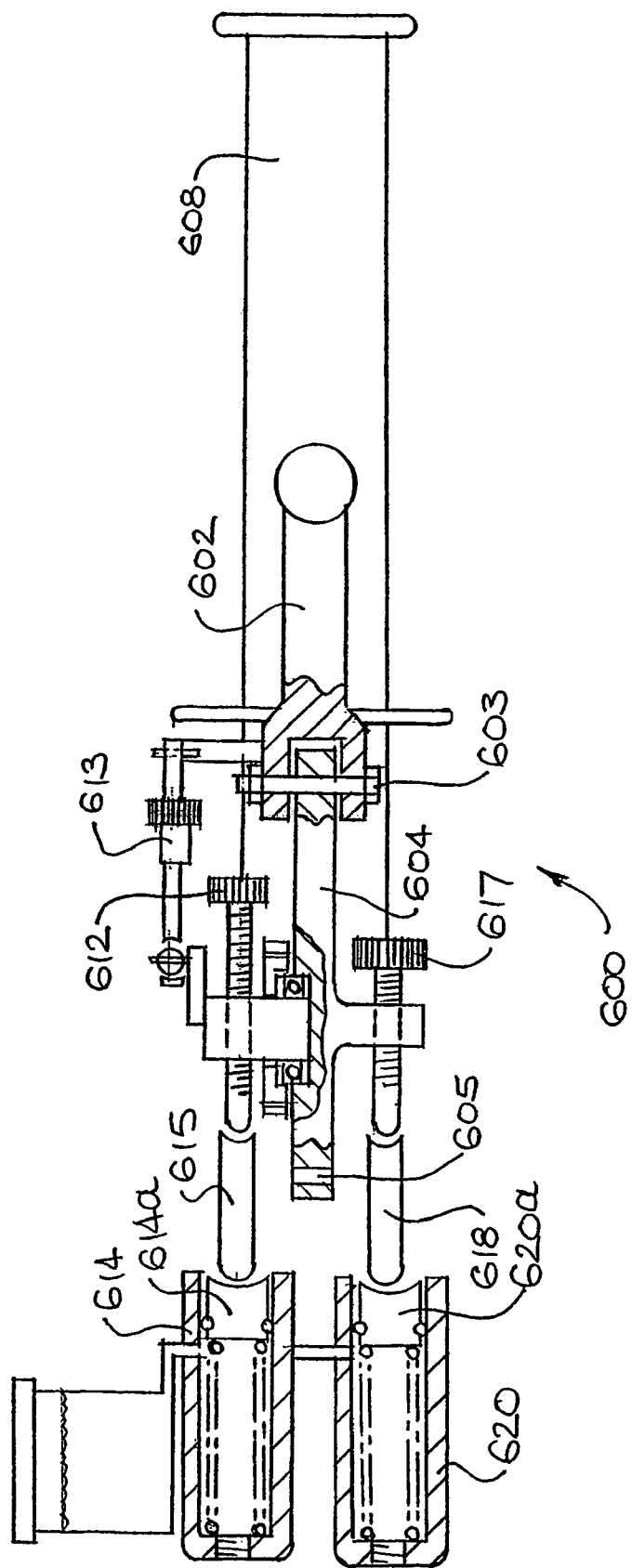
FIG. 13 is a part cross sectional view of a dual function actuator in accordance with another embodiment of the invention.
Figure 14:
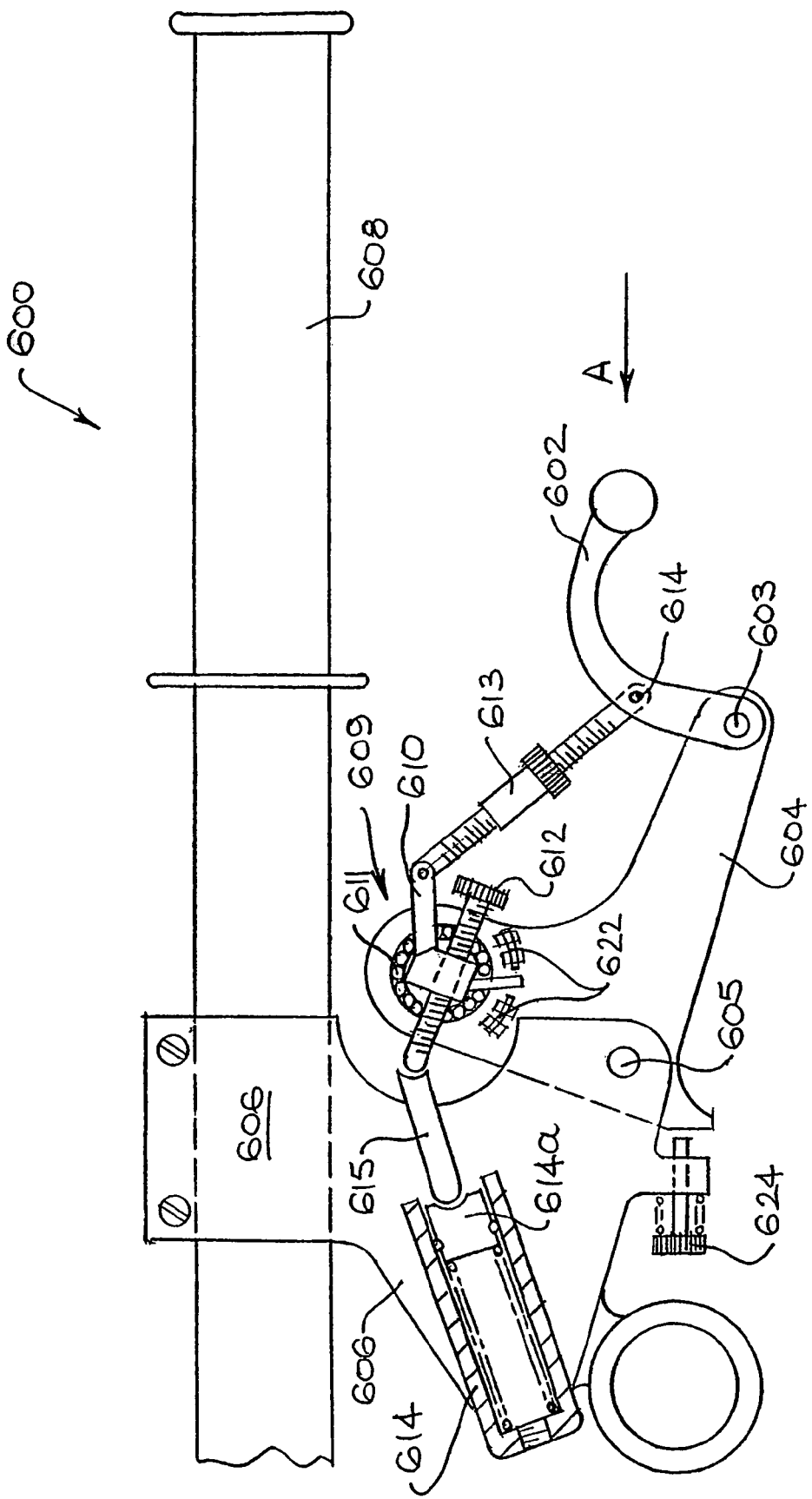
FIG. 14 is a top view of the dual function actuator shown in FIG. 13.

FIGS. 13 and 14 illustrate an actuator 600. The actuator 600 includes a finger operated lever 602 which is pivotally attached at pivot point 603 to a main lever 604. Main lever 604 is pivotally attached at pivot point 605 to a mount 606. Mount 606 is connected to the handlebar 608 of a vehicle (not shown).

Mounted on a lower portion of the main lever 604 is a brake adjustor cam arrangement 609. The brake adjustor cam arrangement 609 includes a cam arm 610, a bearing 611 and a threaded adjustor 612. The cam arm 610 is connected at one end to a brake pin angle adjustor 613 which is in turn connected to the finger operated lever 602 at a ball joint 614. The threaded adjustor 612 is connected to a brake cylinder actuator 615 which is arranged to drive a brake cylinder piston 614a of a brake cylinder 614. The threaded adjustor 612 and the brake cylinder actuator 615 may be interconnected via a brake cylinder slack adjustor of similar form to the brake slack adjustor 924 illustrated in FIG. 26.

As best shown in FIG. 13, a clutch slack adjustor 617 is attached to the main lever 604. The clutch slack adjustor 617 is arranged for connection with a clutch cylinder actuator 618 which drives a clutch piston 620a of a clutch cylinder 620.

The actuator 600 is arranged so that the finger operated lever 602 can be pulled towards the handlebar 608 so as to operate a clutch function. As is best illustrated in FIG. 13, when the finger operated lever 602 is pulled towards the handlebar 608, the main lever 604 is caused to pivot about pivot point 605 so as to cause the clutch cylinder actuator 618 (FIG. 13) to operate a clutch function via the clutch cylinder 620.

As the finger operated lever 602 is continued to be pulled towards the handlebar 608, brake function will also be initiated. Brake function is initiated because when the finger operated lever 602 is pulled towards the handlebar 608, the resulting pivotal movement of the main lever 604 will cause the brake slack adjustor 612 to take up the slack between itself and the brake cylinder actuator 615. This results in the brake cylinder actuator 615 driving the piston 614a of the brake cylinder 614 so as to pressurise the hydraulic fluid contained there within and thereby initiate brake function.

If the finger operated lever 602 is shifted towards the left in the direction of the arrow marked A in FIG. 14, the brake pin angle adjustor 613 will rotate the cam arm 610. As this occurs, the distance between the pivot point 603 and the end of the threaded adjustor 612 is reduced. This increases the leverage to the brake cylinder actuator 615. Additionally, the relative angle between the threaded adjustor 612 and the brake cylinder actuator 615 decreases and thus the free play to the piston 614a of the brake cylinder 614 is taken up. Thus the brake function is operated.

Accordingly, it will be appreciated that if a user wants to bias towards brake function, then the finger operated lever 602, should be shifted in the direction of the arrow marked A.

If the user wants to initiate a clutch function only, then the finger operated lever 602 should be pulled towards the handlebar 608. Further travel of the lever 602 towards the handlebar 608 will operate a brake function.

If a combined clutch and brake function is desired then the finger operated lever 602 should be pulled towards the handlebar 608 and also moved in the direction marked A in FIG. 14.

Stops 622 which are formed on the main lever 604 are provided to limit the angular movement of the cam arm 610. This limits the movement of the finger operated lever 602 relative to the main lever 604.

A back stop adjustor 624 is located on the mount 606. By adjusting the back stop adjustor 624 it is possible to limit the outward pivotal movement of the main lever 604.

Figure 15:
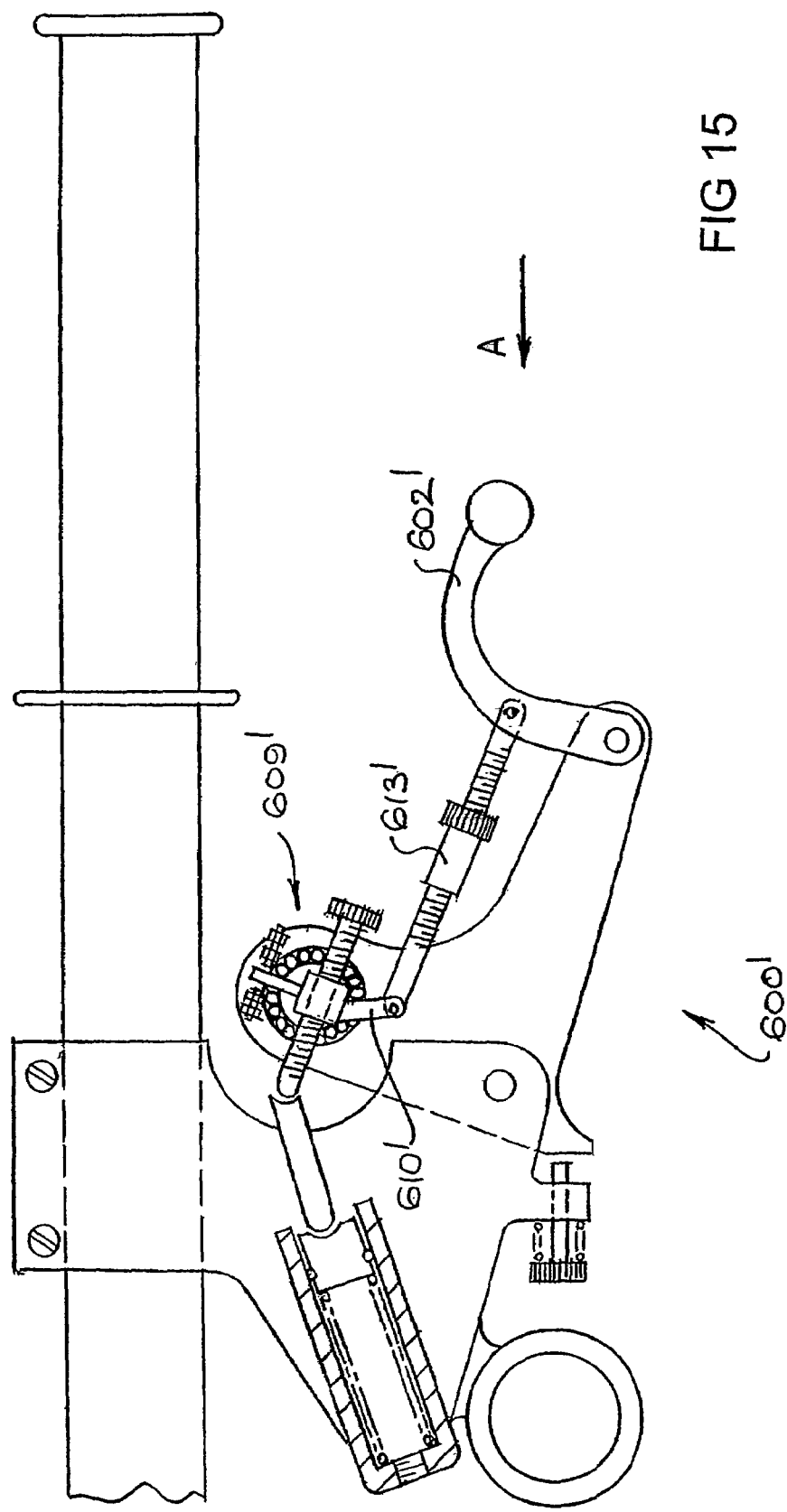
FIG. 15 is a top view of a modified version of the actuator shown in FIGS. 13 and 14.

FIG. 15 illustrates a modified version of the actuator 600 shown in FIG. 14. The actuator 600' shown in FIG. 15 includes a modified brake pin angle adjustor 613'. As is evident from FIG. 15, the modified brake pin angle adjustor 613' now activates the cam arm 610' of the brake adjustor cam arrangement 609' in the opposite direction. Accordingly, moving the finger operated lever 602' in the director marked by the arrow A reduces the rear brake bias, thereby requiring the user to pull the finger operated lever 602' more to the left in order to achieve a brake function.

Figure 16:
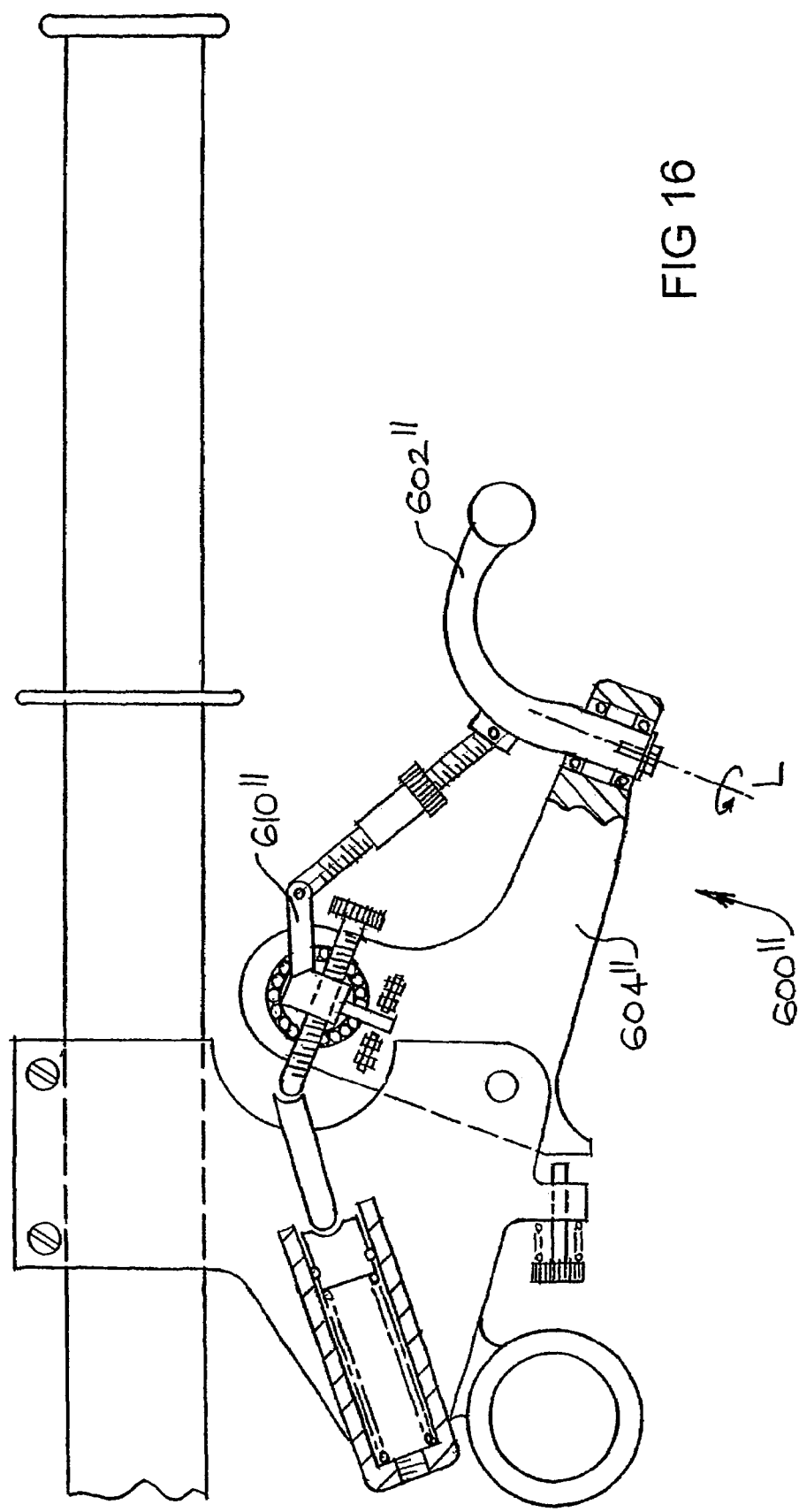
FIG. 16 is a top view of a modified version of the actuator shown in FIGS. 13 and 14.
Figure 17:
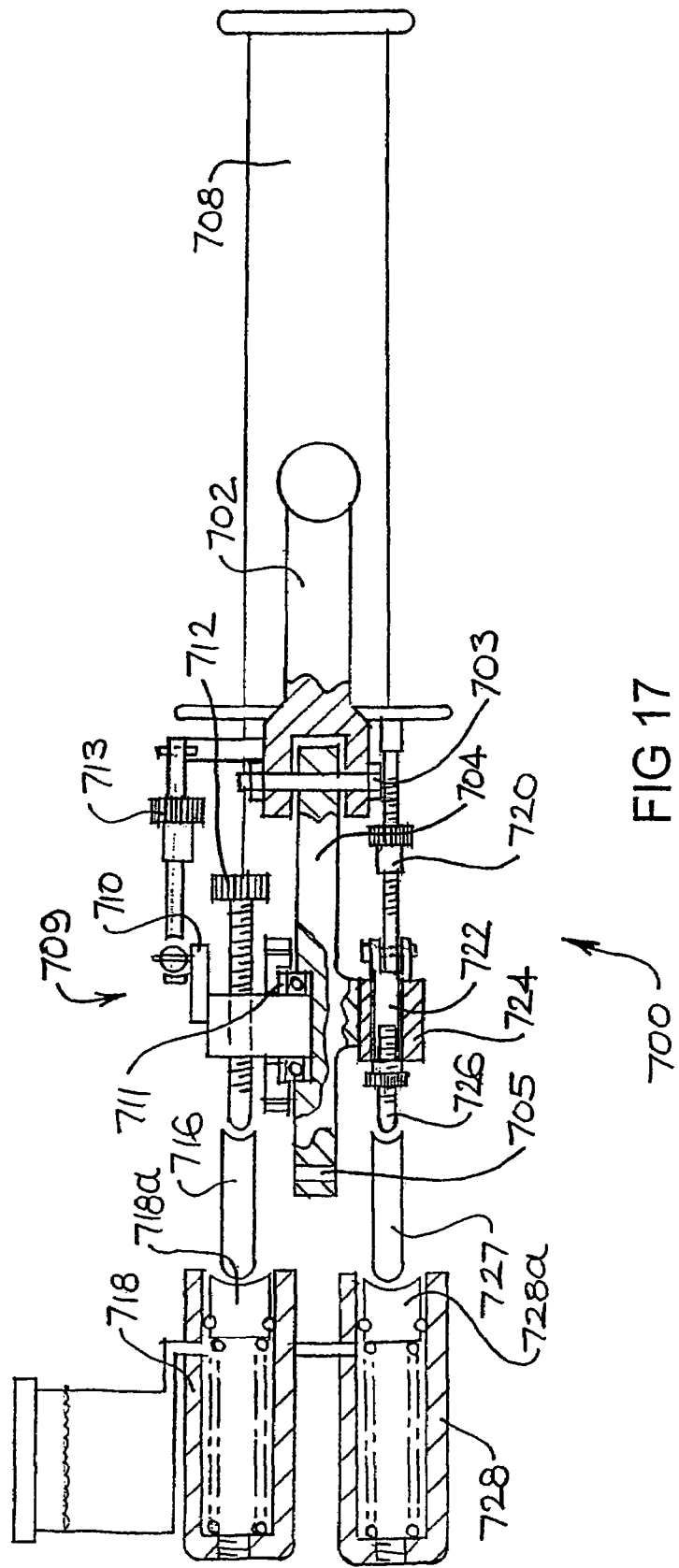
FIG. 17 is a part cross sectional front view of another version of the dual function handlebar mounted actuator.
Figure 18:
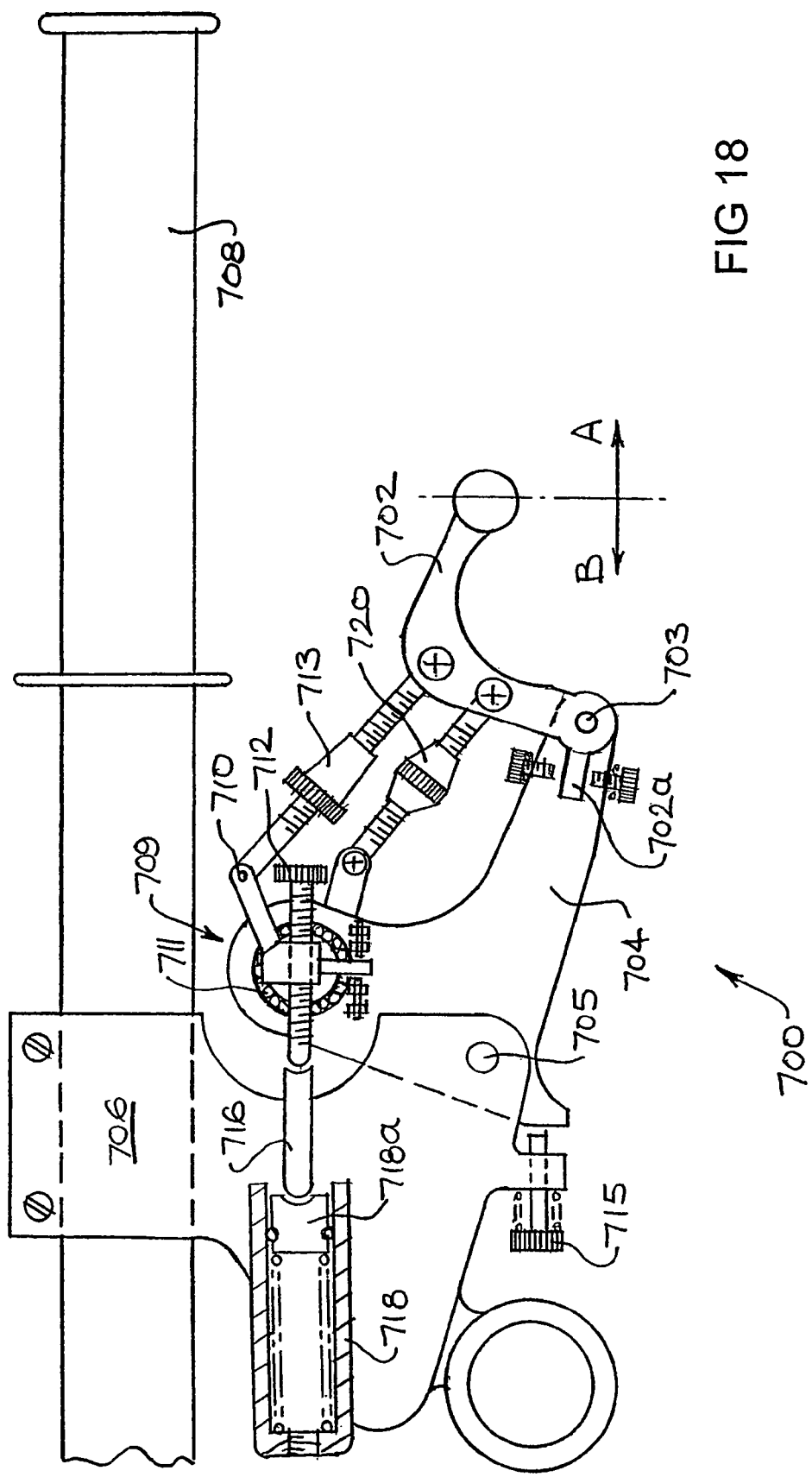
FIG. 18 is a top view of the actuator shown in FIG. 17.

FIG. 16 illustrates another modified version of the actuator 600 shown in FIG. 14. This further modified actuator 600" includes a finger operated lever 602" which is connected to the main lever 604" in such a manner that it can be pushed in a downward direction towards the ground. When the lever 602" is pushed downwardly it pivots about pivot axis L and pulls the brake pin angle adjustor 613". This causes the cam arm 610" to rotate in an anti-clockwise direction and thus the brake function is operated FIGS. 17 and 18 illustrate an actuator 700 in accordance with another embodiment of the invention. The actuator 700 includes a finger operated lever 702 which is pivotally attached at connection point 703 to a main lever 704. Main lever 704 is pivotally attached at pivot point 705 to a mount 706. Mount 706 is connected to a handlebar 708 of a vehicle (not shown).

Mounted on a lower portion of the main lever 704 is a clutch adjustor cam arrangement 709. The clutch adjustor cam arrangement 709 includes a cam arm 710, a bearing 711 and a threaded adjustor 712. The cam arm 710 is connected to a clutch pin angle adjustor 713 which in turn is connected to the finger operated lever 702. The threaded adjustor 712 joins the cam arm 710 to a clutch actuator rod 716. The clutch actuator rod 716 is arranged to drive a clutch piston 718a of a clutch master cylinder 718.

As best illustrated in FIG. 17, the finger operated lever 702 is also connected to a brake free play adjustor 720. The brake free play adjustor 720 is connected to a push rod 722 which is moveable within a linear bush 724. The push rod 722 is connected to a brake free play adjustor pin 726 which is arranged to drive an actuator 727 attached to a brake piston 728a of a brake master cylinder 728.

Finger operated lever 702 is arranged so that it can be pulled towards the handlebar 708 and also moved in the direction of the arrows marked A and B (FIG. 18).

If the finger operated lever 702 is pulled towards the handlebar 708 whilst being moved in the direction marked by the arrow A, clutch function is operated. This is due to the fact that as the finger operated lever 702 is pulled in this manner, the main lever 704 is pivoted around pivot point 705. This pushes the clutch pin angle adjustor 713 against the cam arm 710 causing it to rotate. As this occurs, the distance between the pivot point 705 and the end of the threaded adjustor 712 is increased. This decreases the leverage to the clutch cylinder actuator 716. Additionally, the relative angle between the threaded adjustor 712 and the clutch cylinder actuator 716 is increased and thus the free play to the piston 718a of the clutch cylinder 718 is taken up. Thus, the clutch function is operated.

If the finger operated lever 702 is pulled towards the handlebar 708 brake function will also be operated. This is because as the lever 704 is rotated the free play in the adjustor 720 is taken up so that the brake free play adjustor pin 726 is caused to operate the brake piston 728a.

It will be appreciated that by altering the settings of the brake free play adjustor pin 726 and the threaded adjustor 712 it is possible to overlap the clutch and brake functions or to have one function operational only.

By shifting the finger operated lever 702 in the direction marked by the arrow B, the threaded adjustor 713 is pushed which causes rotation of the cam arm 710. This causes the end point of the threaded adjustor 712 to shift closer to the pivot point 705 thus increasing the overall leverage of the finger operated lever 702 in actuating the piston 718a of the clutch master cylinder 718. Additionally, as the end point of the threaded adjustor 712 moves closer to pivot point 705, the tip of the clutch cylinder actuator 716 is moved further away from the centre line of the master clutch cylinder 718. This increases free play to the clutch function. As the finger operated lever 702 is moved in the direction marked by the arrow B, it also pushes on the brake free play adjustor 720 which, in turn, pushes the brake push rod 722 which takes up the free play in the brake free play adjustor 720. Accordingly, it will be appreciated that shifting the finger operated lever 702 in the direction marked by the arrow B, increases the leverage ratio to the clutch function, introduces free play in the clutch operation, takes up the free play in the brake operation and can be used to operate the brake function.

Shifting the finger operated lever 702 in the direction marked by the arrow B therefore means that although it is easier to operate the clutch function, more movement of the finger operated lever 702 in the direction marked B is required to achieve the same clutch function.

From the above it will be appreciated that the user has the ability to change the function of the inward movement (i.e. movement towards the handlebar 708) of the finger operated lever 702 during use of the actuator 700. For example, as the finger operated lever 702 is moved towards the handlebar 708 with the lever 702 in the position marked by the arrow A, first clutch operation will be achieved. However, if the finger operated lever 702 is then moved in the opposite direction (i.e. in the direction of the arrow marked B) brake function will be first initiated. The actuator 700 can be adjusted so that both brake and clutch function can be achieved with rear brake bias if the finger operated lever 702 is moved in the direction marked by the arrow B.

Figure 19:
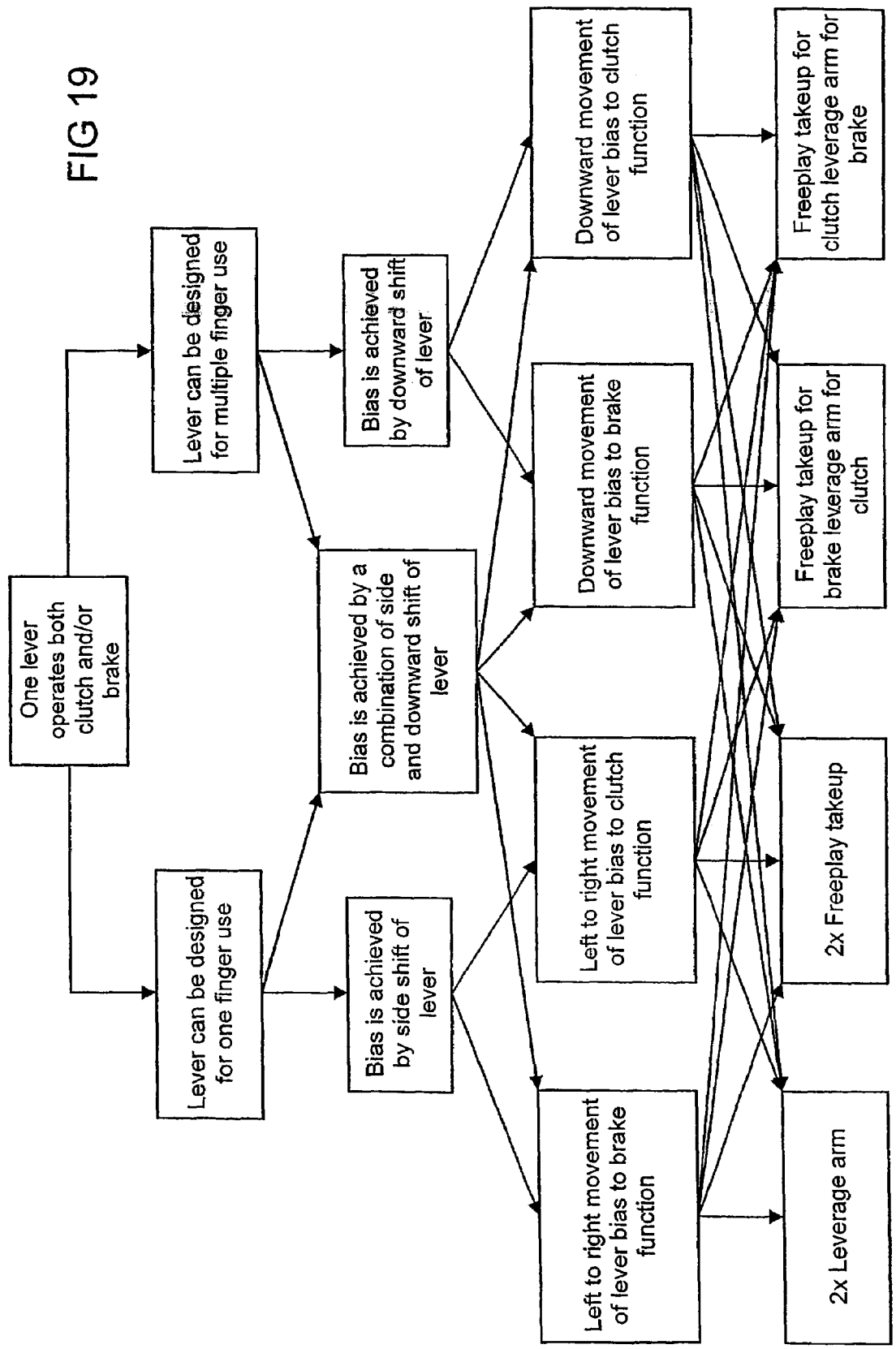
FIG. 19 is a chart showing possible operational characteristics of the actuator shown in FIGS. 17 and 18.

FIG. 19 is a chart depicting possible operational and functional characteristics of the combined brake and clutch actuator 700 shown in FIGS. 17 and 18. These characteristics can be changed by making various adjustments to the actuator 700. For example, as depicted in the chart, the finger operated lever 702 could be extended in order to accommodate more fingers if required by the user.

A bias achieved by a downward shift of the lever 702 could be achieved by having the lever 702 pivoted horizontally instead of vertically as shown if FIG. 18. Such an arrangement is depicted in FIG. 20.

Figure 20:
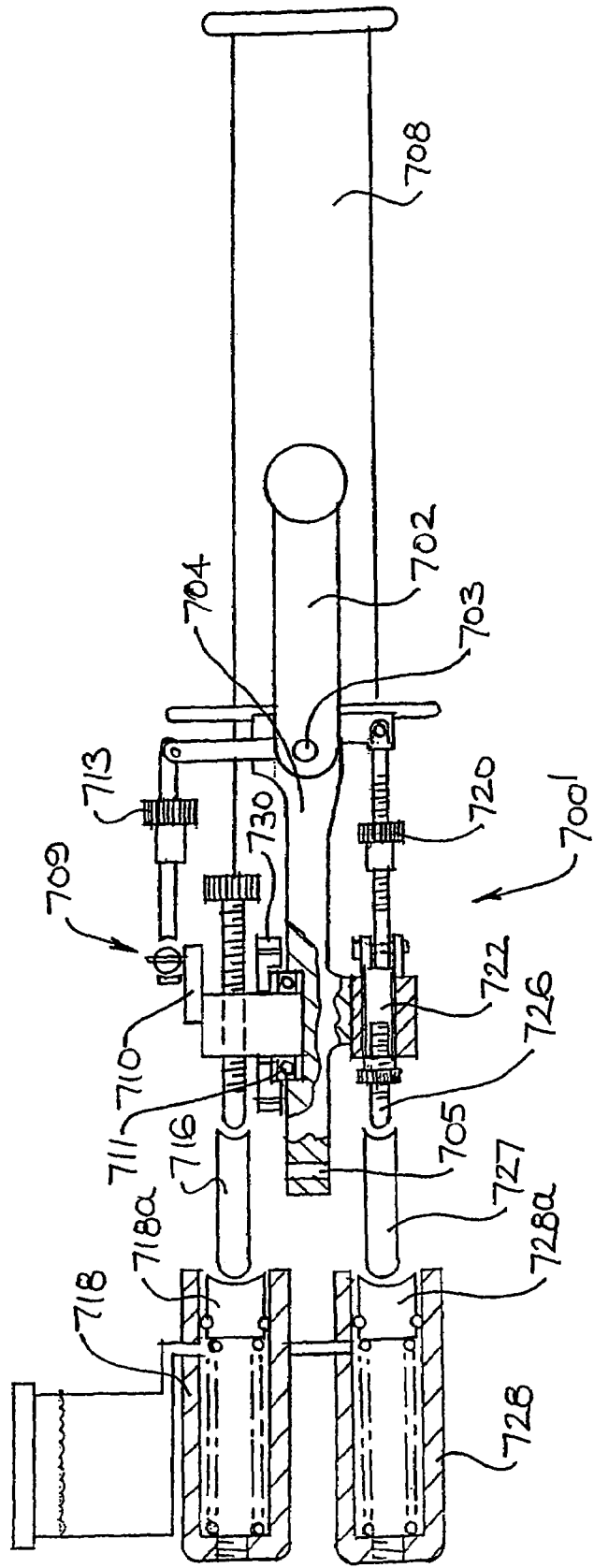
FIG. 20 is a part cross sectional front view of a modified version of the actuator shown in FIGS. 17 and 18.

In FIG. 20, an actuator 700' is depicted wherein pushing down on the finger operated lever 702 operates the clutch pin angle adjustor 713 and the brake free play adjustor 720. It should be noted that downward motion of the lever 702 will now pull on the clutch pin angle adjustor 713, thus rotating the cam arm 710 in the opposite direction. If this arrangement is viewed as being undesirable, it can be rectified by having the clutch pin angle adjustor 713 pull on the cam arm 710 from a position on the opposite side of the pivot point 705. This position would be approximately where the stops 730 are located. Stops 730 are arranged to limit the travel of the clutch leverage arm 710.

Bias that is achieved by a combination of side and downward shift of the finger operated lever 702 could also be achieved by having a similar configuration to that shown in FIG. 20 and by replacing the pivot at pivot point 703 with a spherical bearing that allows motion in both directions.

Left to right movement of the finger operated lever 702 that biases to clutch function could be achieved by repositioning the pivot that joins the clutch pin angle adjustor 713 to the cam arm 710 so as to reverse the rotation of the cam arm 710. Additionally, the pivot that joins the brake free play adjustor 720 to the finger operated lever 702 could be shifted to a point roughly where the lug 702a is that stops the travel of the finger operated lever 702. With such an arrangement, when the finger operated lever 702 is pushed in the direction marked by the arrow B, it will now pull on the brake free play adjustor 720. Downward movement of the finger operated lever 702 to bias to clutch function could be achieved by the repositioning the pivot point to a point where they move in the opposite direction.

A stop adjustor 715 is mounted on the mount 706. The stop adjustor 715 limits the pivotal movement of the main lever 704 and thereby ensures that the main lever 704 is pivoted back to the position shown in FIG. 18 when the user releases the finger operated lever 702.

The chart shown in FIG. 19 also refers to the use of two leverage arms. This is a configuration whereby both the clutch and brake functions use a system that varies the leverage ratio similar to that which is shown in FIG. 18. However, in this system the brake function also employs a leverage arm. It is envisaged that this arm would be configured to rotate in the opposite direction to the other one, thus increasing the leverage to one function as the leverage is decreased to the other. However, it would be possible to have both leverage arms rotating in the same direction so that leverage is increased to both the clutch and the brake function.

The chart shown in FIG. 19 also refers to the use of "two times free play". This refers to the use of two free play adjustors, one for the clutch function and one for the brake function. Again, as previously described, these could be configured to increase free play simultaneously or to have one increasing free play, whilst the other is decreasing fee play.

The chart shown in FIG. 19 also refers to "free play for clutch" and "leverage arm for brake". Both of these could be achieved by simply swapping the clutch master cylinder with the brake master cylinder.

It is also envisaged that a spring may be provided between the finger operated lever 702 and the main lever 704 which would act in either direction, depending upon the configuration used. Tactile indication of when a function is about to be operated could also be provided.

It will also be appreciated that other arrangements for accommodating free play adjustment and leverage adjustment are envisaged. For example free play could be taken up by using a cam that is rotated by pushing the finger operated lever 702 in the direction marked by the arrow B. This cam could then operate the brake free play push rod.

FIGS. 21 and 22 illustrate another form of actuator 800. This actuator 800 includes a primary lever 802 and a secondary lever 804 which are pivotally connected together at pivot point 805. The secondary lever 804 is pivotally connected to a mount 806 at a pivot point 808. The mount 806 is connected to a handlebar 810 of a vehicle (not shown).

A pull rod 812 joins the end of the primary lever 802 adjacent the pivot point 805 to an arm 814. Arm 814 is arranged for connection with an actuating rod 816 of a master cylinder 818, via a threaded connecting member 820. Actuating rod 816 is connected to a piston 818a of a master cylinder 818.

Formed as part of the secondary lever 804 is a threaded connecting member 822. As best shown in FIG. 21, the threaded connecting member 822 is arranged to drive a piston 826a of a master cylinder 826.

When the main lever 802 is pulled in towards the handlebar 810 from point A as marked on FIG. 22, the secondary lever 804 is caused to pivot about pivot point 808 so as to operate the actuating rod 824 of the master cylinder 826.

If the main lever 802 is pulled in towards the handlebar 810 from the point marked B on FIG. 22, primary lever 802 is caused to pivot about pivot point 805 so as to pull the pull rod 812. This rotates arm 814 which in turn actuates the actuating rod 816 of the master cylinder 818.

If the main lever 802 is pulled towards the handlebar 810 from the point marked C or from both points A and B as marked on FIG. 22, both the master cylinder 818 and the master cylinder 826 will be operated simultaneously.

Mounted on the secondary lever 804 is a pair of function overlap adjustors 850, 852. The adjustors 850, 852 are respectively arranged to contact the upper and lower sides 854b, 854a of a stop 854 formed on the arm 814. A secondary adjustor 856 mounted on the mount 806 is arranged to contact a secondary stop 858 formed on the arm 814. A further stop adjustor 860 is mounted on the mount 806 and acts upon secondary lever 804.

When the secondary lever 804 is caused to pivot about pivot point 808 in a direction towards the handlebar 810 the adjustor 852 will contact the stop 854 so as to cause the arm 814 to rotate and thereby actuate the actuating rod 816 of the master cylinder 818. By adjusting the positioning of the adjustor 852 it is possible to vary the point at which the adjustor 852 contacts the stop 854 and thereby operates the function of the master cylinder 818.

When the pull rod 812 is pulled (i.e. when the main lever 802 is pulled towards the handlebar 810 form point B) the arm 814 is caused to rotate. The stop 854 will strike the adjustor 850 mounted on the secondary lever 804 causing the secondary lever 804 to then rotate about pivot point 808. This rotation of the secondary lever 804 will result in actuation of the master cylinder 826 and operation of the function of the master cylinder 826. By adjusting the positioning of the adjustor 850 it is possible to vary the point at which the adjustor 850 contacts the stop 854 and thereby operates the function of the master cylinder 826.

Stop 858 and adjustor 856 limit the pivotal movement of the arm 804 about pivot point 808. Similarly, stop 860 limits the pivotal movement of the arm 814 about pivot point 808.

It will be appreciated that master cylinder 818 and master cylinder 826 may be arranged to operate either a brake or a clutch function of a vehicle. Alternatively, they may be arranged to operate other functions of the vehicle.

When the master cylinders 818, 826 operate respective brake and clutch functions of the vehicle, the adjustors 850, 852 provide an anti-stall function and a default to brake function to the vehicle.

FIGS. 23 and 24 illustrate a modified version of the dual actuator 800 shown in FIGS. 21 and 22. The dual actuator 800' in FIGS. 23 and 24 is arranged so that downward movement of the main lever 802' about pivot axis M operates the master cylinder 818' instead of the master cylinder 826'.

4$^{th}$ Forms

FIGS. 25 to 29 illustrate a combined clutch and brake actuator 900 with an active anti-stall arrangement. The actuator 900 includes a main lever 902 which is pivotally connected at a pivot point 904 to a clutch operating arm 906. The clutch operating arm 906 is pivotally connected at a pivot point 908 to a mount 910. Mount 910 is connected to a handlebar 912 of a vehicle (not shown).

The lever 902 is also connected via a push rod 914 to a brake operating arm 916. The brake operating arm 916 is also pivotally connected at the pivot point 908 to the mount 910.

As best illustrated in FIG. 25, the clutch operating arm 906 is connected by a clutch adjustor 918 to a clutch operating pin 920. The clutch operating pin 920 is arranged to drive a piston 922a of a clutch master cylinder 922.

Linkages 926, 928, 930, 932 are connected together and attached to the mount 910 so that a brake master cylinder 934 is movable in line with the direction of travel of the brake master cylinder piston 934a. The operation of the linkages 926, 928, 930, 932 will be described in more detail below.

Figure 26:
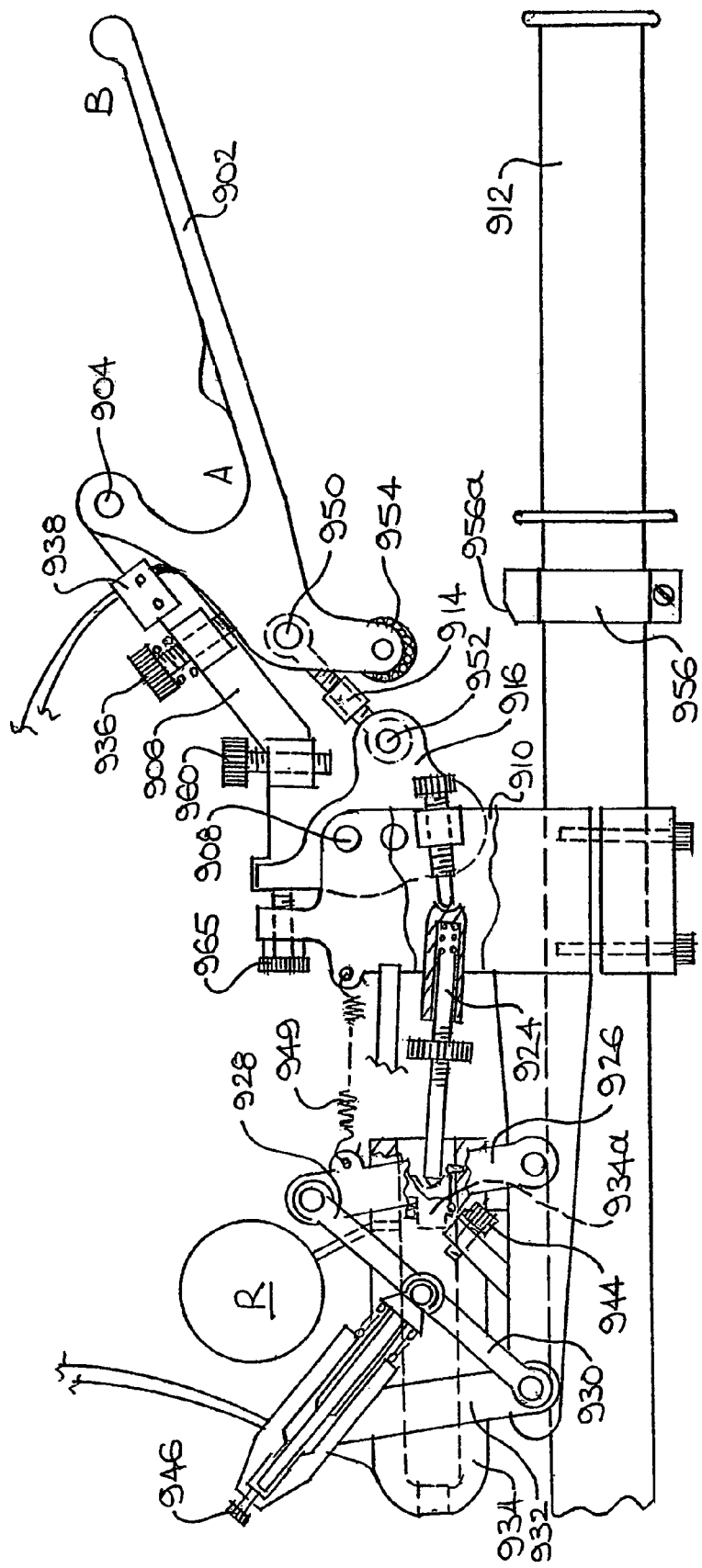
FIG. 26 is a top view of the actuator shown in FIG. 25.

When the lever 902 is pulled towards the handlebar 912 from the point marked B on FIG. 26, a portion of the lever 902 strikes the adjustor 936 which is located on the clutch operating arm 906. When this occurs, a micro switch 938 located on the clutch operating arm 906 is open circuit thus enabling a control unit 940 of the control system shown in FIG. 27 to energise a solenoid 942 to thereby lock in a brake function.

The control unit 940, via a transducer 943 which senses the RPM of the vehicle's flywheel 941, will energise the solenoid 942 when the engine RPM is above a first predetermined value. In this state, the brake master cylinder 934 is not able to move backwards and forwards in line with the direction of operation of the piston 934a because of the set up of the linkages 926, 928, 930 and 932. However, if the solenoid 942 is de-energised this movement is limited by the adjustors 944 and 946. When the brake master cylinder 934 moves backwards, the main lever 902 is able to travel further towards the handlebar 912, thus operating the clutch function to prevent stalling of the vehicle's engine.

The brake master cylinder 934 is returned to a brake bias position by a spring 949. In this position, the free play in the brake slack adjustor 924 is taken up. If the solenoid 942 is energised, It pulls and holds the brake master cylinder arms 928, 930 in a straight line which locks the brake master cylinder 934 in a brake bias position.

By pulling the lever 902 towards the handlebar 912 from the position marked B on FIG. 26, the brake function will be operated before the clutch of the vehicle is fully disengaged. However, if the RPM of the vehicle's engine falls below the first predetermined value, the control unit 940 will de-energise the solenoid 942. This will allow linkages 928, 930 to fold allowing the brake master cylinder 934 to move back relative to the mount 910. Thus, the clutch arm 906 is able to move in towards the handlebar 912 so as to disengage the clutch (i.e. operate the clutch function) and prevent the engine from stalling whilst still operating the brake function. It is important to note that the brake function lock of the solenoid 942 will not move the brake master cylinder 934 to the brake bias position. Rather it will only hold the brake master cylinder 934 in that position.

When the lever 902 is pulled towards the handlebar 912 from the position marked A, the lever 902 is caused to pivot at pivot point 904 which operates the micro switch 938. This in turn de-energises the solenoid 942 so as to unlock the brake function. As the lever 902 pivots at pivot point 904 it also pivots at pivot point 950. This results in the brake operating push rod 914 pivoting about pivot point 952. As the push rod 914 is able to pivot it no longer operates the brake function. However, as the lever 902 progresses towards the handlebar 912 the clutch function is operated independently until a bearing 954 strikes the stop 956. The stop 956 provides the operator with a tactile indication of the initiation of the brake function. Also, upon striking the stop 956 the overall leverage ratio to brake function is reduced until the bearing 954 runs down a ramp 956a formed on the stop 956. This ramp 956a can be angled to return the leverage ratio back to normal.

The ramp 956a on the stop 956 has the affect of compressing the distance required to affectively operate the brake function. It is able to achieve this because the initial travel of the piston 934a of the brake master cylinder 934 requires less force than the last portion of its travel. This feature also assists in providing a tactile indication to the user of the activation of the brake function. Furthermore, if desired, the adjustor 960 can be set to initiate brake function earlier in the travel of the lever 902. This enables an overlap of the brake and clutch functions to occur. Likewise, the position of the stop 956 can be adjusted to achieve an overlap in the operation of the clutch and brake functions.

Adjustors 965, 967 are located on the mount 910. The adjustor 965 is arranged to limit the pivotal movement of the brake operating arm 916 about pivot point 908. Adjustor 967 is arranged to limit the pivotal movement of the clutch operating arm 906 about the pivot point 908. FIG. 26A shows an optional foot operated pedal 970 the foot operated pedal 970 can be arranged to operate the brake operating arm 916 shown in FIG. 25 in the same way as if the lever 902 was pulled towards the handlebar 912 from point B. FIG. 26A illustrates a foot pedal cable 972, a cable adjustor 974, a foot peg 976 and the pedal 970. It will be appreciated that the cable 972 could be replaced with any suitable means for operation of the brake function.

It will also be appreciated that the return spring 949 could be replaced by a solenoid or other actuator which could also be controlled by the control unit 940.

Figure 27:
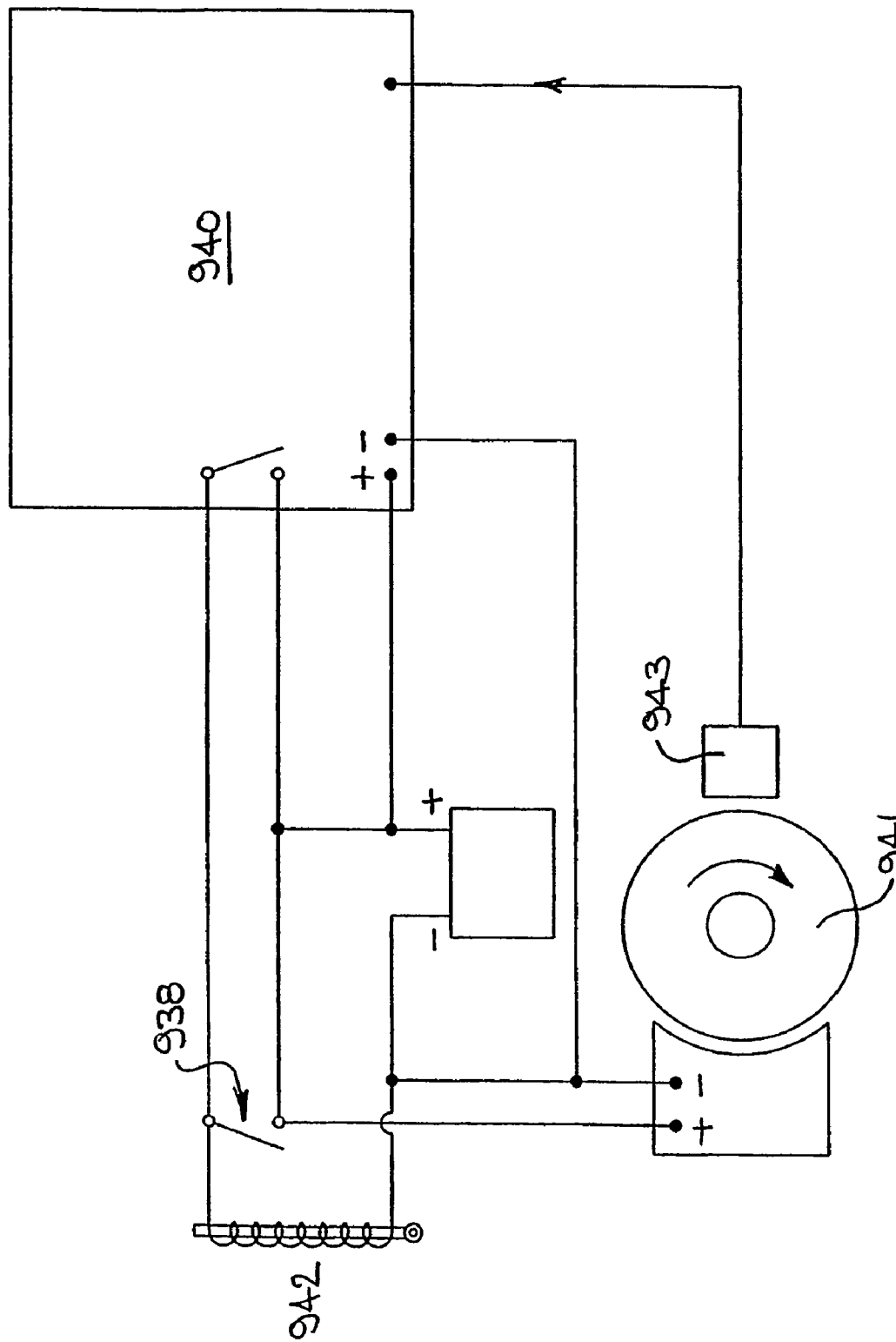
FIG. 27 is a schematic illustration of a control system for the actuator shown in FIGS. 25 and 26.
Figure 28:
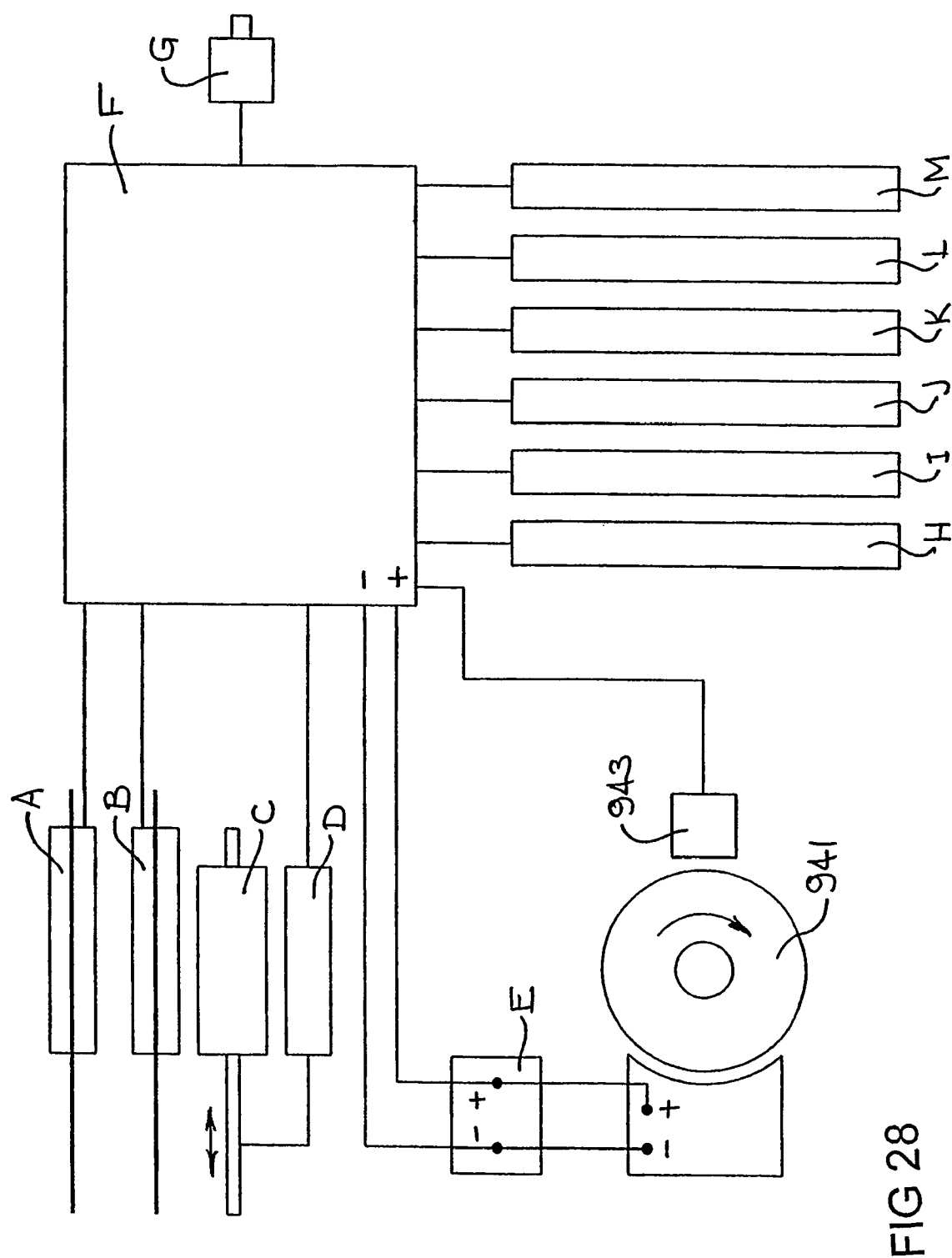
FIG. 28 is a schematic illustration of a more sophisticated control system for the actuator shown in FIGS. 25 and 26.

FIG. 28 illustrates a more sophisticated control system (as compared to that shown in FIG. 27) to position the brake master cylinder 934. It will also be appreciated that although only one master cylinder actuator is shown in FIG. 28, two actuators could be provided with the second one moving the clutch master cylinder 922. This control system is aimed to provide superior control over the rotational speed of the vehicle wheels.

Figure 29:
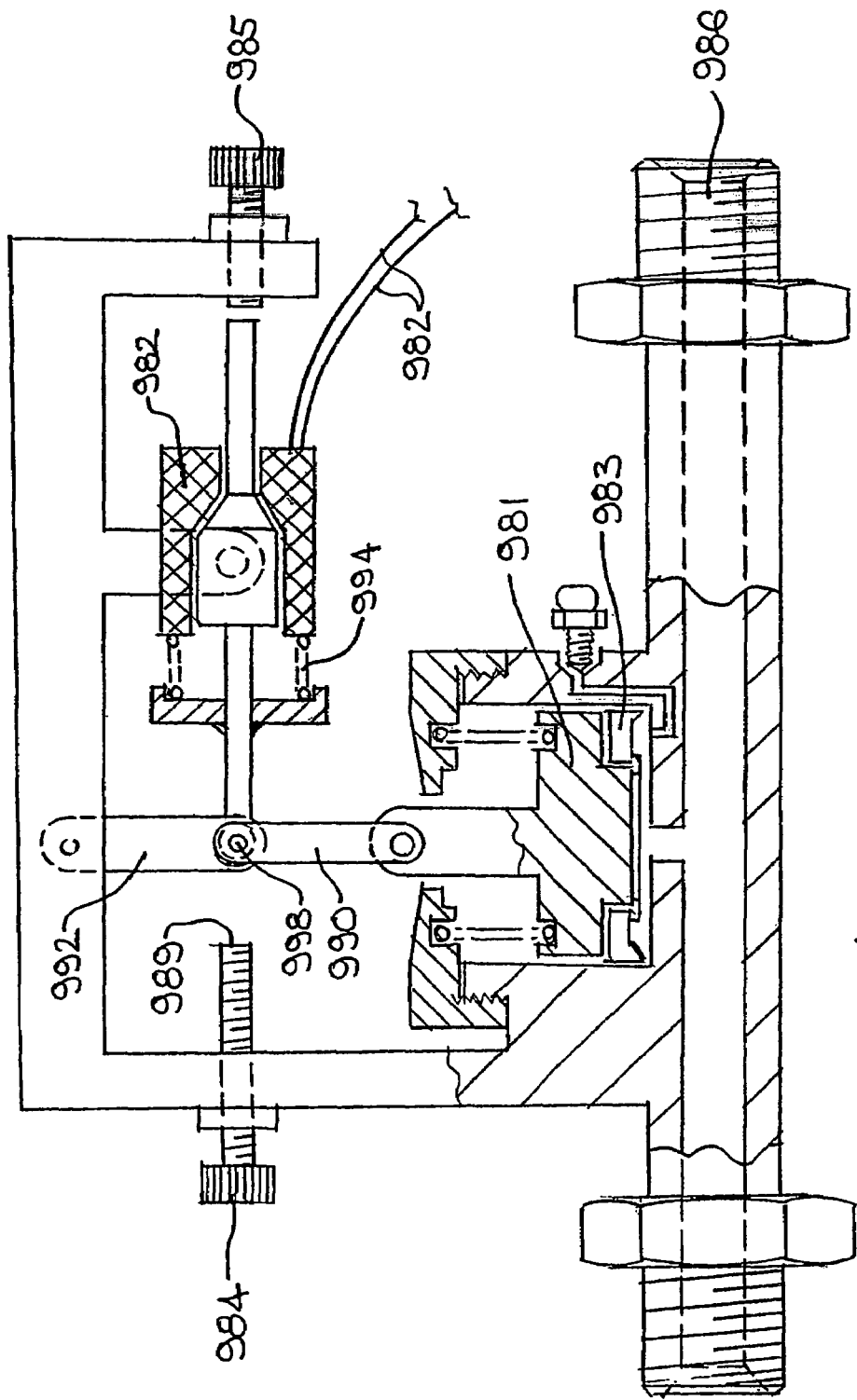
FIG. 29 is a part cross sectional view of a hydraulic arrangement for altering the activation point of a clutch function or a brake function.

The components of the control system shown in FIG. 28 are as follows:

A—Potentiometer for measuring the position of the main lever 902
B—Potentiometer for measuring the angular position of the main lever 902 relative to clutch operating arm 906
C—Actuator for movement of the master cylinder or cylinders
D—Potentiometer for measuring the position of the actuator C
E—Battery
F—3 Dimensional map controller for the actuator C
G—Throttle control
H—Throttle position input
I—Gear selection input
J—Wheel speed input
K—Brake line pressure input
L—Engine temperature input
M—Engine cylinder pressure input FIG. 29 illustrates a hydraulic arrangement for altering the activation point of a brake or clutch function. Instead of providing the movable master cylinder arrangement shown in FIG. 25, a hydraulic piston arrangement 979 is located between a hydraulic line from the master cylinder 934 and a slave cylinder. The hydraulic piston arrangement 979 includes a piston 981 which is caused to move in order to achieve the desired change in activation point of the function concerned (e.g. brake function).

The locking arms 990, 992 are held in a straight line by the solenoid 982, which in turn holds the displacement of the piston 981. In this position, the brake function can be operated before the clutch function is operated.

When the solenoid 982 is disengaged, the spring 994 pushes the locking arms 990, 992 until they are no longer in a straight line. When hydraulic pressure is then applied to the piston 981 it will move until the pivot point 998 contacts the stop 989. Given the displacement of the piston 981, the lever 902 will now travel further towards the handlebar 912 before the brake function is operated. Accordingly, by the time the brake function is operated the clutch function will also be operated so as to prevent stalling of the vehicle's engine.

A locking solenoid 982 is connected to the control unit 940 as shown in FIG. 27. The operation of the lever 902 is the substantially the same as previously described except for some of the slack in the free play adjustor 917 will need to be adjusted. The piston 981 and the piston seal 983 may be replaced with a diaphragm made from a suitable material that "bottoms out" to provide a stop for its displacement.

As shown in FIG. 29, adjustors 984, 985 may be provided to adjust respectively the maximum travel of the piston 981 and the locked position of the piston 981.

It will also be appreciated that the hydraulic system arrangement 979 shown in FIG. 29 could be used to eliminate the need for a return spring in the master cylinder thereby helping to reduce to overall force required to operate the system. This is achieved by using the piston displacement from the unlocked position to the locked position to return the master cylinder piston in the last part of its travel back to an open port position.

FIGS. 30 to 36 illustrate a combined clutch and brake actuator 1000 with an active anti-stall arrangement. The combined clutch and brake actuator 1000 includes a main lever 1002 which is pivotally connected to a mount 1003 at a pivot point 1004. A rocker arm 1006 and a pedal operated arm 1008 are also pivotally mounted to the mount 1003 at pivot point 1004. The mount has not been illustrated in FIG. 31 in order to more clearly depict the operation of the components of the actuator 1000.

Rocker arm 1006 is pivotally connected to adjustable master cylinder push rods 1010, 1012. Push rod 1010 operates the piston 1014 of the brake master cylinder 1016, whilst push rod 1012 operates the piston 1018 of the clutch master cylinder 1020.

The pistons 1014, 1018 are retained in the position shown in FIG. 31 by means of a spring 1022. Spring 1022 is connected between the rocker arm 1006 and the mount 1003. It will be appreciated that the spring 1022 is positioned relative to the pivot point 1004 so that it only acts to pull the pistons 1014, 1018 back into the position shown in FIG. 31 during the last part of their return travel within their respective master cylinders 1016, 1020. The initial return travel of the pistons 1014, 1018 within their respective cylinders 1016, 1020 is caused by system pressure.

A second spring 1024 is provided between the rocker arm 1006 and the lever 1002. The spring 1024 allows the lever 1002 to fold out to prevent accidental damage and also prevents the user's hand from being trapped between a spindle 1026 connected to the end portion of the main lever 1002 and the handlebar 1028 when the rocker arm 1006 is operated by a foot pedal (not shown). Operation of the foot pedal will be discussed in more detail below.

A spindle 1026 is mounted on the end of the main lever 1002 so that it is moveable in the directions marked by the arrows B and C in FIG. 31. A spring loaded ball and detent arrangement 1026a is provided to facilitate tactile indication to the user of the position of the spindle. A return spring 1026b is provided to automatically return the spindle 1026 to the position marked B when a sideways force by the user is removed.

When the main lever 1002 is pulled towards the handlebars 1028 in the direction marked A, the user's fingers are wrapped over the spindle 1026. The spindle 1026 is configured so that it is able to rotate freely in relation to the main lever 1002. Free rotation of the spindle 1026 is permitted so as to reduce the friction and therefore the effort required to pull the main lever 1002 in the direction marked A.

A brake switch 1030 is provided on the end of the main lever 1002 so that when the spindle 1026 is moved in the direction marked C, the switch 1030 is operated. The brake switch 1030 includes a brake switch solenoid 1030a of the normally closed variety.

An adjustor 1037 is mounted on the rocker arm 1006 and is arranged to contact the main lever 1002. The adjustor 1037 is arranged to vary the spacing between the main lever 1002 and the rocker arm 1006.

A rocker arm back stop adjustor 1039 is mounted on the mount 1003 and is arranged to limit the pivotal movement of the rocker arm 1006. A pedal arm backstop adjustor 1041 is also mounted on the mount 1002 and is arranged to limit the pivotal movement of the pedal operated arm 1008. A further adjustor 1045 is mounted on the rocker arm 1006 and is arranged to enable adjustment of the actuation point of the brake function.

When the brake switch 1030 is activated a port in the brake master cylinder 1016 is opened by the control system so that pressure from the brake master cylinder 1016 is returned to the fluid reservoir R. This release of pressure from the brake master cylinder 1016 allows the brake master cylinder piston 1014 to travel within the brake master cylinder 1016 until the piston 1014 closes the brake cylinder solenoid port 1050. At this point hydraulic pressure will then be generated within the brake master cylinder 1016 by any further travel of the brake master cylinder piston 1014. As the clutch master cylinder piston 1018 is connected to the brake master cylinder piston 1014 by virtue of their connection to the rocker arm 1006, movement of the brake master cylinder piston 1014 will cause movement in the clutch master cylinder piston 1018. This movement of the clutch master cylinder piston 1018 generates hydraulic pressure in the clutch master cylinder 1020 causing the clutch function to be operated.

Figure 32:
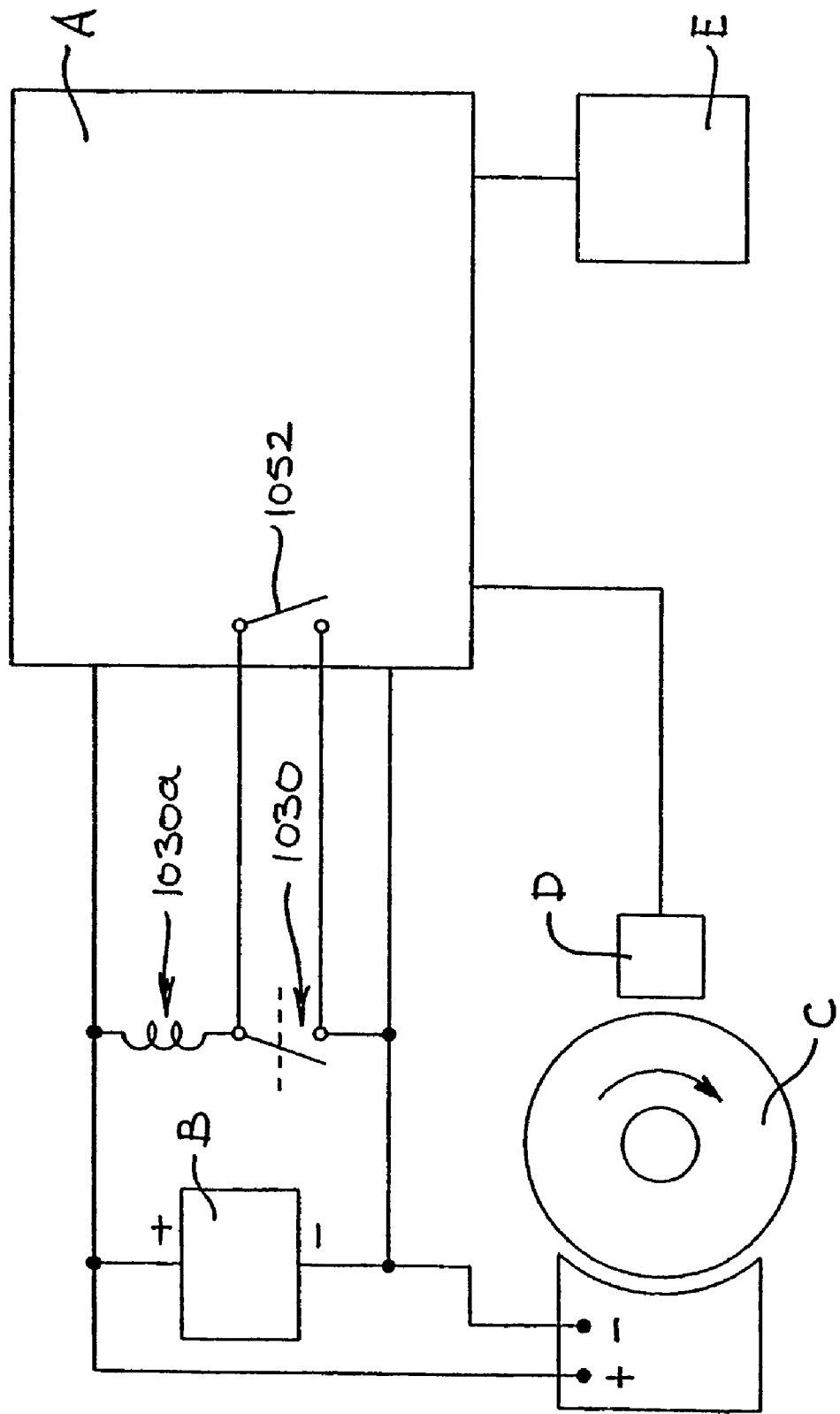
FIG. 32 is a schematic illustration of a control system for the actuator shown in FIGS. 30 and 31.

FIG. 32 is a schematic illustration of the control system used by the actuator 1000 shown in the brake function mode. The components of the control system shown in FIG. 32 are as follows;

A—Control unit
B—Battery
C—Engine's flywheel
D—R.P.M sensor
E—Other inputs to the control unit A As shown in FIG. 32, in addition to energising the brake switch solenoid 1030a by pressing the spindle 1026 in the direction marked C, the brake switch solenoid 1030a may also be energised by an engine RPM activated switch 1052. For example, this switch 1052 may be closed when the engine RPM falls below a predetermined level (e.g. 1000 RPM). This means in practice that if the user pulls the main lever 1002 towards the handlebar 1028 with spindle 1026 in position B, both the clutch and brake functions are operated simultaneously. However, by adjustment of the push rods 1010, 1012 the brake function can be effectively operated before the clutch disengages. With such an arrangement, as the user pulls the main lever 1002 towards the handlebar 1028 in the direction marked A with the spindle 1026 in the position B, brake function is operated. If the engines RPM falls below the predetermined value, the brake switch solenoid 1030a is energised thus disengaging the clutch and preventing the motor from stalling (i.e. clutch function is operated). Further travel of the main lever 1002 in the direction marked A once the brake master cylinder solenoid port 1050 is closed by the brake master cylinder piston 1014 will operate the brake function without risk of stalling the vehicle's engine because the clutch function has already been operated.

If the main lever 1002 is pulled towards the handlebar 1028 with the spindle 1026 pushed in the direction marked C, the clutch function will be operated. The brake function will subsequently be operated in the same manner as if the RPM switch 1052 was activated.

Figure 33:
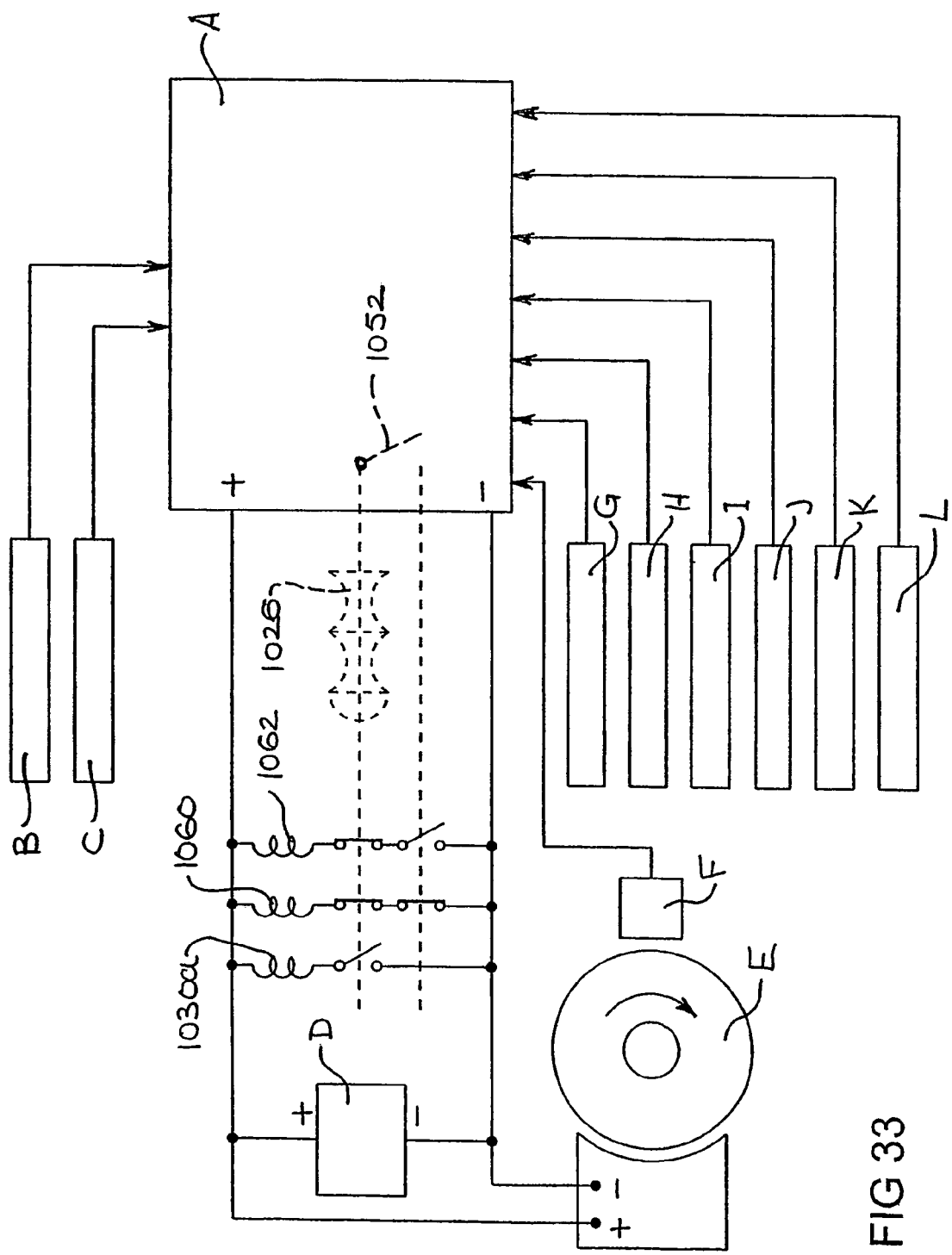
FIG. 33 is a schematic illustration of a more sophisticated control system for the actuator shown in FIGS. 30 and 31.
Figure 34:
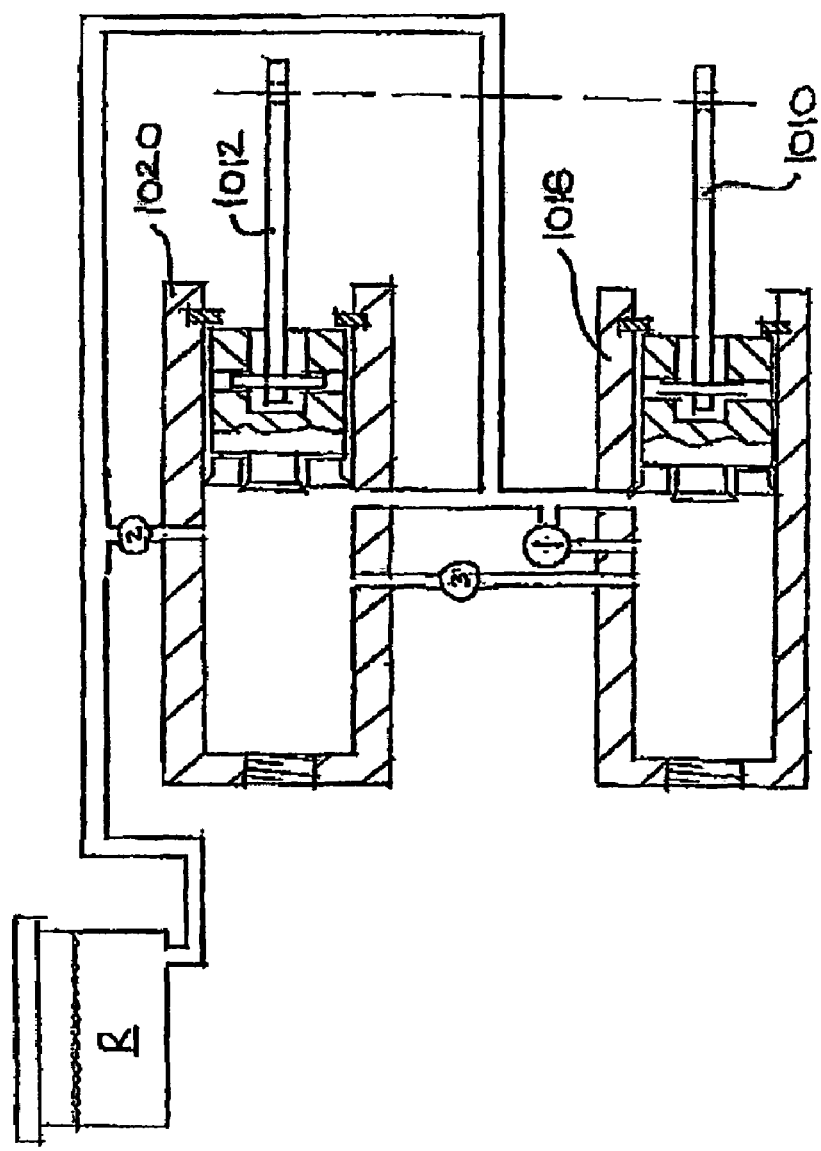
FIG. 34 is a part cross section view of a hydraulic control system for use with the actuator shown in FIGS. 30 and 31.

FIGS. 33 and 34 illustrate a more complex control system to enable better control over the rotational speed of the driven wheels of the vehicle to which it is fitted. The system is shown in brake function mode. The components of the control system shown in FIGS. 33 and 34 are as follows;

A—Control unit
B—Lever position input
C—Adjustment lever input
D—Battery
E—Engine's flywheel
F—R.P.M sensor
G—Engine temperature input
H—Wheel speed input
I—Gear selection input J—Brake line pressure input
K—Throttle setting input
L—Engine cylinder pressure The control system shown in FIGS. 33 and 34 employs two additional solenoids, namely a clutch master cylinder solenoid 1060 associated with the clutch master cylinder 1020 and an anti-stall solenoid 1062. The clutch master cylinder solenoid 1060 functions in a similar way to the brake master cylinder solenoid 1050a described previously in relation to the brake master cylinder 1016, but according to Table 1 of FIG. 35. The anti-stall solenoid 1062 is operated when the RPM switch 1052 opens a port in the brake master cylinder 1016 that feeds pressure into the clutch master cylinder 1020.

The anti-stall solenoid 1062 controls valve 3 shown in FIG. 34, whilst the clutch master cylinder solenoid 1060 controls valve 2 and the brake master cylinder solenoid 1050a controls valve 1.

FIG. 35 depicts a Table showing which of the valves 1, 2, 3 are opened or closed during operation of the more complex control system shown in FIG. 34.

It should be noted that brake function is selected by the spindle 1026 being in position B. The clutch function is selected by the spindle 1026 being in position C.

The anti-stall function of the control system is activated by the control unit based on a predetermined minimum engine RPM. However, it is envisaged that a 3-D map subject to other inputs such as the ones shown in FIG. 33 could be used by the control system.

The hydraulic circuit shown in FIG. 34 is for a more complex control system but may be representative of a simple system if the solenoids 1060, 1062 are taken as being permanently closed. FIG. 36 depicts a Table showing which of the valves 1, 2, 3 are opened or closed during operation of the simple version of the control system.

It will be appreciated that if required by a user, the pedal operated arm 1008 may be operated remotely by a cable connected to a conventional foot pedal. The incorporation of the pedal operated arm 1006 means that the force required to operate the master cylinders 1016, 1020 can be wholly or partially provided by the user's foot. The position of the spindle 1026 will however still control which function is operated first and the anti-stall function will still operate.

With the more complex control system shown in FIGS. 33 and 34, it is possible to use a three position switch instead of the switch 1030 as described previously. Such a switch could initiate operation of a brake function (operates the brake first), a neutral function (operates both functions but with an overlap) and a clutch function (operates the clutch function first and then the brake function). Also, with such a complex control system, the switch 1030 could be replaced with a linear potentiometer to allow greater adjustability of the functions.

It will also be appreciated that the switch 1030 could be replaced by the movement of the spindle operating a spool valve to change the functions. This spool valve could also be activated by the control unit.

Furthermore, more complex systems could use a pulse width modulation to achieve greater control and also to reduce power consumption. This would require the use of electronics to generate pulses of varying width to operate the solenoids rather than switching them on and off so as to achieve finer control over their flow rates.

Figure 37:
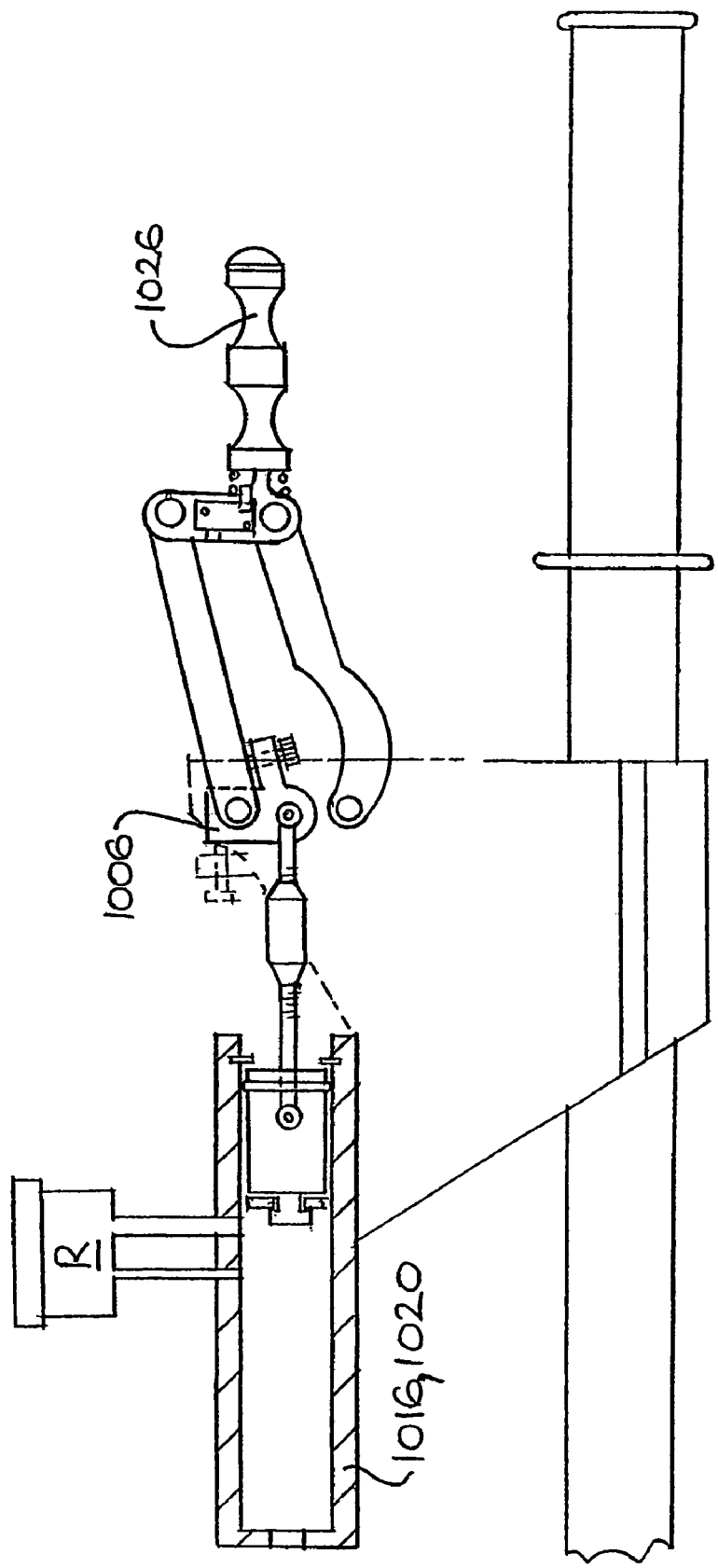
FIG. 37 is a part cross sectional view of a modified lever suitable for use with the actuator shown in FIG. 30.

FIG. 37 shows another lever system by which the master cylinders 1016, 1020 may be operated. This system enables the spindle 1026 to remain parallel to the handlebar 1028 throughout its travel.

It should also be appreciated that the rotary spindle 1026 may be replaced by a non-rotating slide to operate the switch 1030.

Figure 39:
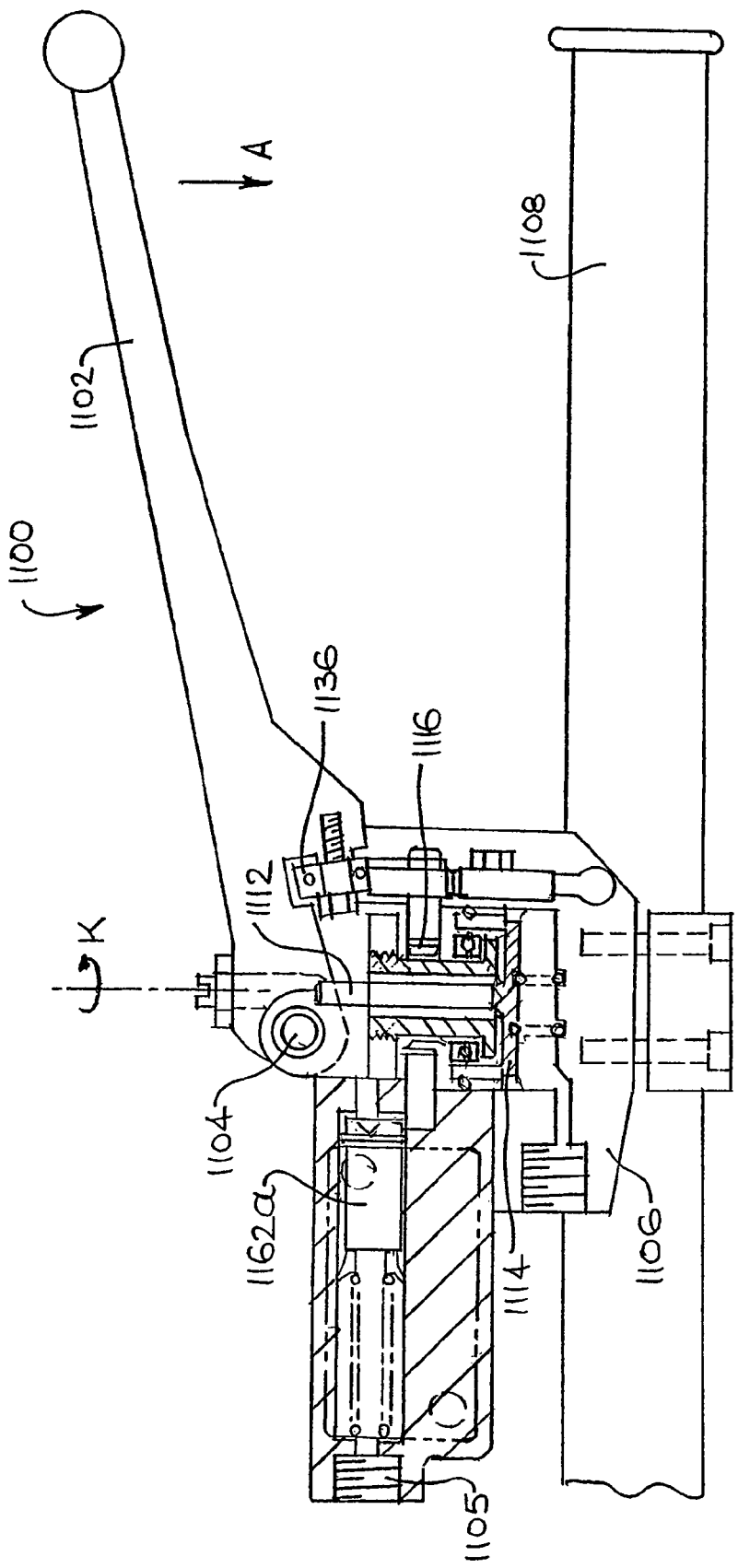
FIG. 39 is a top view of the actuator shown in FIG. 38.

FIGS. 38 and 39 illustrate another combined brake and clutch actuator 1100. The actuator 1100 includes a lever 1102 which is pivotally connected at pivot point 1104 to a mount 1106. The mount 1106 is arranged for connection to the handlebar 1108 of the vehicle (not shown). The pivotal connection of the lever 1102 about pivot point 1104 enables the lever 1102 to move towards the handlebar 1108 of the vehicle in the direction marked A in FIG. 39.

The lever 1102 is also arranged for pivotal movement about pivot axis K as shown in FIG. 39. Movement about pivot axis K enables the lever 1102 to be moved downwardly towards the ground (i.e. in a vertical plane).

When the lever 1102 is pulled towards the handlebar 1108 (i.e. in the direction marked A in FIG. 39) the lever 1102 is caused to pivot about pivot point 1104. This pivotal motion pushes the clutch activation pin 1112, which in turn pushes the clutch master cylinder piston 1114 to thereby operate a clutch function.

When the lever 1102 is pushed downwardly in the direction marked B in FIG. 38, the lever 1102 is caused to rotate around the pivot axis K. This movement is possible because of the inclusion of a brake activation bearing 1116. Rotation of the lever 1102 around the pivot axis K causes movement of the brake adjustor 1118 which, via the brake activation pin 1120, moves the brake master cylinder piston 1122. Movement of the brake master cylinder piston 1122 operates the brake function.

FIG. 41 illustrates an overlap adjustor arrangement 1130. Such an overlap adjustor arrangement 1130 includes a cam plate 1132 which is arranged to slide for and aft in a "T" slot formed in the mount 1106. The position of the cam plate 1132 is controlled by an overlap adjustor 1134 and a spring 1135. As the lever 1102 is pulled in towards the handlebar 1108 the cam follower bearing 1136 which is attached to the lever 1102 slides along the cam surface 1132a of the cam plate 1132. When the cam follower bearing 1136 contacts a ridge formed on the cam surface 1132a it forces the lever 1102 in a downward direction (i.e. in direction B marked on FIG. 38). The cam surface 1132a includes a ramp which, as the cam follower bearing 1136 moves along the ramp, serves to force the lever 1102 in this downward direction. This downward movement of the lever 1102 causes the brake function to be applied.

The position of the cam plate 1132 is controlled by the position of the overlap adjustor cam 1134 which effects the point at which brake function is applied when the lever 1102 is pulled towards the handlebar 1108. Thus, the positioning of the overlap adjustor cam 1134 can be adjusted to control the degree of overlap between the clutch function and the brake function.

It is envisaged that the overlap adjustor cam 1134 would be operable by the user's fingers or thumb and that it's setting could be changed whilst the vehicle is in motion. Additionally, the user can, at anytime, apply more braking force than the cam plate 1132 supplies by pushing the lever 1102 in a downward direction (i.e. in the direction marked B in FIG. 38).

FIG. 38 also illustrates two cables 1150, 1152. These cables 1150, 1152 and the brake pedal system shown in FIG. 42 are optional attachments which enable, if desired, the actuator 1100 to be foot operated in two different ways.

The first way of providing foot operation to the actuator 1100 involves connecting the cable 1150 to the foot operated brake pedal 1160. With such an arrangement there is no need to mount the brake master cylinder 1122 on the handlebars

1108. Instead, the brake master cylinder 1122' can be mounted as shown in FIG. 42. With such an arrangement, the function performed by the lever 1102 is identical to as previously described. However, when the lever 1102 is moved in the direction marked B by the user or by downward force provided by the cam plate 1134, the cable 1150 pulls the brake pedal 1160 downwardly operating the brake function via the brake master cylinder 1162. This arrangement enables the brake function to be operated by either the user's foot or hand or by both simultaneously.

The second way of providing foot operation to the actuator 1100 involves connecting the cable 1152 to the brake pedal 1160 as also shown in FIG. 42. With such an arrangement, the brake master cylinder is mounted on the handlebar 1108 as shown in FIG. 38. Brake function is then operated by the pressing the brake pedal 1160 downwardly which pulls the cable 1152, which in turn pulls the lever 1102 in the direction marked B. When the lever 1102 is pulled in the direction marked B, the brake master cylinder mounted on the handlebar 1108 is actuated.

Another variation on this arrangement would be to have the cable 1152 pull the lever 1102 inwardly towards the handlebars (in the direction marked A). If the dual function handlebar mounted actuator 1100 was set up in this manner, the foot pedal 1160 would operate the clutch function the cam plate 1132 would operate the brake function.

FIGS. 43 and 44 illustrate an alternative arrangement of the actuator 1100 shown in FIGS. 39 and 40. This alternative actuator 1100' has a different mechanical layout to the actuator 1100 but operates in the same way as far as the user is concerned. For example, when the lever 1102' is pulled towards the handlebar 1108' in the direction A the lever 1102' pivots around the clutch actuation pivot 1104'. This moves the clutch actuation adjustor 1110' which in turn moves the clutch actuation pin 1112'. The clutch actuation pin 1112' moves the clutch master cylinder piston 1105a' thereby operating the clutch function. As the brake adjustor 1118' contacts the brake actuation pin 1120' at a point in line with the clutch actuation pivot 1106', the movement of the lever 1102' in direction A, not withstanding the affect caused by the cam plate 1134, causes no movement of the brake master cylinder piston 1162a'.

When the lever 1102' is moved downwardly (i.e. in the direction marked B in FIG. 43) the lever 1102' pivots about the axis K and moves the brake adjustor 1118' which in turn moves the brake actuation pin 1120'. The brake actuation pin 1120' moves the brake master cylinder piston 1162a' thereby operating the brake function. The overlap adjustor cam arrangement 1134 and the cam plate 1132 operate in the same manner as previously described.

FIG. 45 illustrates a further form of a dual function handlebar mounted actuator 1100". In this Figure the mount is not illustrated for clarity reasons. It should be assumed however that the mount links the master cylinders and the pivot point A to the handlebar 1108".

FIG. 46 is an end view of the actuator 1100" shown in FIG. 45 without the mount.

When the lever 1102" shown in FIGS. 45 and 46 is pulled towards the handlebars 1108" it rotates around the pivot axis A which causes both the clutch adjustor 1110" and the brake adjustor 1118" to move. This movement actuates both the clutch free play adjustor 1150" and the brake free play adjustor 1152". It is envisaged that these adjustors 1150", 1152" would be set so that the brake free play adjustor 1152" would have more free play than the clutch free play adjustor 1150". When the adjustors 1150", 1152" are set in this fashion and the lever 1102" is pulled towards the handlebar 1108", the clutch function will be operated first then, at a predetermined point, the brake function will be operated.

Pushing the lever 1102" downwardly will cause the lever 1102" to rotate around the pivot axis K. This results in the brake actuation adjustor 1152" firstly taking up any free play before operating the brake function. It is important to note that at any stage during the travel of the lever 1102" in the direction A, the lever 1102" can also be moved in the direction marked B. The affect of such movement will be to increase the bias to the brake function.

Also shown in FIG. 45 is a rotating spindle 1160" attached to the lever 1102". This spindle 1160" is designed to reduce the friction associated with a user's fingers sliding over the lever 1102" as it is being operated.

To assist in reducing the effort required to operate the dual function lever 1100" it is possible, by careful positioning of the components, to have a clutch actuating adjustor go "over centre" after the clutch is disengaged. This reduces the force required for the remainder of the travel of the lever 1102" in the direction marked A. By careful arrangement of the relative angles between the clutch freeplay adjustor 1150 and the clutch adjustor 1110 and the clutch freeplay adjustor 1150 and the centreline of the clutch master cylinder, it is possible to introduce an "over centre" operation of the clutch function. This means that once the clutch is fully disengaged any further travel of the lever 1102 requires little or no force. This offers the advantages of improving the user's feel of the point at which the brake function is initiated and also reduces the effort required to operate the dual function lever 1100.

FIGS. 47 to 50 illustrate an actuator arrangement 1200 which integrates the control of the clutch function and the brake function of a vehicle and uses hand controls and foot controls. The actuator arrangement 1200 shown in FIG. 47 includes a lever 1201 which has a rotating spindle 1202 mounted at the free end thereof. Lever 1201 is pivotally connected at a main pivot 1204 to a mount (not shown) which is arranged to be connected to a handlebar 1206 of a vehicle (not shown). The lever 1201 is connected to a clutch master cylinder 1208 via a cam follower bearing 1210 and rocker arm arrangement 1211. The rocker arm arrangement 1211 includes a push rod 1211a which drives a clutch master cylinder piston 1212.

A brake actuation arm 1214 is also pivotally mounted to the mount (not shown) at pivot point 1204. The brake actuation arm 1214 is connected to a brake master cylinder 1216 via a brake arm 1218 and a push rod 1220. The push rod 1220 is arranged to drive a brake master cylinder piston 1222.

Figure 48:
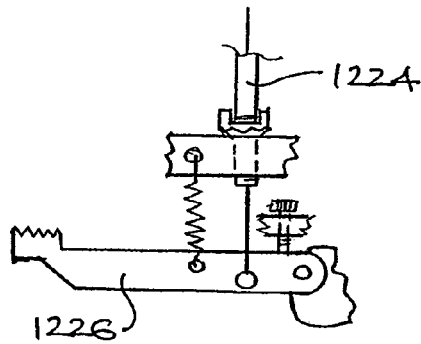
FIG. 48 is a part cross sectional view of a foot pedal for use with the actuator shown in FIG. 47.

A foot operated cable 1224 is shown connected to the brake actuation arm 1214 so that depression of the foot pedal results in the cable 1224 rotating the brake actuation arm 1214 about the pivot 1204. FIG. 48 illustrates schematically the foot operated pedal 1226 and its connection to the cable 1224.

When the lever 1201 is pulled towards the handlebar 1206, the cam follower bearing 1210 moves along a cam surface 1201a formed on the end of the lever 1201. As the lever 1201 pivots about pivot point 1204, the cam follower bearing 1210, via the rocker arm arrangement 1211 moves the clutch master cylinder piston 1212. This results in operation of the clutch function of the vehicle.

Figure 49:
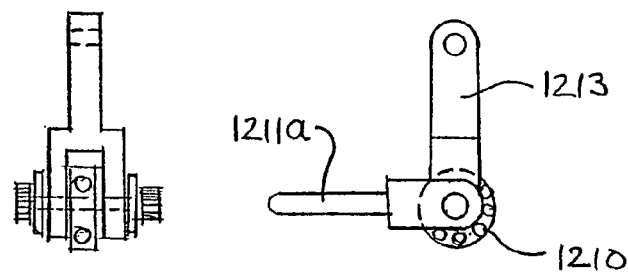
FIG. 49 is a cross sectional view of a clutch rocker arm assembly for use with the actuator shown in FIG. 47.

FIG. 49 illustrates in more detail the clutch rocker arrangement 1211. As shown in this Figure, the clutch rocker arm arrangement 1211 includes a rocker arm 1213, the push rod 1211a and the cam follower bearing 1210. Once the clutch has been disengaged, the cam surface 1201a is profiled so that further travel of the lever 1201 in the direction towards the handlebar 1206 causes very little or no further displacement of the clutch master cylinder piston 1212. This means that from the point at which the clutch is disengaged (i.e. when clutch function is initiated) very little additional effort is required by the user to move the lever 1201 towards the handlebar 1206. This also improves the user's feel of when the brake function is initiated.

During the initial travel of the lever 1201 towards the handlebar 1206, any free play in the brake master cylinder 1216 is taken up. This free play in the brake master cylinder 1216 is a result of the fact that the return to the reservoir port (not shown) must be closed before any pressure can build up in the brake system. As the lever 1201 is pulled towards the handlebar 1206, a spring 1230 causes the brake actuation arm 1214 to rotate around the main pivot 1204 until a ball and spring detent system 1232 (see FIG. 50) stops further rotation of the brake actuation arm 1214. The brake actuation arm 1214 moves the brake master cylinder piston 1222 via the brake push rod 1220.

The brake push rod 1220 is connected to the brake actuation arm 1214 via a pivot 1234. The push rod 1220 is also pivoted at pivot point 1236. It is envisaged that pivot point 1236 is in fact a spherical rod end in order to prevent excessive side loading on the brake master cylinder piston 1222. It will be appreciated that the brake master cylinder piston 1222 is positively connected to the brake actuation arm 1214 by the brake push rod 1220 and its two pivots 1234, 1236. Accordingly, the brake actuation arm 1214 has the ability to both push and pull the brake master cylinder piston 1222.

Once the ball and spring detent system 1232 has locked the brake actuation arm 1214, further travel of the lever 1201 towards the handlebar 1206 does not move the brake actuation arm 1214 until a brake initiation adjustor 1250 contacts a portion of the brake actuation arm 1214. At this point, any further travel of the lever 1201 towards the handlebar 1206 will operate the brake function.

If the lever 1201 is released the brake system pressure returns the brake master cylinder piston 1222 most of the way back to the start of its stroke. The brake master cylinder piston 1222 is pulled over the ball spring detent and back to an open to reservoir position by the brake actuation arm return spring 1254.

Figure 47:
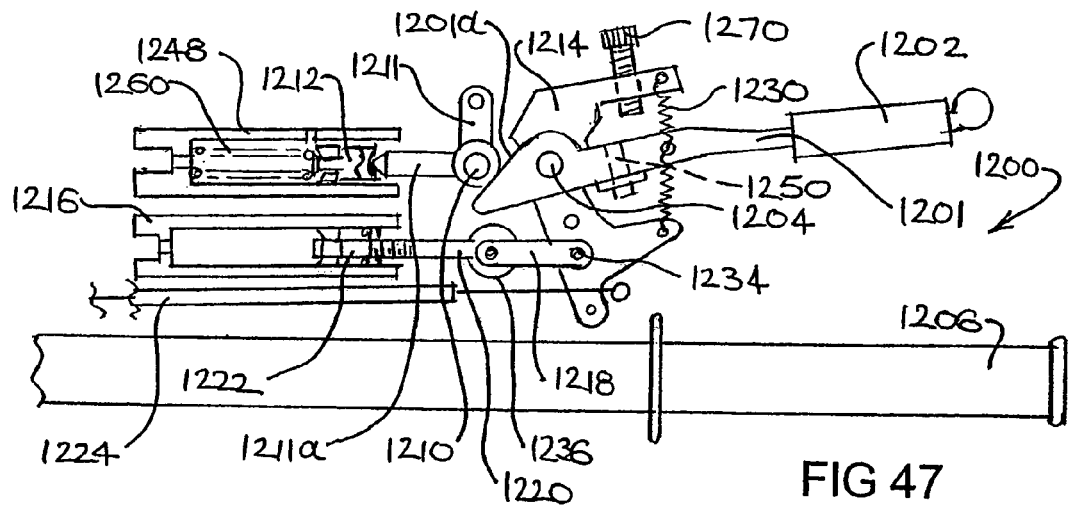
FIG. 47 is a part cross sectional front view of an actuator in accordance with an embodiment of the invention.

It will be appreciated that in FIG. 47 no return spring is shown in the brake master cylinder 1216. However, it is envisaged that in some applications a return spring may be desirable.

In the arrangement shown in FIGS. 47 to 50, the return of the lever 1201 to its most displaced position from the handlebar 1206 is facilitated by the clutch master cylinder piston return spring 1260. Furthermore, the profile of the cam surface 1201a is tailored to ensure there is sufficient force to return the lever 1201 to its position away from the handlebar 1206. This, together with the brake actuation arm return spring returns the brake master cylinder piston 1222 to the open port to reservoir position.

If the foot pedal 1226 is depressed, the pedal operation cable 1224 causes the brake actuation arm 1214 to rotate around the main pivot 1204, thus operating the brake function. Also, at a point determined by an anti-stall adjustor 1270, the lever 1201 is caused to rotate around the main pivot 1204 thereby operating the clutch function. The purpose of this operation of the clutch function is to help prevent stalling of the motor vehicle due to any brake function lock.

For the purpose of clarity, the mount is not shown in FIGS. 47 to 50. However, the main pivot 1204, the clutch rocker arm pivot and the ball spring detent arrangement 1232 should be assumed to be located on the mount. Additionally, the pedal operation cable 1224, the clutch master cylinder 1208 and the brake master cylinder 1216 may be mounted on the handlebar 1206 or on the mount (not shown).

Figure 50:
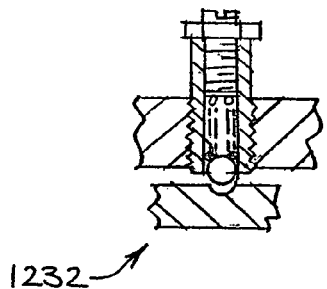
FIG. 50 is a part cross sectional view of a ball spring detent unit for use with the actuator shown in FIG. 47.

The purpose of the ball and spring detent arrangement 1232 as shown in FIG. 50 is to provide tactile indication to the user of the initiation of a brake function. However, it will be appreciated that the inclusion of such an arrangement is not essential.

Figure 51:
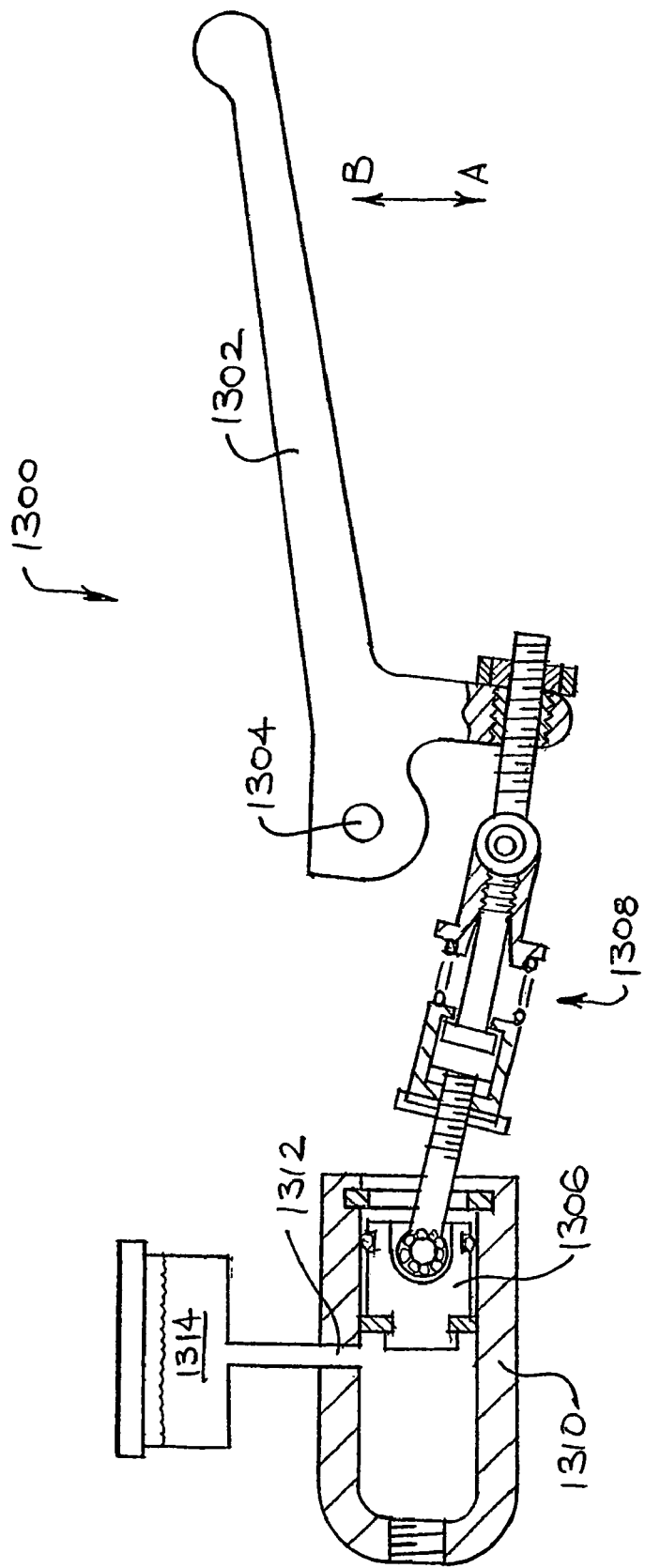
FIG. 51 is a part cross sectional view of a master cylinder with a positive mechanical return.

FIG. 51 illustrates a lever arrangement 1300 which includes a hydraulic master cylinder with a positive mechanical return. To aid illustration of this arrangement the mount which connects the lever 1302 and the master cylinder 1310 to a handlebar (not shown) has been excluded. The lever 1302 is arranged to pivot on the mount (not shown) at pivot point 1304. When the lever 1302 is pulled towards the handlebar (in the direction marked A) any slack in the connection between the handlebar and the piston 1306 which is set by an adjustor 1308 will initially be taken up. Once the slack has been taken up, the adjustor 1308 will push the piston 1306 along is stroke within the master cylinder 1310. This will pressurise the master system and operated the slave cylinder (not shown).

When the lever 1302 is released, the system pressure will return the master cylinder piston 1306 back along its travel path. However, the system pressure will not be sufficient to push the piston 1306 far enough to open the return port 1312 to reservoir 1314. This means that although the lever 1302 will now operate the system, pumping loses and changes in temperature will affect its operation. However, by pushing the lever in the direction B (i.e. away from the handlebar) this resets the system by pulling back the master cylinder piston 1306 to a point at which the return to reservoir port 1312 is open. This will compensate for any pumping loses and/or expansion or contraction of fluid due to the temperature changes.

Figure 52:
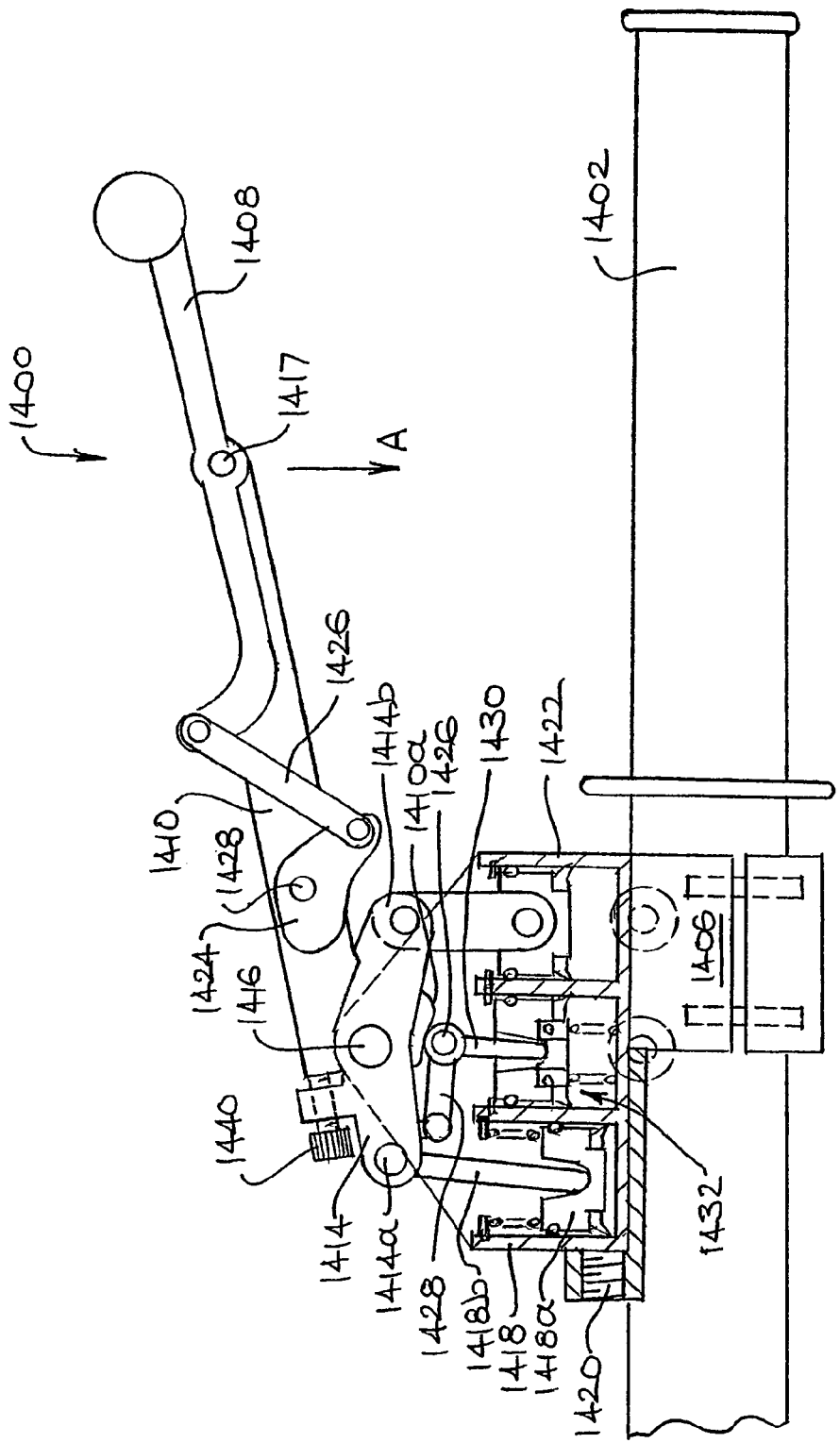
FIG. 52 is a part cross section top view of an actuator in accordance with an embodiment of the invention.

FIG. 52 illustrates a further actuator 1400. The actuator 1400 is arranged to be mounted on a handlebar 1402 via a mount 1406. The actuator 1400 includes a main lever 1408, a clutch operation arm 1410 and a brake arm 1414. The clutch operation arm 1410 and the brake arm 1414 are pivotally connected to the mount 1406 at a first pivot point 1416. The main lever 1408 is pivotally connected at a second pivot point 1417 to clutch operation arm 1410.

The brake arm 1414 has a first end 1414a which is arranged for connection to a spring biased piston arrangement 1418. The piston arrangement 1418 includes a piston 1418a which is driven by fluid within a brake pedal line 1420.

The brake arm 1414 has a second end 1414b which is arranged for connection to a piston arrangement 1422. The piston arrangement 1422 is arranged to pressurise fluid within a brake line (not shown) so as to thereby activate a brake function of a vehicle.

The main lever 1408 is connected to an overlap cam 1424 via a connector linkage 1426. The overlap cam 1424 is pivotally connected to the clutch operation arm 1410 at a third pivot point 1428 and is arranged to contact the brake arm 1414 when the main lever 1408 is pivoted about pivot point 1417.

The clutch operation arm 1410 includes a clutch cam 1410a which, during pivotal movement of the clutch operation arm 1410, drives a clutch cam roller 1426. The clutch cam roller 1426 is mounted to a rocker arm 1428 which is pivotally connected to the mount 1406. When the clutch cam roller 1426 is driven along the clutch cam 1410a, an actuator 1430 is caused to operate a piston arrangement 1432. The piston arrangement 1432 is arranged to pressurise fluid within a clutch fluid line (not shown) so as to thereby operate a clutch function of a vehicle. Further travel of the lever 1410 towards the handlebar 1402 can be adjusted to operate the brake function.

When the main lever 1408 is pivoted about pivot point 1417 the overlap cam 1424 is caused to contact the brake arm 1414 so that the piston arrangement 1422 is operated thereby resulting in operation of a brake function. Continued pivotal movement of the main lever 1408 will result in pivotal movement of the clutch operation arm 1410 about pivot point 1416. This movement will result in the clutch actuator 1430 attached thereto operating the piston arrangement 1432 and thus a clutch function will be operated to prevent stalling of the vehicle's engine.

The actuator 1400 may be connected to a foot operated brake pedal (not shown) via the brake pedal line 1420. When the brake pedal is depressed by the user, the fluid in the brake pedal line 1420 drives the piston 1418*a* upwardly so that the actuator 1418*b* pivots the first end 1414*a* of the brake arm 1414 in a clockwise direction about pivot point 1416. This causes the second end 1414*b* of the brake arm 1414 to operate the brake function of the vehicle in the manner described above.

An adjustor 1440 is mounted on the brake arm 1414. The adjustor 1440 is arranged to rotate the clutch operation arm 1410 about the first pivot point 1416 thus providing an anti-stall function.

Throughout the above description reference has been made to the use of hydraulic cylinders to operate the clutch and brake functions of the vehicle. It will be appreciated that other means for operating the clutch and brake functions are envisaged and that they may include, among other things, pneumatic, electric or any other suitable means.

It should also be appreciated that the function of the levers of the various embodiments may be reversed by simply swapping over the relevant clutch or brake cylinder or other actuating means used to operate the respective clutch and brake functions.

It will further be appreciated that features such as an anti-stall function, over-centre operation of the clutch, positive mechanical return of the master cylinder pistons, adjustment of function overlap during operation, slack adjustors, tactile indication of function initiation, foot pedal operation, parallel lever travel, active anti-stall function, the use of a finger spindle, cam operation of the master cylinders etc, could be applied individually and/or jointly or in any combination to any of the embodiments previously described.

The described embodiments offer many advantages over the prior art. Such advantages depend on the particular combination of features included in the actuators. However, such advantages may include:

1. The ability of the user to operate the rear brake whilst their weight is displaced from above the traditional foot operated brake pedal of the vehicle;
2. The ability of such actuators to be fitted to vehicles to enable operation by user's with various physical disabilities;
3. The simplification of the vehicle's control because of the use of a single lever to control the rotational speed of the vehicle's rear wheel (subject to the constraints of gear and throttle selection);
4. The ability to adjust the actuator to prevent rearward motion of the vehicle;
5. The ability of the user to use their foot to perform other functions (i.e. balance for stability) because it is not required for foot operation of a brake function;
6. The inclusion of an anti-stall function when the brake function is operated;
7. The ability of the user to operate the rear brake of the vehicle without transfer of the user's weight to a particular side of the vehicle, thus enabling better control of the vehicle;
8. The ability to redesign the foot pedals of the vehicle to enable the user to better shift their weight during use of the vehicle;
9. The ability to overlap the clutch and brake functions of the vehicle so that better control over the retardation of rotational speed of the rear wheel can be achieved; and
10. The ability to achieve effective control of the brake and clutch functions of the vehicle using a simple lever that can be controlled by a single finger of the user's hand.

The embodiments have been described by way of example only and modifications within the spirit and scope of the invention are envisaged.

The invention claimed is:

1. A dual function handlebar mounted actuator comprising means for operating a brake function and means for operating a clutch function, a single hand operated lever for contact by a user, the lever being arranged to separately activate at least one of said brake function operating means and said clutch function operating means, wherein said brake function operating means and said clutch function operating means are linked so that a combined brake and clutch function can be activated, wherein the lever is arranged so that movement in a first direction activates said clutch function operating means and further movement of the lever in the first direction to an activation point activates said brake function operating means, and wherein activation of the lever in a second direction activates said brake function and continued activation of the lever in said second direction activates said clutch function.

2. A dual function handlebar mounted actuator comprising means for operating a brake function and means for operating a clutch function, a single hand operated lever for contact by a user, the lever being arranged to separately activate at least one of said brake function operating means and said clutch function operating means, wherein said brake function operating means and said clutch function operating means are linked so that a combined brake and clutch function can be activated; and means for sensing an R.P.M. of an associated engine, wherein the lever is arranged so that when the sensed R.P.M. is above a first predetermined value, movement of a first portion of the lever will result in operation of said brake function, and wherein when the sensed R.P.M. is below the first predetermined value movement of the first portion of the lever will result in operation of said brake function and said clutch function so as to prevent stalling of the engine.

3. The dual function handlebar mounted actuator according to claim 2, wherein initial movement of a second portion of the lever results in operation of the clutch function independently of said brake function, and that further movement of the second portion of the lever results in operation of both said clutch function and said brake function.

4. A dual function handlebar mounted actuator comprising means for operating a brake function and means for operating a clutch function, a single hand operated lever for contact by a user, the lever being arranged to separately activate at least one of said brake function operating means and said clutch function operating means, wherein said brake function operating means and said clutch function operating means are linked so that a combined brake and clutch function can be activated, and wherein movement of the lever in a first direction operates said clutch function, movement of the lever in a second direction operates said brake function, the dual function handlebar further includes a combined function means arranged so that when the lever is moved in said first direction to an initiation point said combined function means causes the lever to also move in said second direction so that both said clutch function and said brake function are operated.

* * * * *